US011425752B2

(12) United States Patent
Adjakple et al.

(10) Patent No.: US 11,425,752 B2
(45) Date of Patent: Aug. 23, 2022

(54) RADIO INTERFACE PROTOCOL ARCHITECTURE ASPECTS, QUALITY OF SERVICE (QOS), AND LOGICAL CHANNEL PRIORITIZATION FOR 5G NEW RADIO

(71) Applicant: IPLA Holdings Inc., New York, NY (US)

(72) Inventors: Pascal M. Adjakple, Great Neck, NY (US); Joseph M. Murray, Schwenksville, PA (US); Guodong Zhang, Woodbury, NY (US); Lakshmi R. Iyer, King of Prussia, PA (US); Wei Chen, San Diego, CA (US); Stephen E. Terry, Northport, NY (US)

(73) Assignee: IPLA HOLDINGS INC., New York, NY (US)

( * ) Notice: Subject to any disclaimer, the term of this patent is extended or adjusted under 35 U.S.C. 154(b) by 0 days.

(21) Appl. No.: 16/343,010

(22) PCT Filed: Oct. 19, 2017

(86) PCT No.: PCT/US2017/057483
§ 371 (c)(1),
(2) Date: Apr. 18, 2019

(87) PCT Pub. No.: WO2018/075828
PCT Pub. Date: Apr. 26, 2018

(65) Prior Publication Data
US 2020/0267753 A1    Aug. 20, 2020

Related U.S. Application Data

(60) Provisional application No. 62/410,049, filed on Oct. 19, 2016, provisional application No. 62/501,397,
(Continued)

(51) Int. Cl.
*H04W 72/12* (2009.01)
*H04W 72/14* (2009.01)

(52) U.S. Cl.
CPC ....... *H04W 72/14* (2013.01); *H04W 72/1226* (2013.01)

(58) Field of Classification Search
CPC ............. H04W 72/14; H04W 72/1226; H04W 72/1268; H04W 72/02
See application file for complete search history.

(56) References Cited

U.S. PATENT DOCUMENTS

| 4,541,043 A | 9/1985 | Ballegeer et al. |
| 2009/0104916 A1* | 4/2009 | Rosa ................... H04W 52/146 455/453 |

(Continued)

FOREIGN PATENT DOCUMENTS

| CN | 104041159 A | 9/2014 |
| CN | 104813723 A | 7/2015 |

(Continued)

OTHER PUBLICATIONS

3GPP TR 22.891 V1.3.2, 3rd Generation Partnership Project; Technical Specification Group Services and System Aspects; Feasibility Study on New Services and Markets Technology Enablers; Stage 1 (Release 14), Feb. 2016, 95 pages.

(Continued)

Primary Examiner — Lakeram Jangbahadur
(74) Attorney, Agent, or Firm — Xsensus LLP

(57) ABSTRACT

Disclosed herein are new radio (NR) Data link architecture options including, for example, NR radio bearer models, NR logical channel models, and MAC and HARQ models. Further described are packet flows mapping to data radio bearers (DRBs), and a new flow encapsulation protocol in the user plane. In some embodiments, DRBs with different (Continued)

quality of service (QoS) are pre-established, but not activated. This allows a given user equipment (UE) to use these DRBs for packet data network (PDN) flows without a large overhead. Pre-established DRBs can be an extension to default bearer concept with the decision of pre-establishment of DRBs based on UE capability, subscription profile, operation policy, installed apps, etc.

21 Claims, 64 Drawing Sheets

Related U.S. Application Data filed on May 4, 2017, provisional application No. 62/545,747, filed on Aug. 15, 2017, provisional application No. 62/564,529, filed on Sep. 28, 2017.

(56) References Cited

U.S. PATENT DOCUMENTS

| | | | |
|---|---|---|---|
| 2012/0250631 | A1 | 10/2012 | Hakola et al. |
| 2016/0183276 | A1 | 6/2016 | Marinier et al. |
| 2017/0310433 | A1* | 10/2017 | Dinan ............ H04L 27/2613 |

FOREIGN PATENT DOCUMENTS

| | | | | |
|---|---|---|---|---|
| CN | 105453672 | A | | 3/2016 |
| EP | 3051736 | A1 | * 8/2016 | ........... H04L 5/0044 |
| EP | 3051736 | A1 | 8/2016 | |
| JP | 2016-527845 | A | 9/2016 | |
| KR | 10-2016-0041048 | A | 4/2016 | |
| WO | 2009/040395 | A1 | 4/2009 | |
| WO | 2015/021185 | A1 | 2/2015 | |
| WO | 2016/120940 | A1 | 8/2016 | |

OTHER PUBLICATIONS

3GPP TR 23.799 V0.7.0, "3rd Generation Partnership Project; Technical Specification Group Services and System Aspects; Study on Architecture for Next Generation System (Release 14)", Aug. 2016, 322 pages.
3GPP TR 38.801 V0.4.0, "3rd Generation Partnership Project; Technical Specification Group Radio Access Network; Study on New Radio Access Technology; Radio Access Architecture and Interfaces (Release 14)", Aug. 2016, 36 pages.
3GPP TR 38.804 V0.3.0, "3rd Generation Partnership Project; Technical Specification Group Radio Access Network; Study on New Radio Access Technology; Radio Interface Protocol Aspects (Release 14)", Aug. 2016, 21 pages.
3GPP TR 38.913 V0.4.0, "3rd Generation Partnership Project; Technical Specification Group Radio Access Network; Study on Scenarios and Requirements for Next Generation Access Technologies; (Release 14)", Jun. 2016, 35 pages.
3GPP TS 23.303 V13.5.0, "3rd Generation Partnership Project; Technical Specification Group Services and System Aspects; Proximity-based services (ProSe); Stage 2 (Release 13)", Sep. 2016, 124 pages.
3GPP TS 36.300 V13.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Mar. 2016, 295 pages.
3GPP TS 36.331 V13.0.0, 3rd Generation Partnership Project; Technical Specification Group Radio Access Network; Evolved Universal Terrestrial Radio Access (E-UTRA); Radio Resource Control (RRC); Protocol Specification (Release 13), Dec. 2015, 507 pages.
3GPP TSG RAN WG3 Meeting #91bis, R3-160821, ZTE, "Consideration on RAN Side Network Slicing", Apr. 2016, 9 pages.
3GPP TSG-RAN WG2 Meeting #93bis, R2-162627, ZTE, "Consideration on RAN Architecture Impacts of Network Slicing", Apr. 2016, 7 pages.
International Telecommunication Union, ITU-R Radiocommunication Sector of ITU, Recommendation ITU-RM.2083-0, "IMT Vision—Framework and Overall Objectives of the Future Development of IMT for 2020 and Beyond" M Series Mobile, radiodetermination, amateur and related satellite services, Sep. 2015, 21 pages.
Ericsson, MAC aspects for proSE opration[online], 3 GPP TSG-RAN WG#87 R2-143564, <URL:http://www.3gpp.org/fth/tsg_ran/WG2_RL2/TSGR2_87/Docs/R2-143564.zip> Aug. 22, 2014.

* cited by examiner

Multiple PDU sessions via different accesses to the different data networks

Multi-access PDU session
to the same network

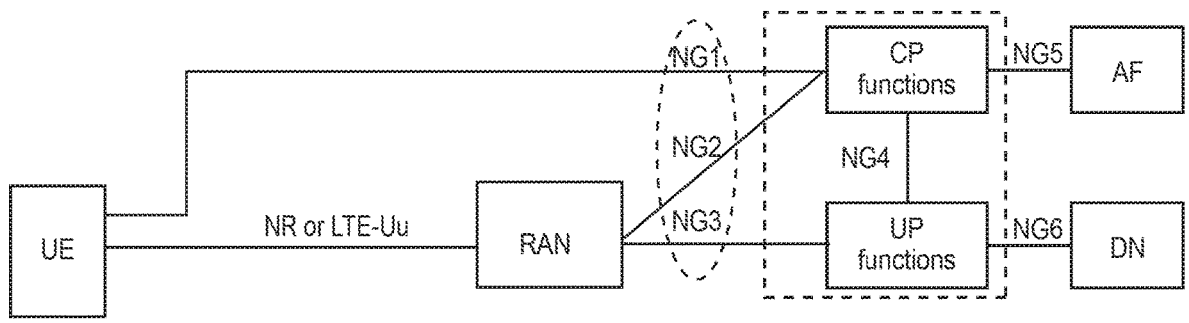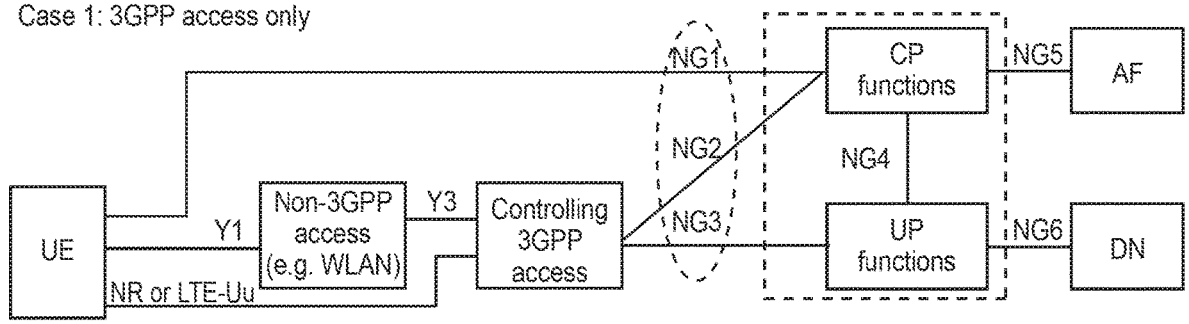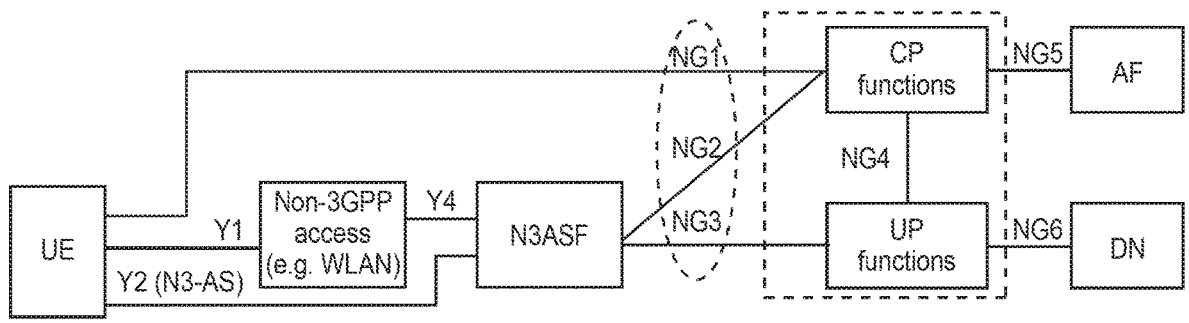
FIG. 2

RAN Slicing Architecture Model 3

FIG. 26

```
-- ASN1START

LogicalChannelConfig ::=        SEQUENCE {
    ul-SpecificParameters       SEQUENCE {
        priority                    INTEGER (1..16),
        prioritisedBitRate          ENUMERATED {
                                        kBps0, kBps8, kBps16, kBps32, kBps64, kBps128,
                                        kBps256, infinity, kBps512-v1020, kBps1024-v1020,
                                        kBps2048-v1020, spare5, spare4, spare3, spare2,
                                        spare1},
        bucketSizeDuration          ENUMERATED {
                                        ms50, ms100, ms150, ms300, ms500, ms1000, spare2,
                                        spare1},
        logicalChannelGroup         INTEGER (0..3)                                  OPTIONAL        -- Need OR
        allowedNumerologiesIndex::= SEQUENCE (SIZE (1..maxAllowedNumerology)) of
ConfiguredNumerologyIndex
    }                                                                               OPTIONAL,       -- Cond UL
    ...,
    [[ logicalChannelSR-Mask-r9     ENUMERATED {setup}                              OPTIONAL        -- Cond SRmask
    ]],
    [[ logicalChannelSR-Prohibit-r12 BOOLEAN                                        OPTIONAL        -- Need ON
    ]],
    [[ laa-Allowed-r14              BOOLEAN                                         OPTIONAL,       -- Need ON
       bitRateQueryProhibitTimer-r14 ENUMERATED {
                                        s0, s0dot4, s0dot8, s1dot6, s3, s6, s12,
                                        s30}                                        OPTIONAL        --Need OR
    ]]
}

-- ASN1STOP
```

```
NumerologyToAddMod ::=   SEQUENCE {
    NumerologyIndex          INTEGER (1.....16),
    Numerology               SEQUENCE {
        tti-List                 Sequence(SIZE (1..maxTTI)) of TTI}
        TTI                      Enuemrate (TTI x, TTI y, TTI z,...)
}
```

FIG. 27

```
-- ASN1START

RadioResourceConfigDedicated ::=   SEQUENCE {
    srb-ToAddModList                SRB-ToAddModList            OPTIONAL,   -- Cond HO-Conn
    drb-ToAddModList                DRB-ToAddModList            OPTIONAL,   -- Cond HO-toEUTRA
    drb-ToReleaseList               DRB-ToReleaseList           OPTIONAL,   -- Need ON
    mac-MainConfig              CHOICE {
        explicitValue               MAC-MainConfig,
        defaultValue                NULL
    }
..........
........
DRB-ToAddModList ::=   SEQUENCE (SIZE (1..maxDRB)) OF DRB-ToAddMod DRB-ToAddModListSCG-r12 ::=   SEQUENCE (SIZE (1..maxDRB)) OF DRB-ToAddModSCG-r12

DRB-ToAddMod ::= SEQUENCE {
    packet-FlowIdentity         Packet-FlowIdentity         OPTIONAL,       -- Cond DRB-Setup
    drb-Identity                DRB-Identity,
    pdcp-Config                 PDCP-Config                 OPTIONAL,       -- Cond PDCP
    rlc-Config                  RLC-Config                  OPTIONAL,       -- Cond SetupM
    logicalChannelIdentity      INTEGER (3..10)             OPTIONAL,       -- Cond DRB-SetupM
    logicalChannelConfig        LogicalChannelConfig        OPTIONAL,       -- Cond SetupM
    ...,
    [[ drb-TypeChange-r12       ENUMERATED {toMCG}          OPTIONAL,       -- Need OP
       rlc-Config-v1250         RLC-Config-v1250            OPTIONAL        -- Need ON
    ]],
    [[ rlc-Config-v1310         RLC-Config-v1310            OPTIONAL,       -- Need ON
       drb-TypeLWA-r13          BOOLEAN                     OPTIONAL,       -- Need ON
       drb-TypeLWIP-r13         ENUMERATED {lwip, lwip-DL-only,
                                lwip-UL-only, eutran}       OPTIONAL        -- Need ON
    ]]
}

Packet-FlowIdentity ::= INTEGER (0..maxPFI)
```

FIG. 36

RADIO INTERFACE PROTOCOL ARCHITECTURE ASPECTS, QUALITY OF SERVICE (QOS), AND LOGICAL CHANNEL PRIORITIZATION FOR 5G NEW RADIO

CROSS-REFERENCE TO RELATED APPLICATIONS

This application is the National Stage Application of International Patent Application No. PCT/US2017/057483 filed Oct. 19, 2017, which claims the benefit of U.S. Provisional Patent Application Ser. No. 62/410,049, filed Oct. 19, 2016, U.S. Provisional Patent Application Ser. No. 62/501,397, filed May 4, 2017, U.S. Provisional Patent Application Ser. No. 62/545,747, filed Aug. 15, 2017, and U.S. Provisional Patent Application Ser. No. 62/564,529, filed Sep. 28, 2017 the disclosures of which are hereby incorporated by reference as if set forth in their entireties herein.

BACKGROUND

The families of usage scenarios for International Mobile Communications (IMT) for 2020 and beyond include: eMBB (enhanced Mobile Broadband), URLLC (Ultra-Reliable and Low Latency Communications) and mMTC (massive Machine Type Communication). These major use cases may have diverse and conflicting service requirements in terms of latency, data rates, mobility, device density, reliability, user equipment (UE) battery life, network energy consumption, etc. In light of these diverse and conflicting service requirements that the next generation international mobile telecommunication system supports, 3GPP has identified a set of system architecture requirements. It is recognized herein, however, that in order to meet these requirements, issues related to UE and radio access network (RAN) data link models, among other issues, should be addressed.

SUMMARY

Disclosed herein are new radio (NR) Data link architecture options including, for example, NR radio bearer models, NR logical channel models, and MAC and HARQ models. Further described are packet flows mapping to data radio bearers (DRBs), and a new flow encapsulation protocol in the user plane. In some embodiments, DRBs with different quality of service (QoS) are pre-established, but not activated. This allows a given user equipment (UE) to use these DRBs for packet data network (PDN) flows without a large overhead. Pre-established DRBs can be an extension to default bearer concept with the decision of pre-establishment of DRBs based on UE capability, subscription profile, operation policy, installed apps, etc.

According to another aspect disclosed herein, a given UE can prioritize network slices, physical layer (PHY) numerologies, and logical channels for resource allocation based on grants assigned to the UE by the network. Further, the UE may provide feedback to assist the network in resource grants allocation. The feedback may include, for example, new buffer status reporting options, new power head room reporting options, and new scheduling request options. In an example, an apparatus, for instance a UE, receives a grant of resources from a network node connected to the apparatus via a network, wherein the grant of resources stipulates how data from one or more nodes can be sent uplink in the network. The apparatus distributes the grant of resources across the network. For example, the apparatus may distribute the grant of resources to a plurality of network slices of the network in accordance with a predetermined prioritization of the plurality of network slices. The apparatus may distribute the grant of resources to a plurality of network slices of the network in accordance with a slice prioritized bit rate associated with each of the network slices of the plurality of network slices. In some cases, the grant of resources is common to a plurality of physical layer numerologies, such that more than one of the plurality of physical layer numerologies can be mapped to the same grant of resources. Here, the apparatus may distribute the grant of resources to the plurality of physical layer numerologies in accordance with a predetermined numerology prioritization of the plurality of physical layer numerologies. The predetermined numerology prioritization may be a function of a transmission time interval (TTI) that is configured for a service that is mapped to the respective numerology. In an example, the apparatus distributes the grant of resources to one network slice of the plurality of network slices. The apparatus may also distribute the grant of resources to a physical layer numerology indicated in the grant, such that the physical layer numerology is the only physical layer numerology allocated with the resources. Alternatively, or additionally, the apparatus may distribute the grant of resources to a specific logical channel indicated in the grant, such that the specific logical channel is the only logical channel allocated with the resources. The grant of resources may indicate a physical resource block that is defined by a time domain, a frequency domain, a modulation and coding scheme, and redundancy version information. The grant of resources may also include power control information for uplink transmission, and an indication or resources for uplink ACK/NACK transmission.

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 2 is a diagram illustrating an architecture for decoupling and independent evolution of an access network (AN) and core network (CN).

FIG. 26 is a diagram illustrating an example of a radio resource control (RRC) logical channel configuration information element (IE).

FIG. 27 is a diagram illustrating an example of an RRC Configuration Numerology Structure.

FIG. 36 is a diagram illustrating an example data radio bearer (DRB) configuration.

DETAILED DESCRIPTION OF ILLUSTRATIVE EMBODIMENTS

Figure 1A:
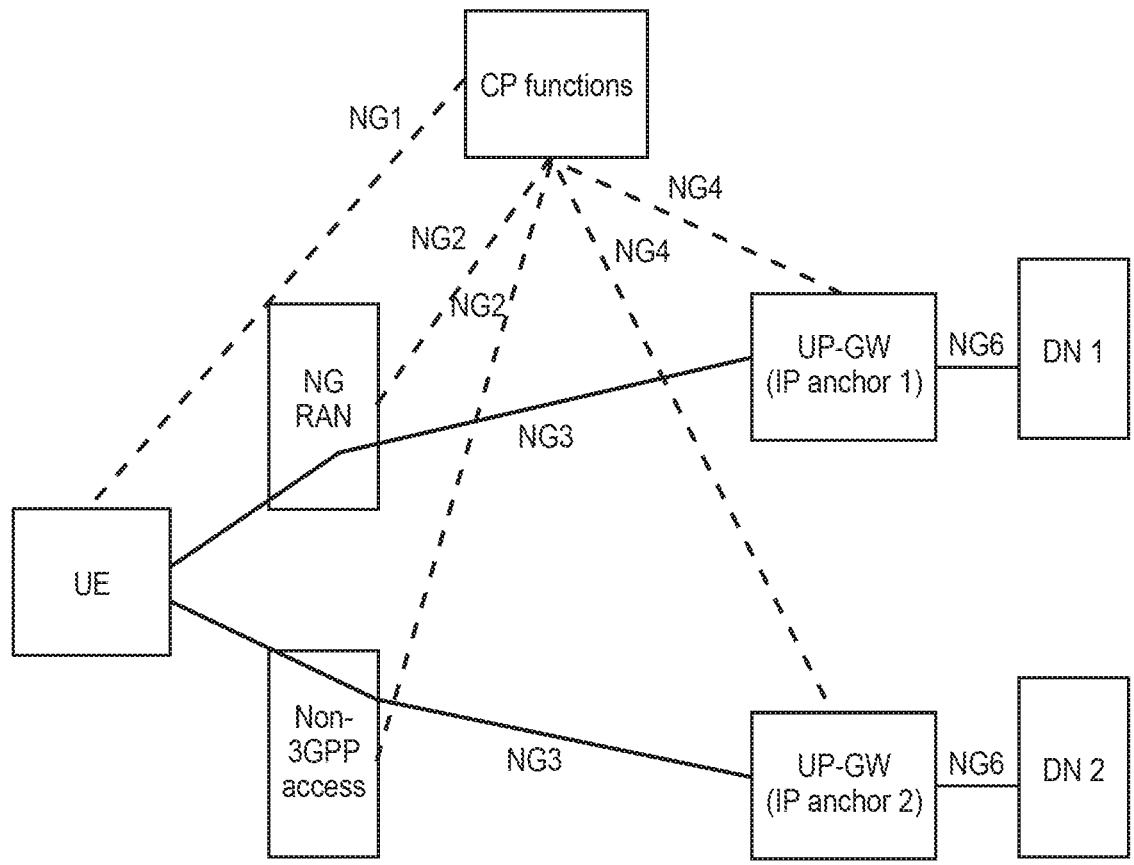
FIG. 1A, FIG. 1B, and FIG. 1C illustrate difference aspects of packet data unit (PDU) Sessions.
Figure 1B:
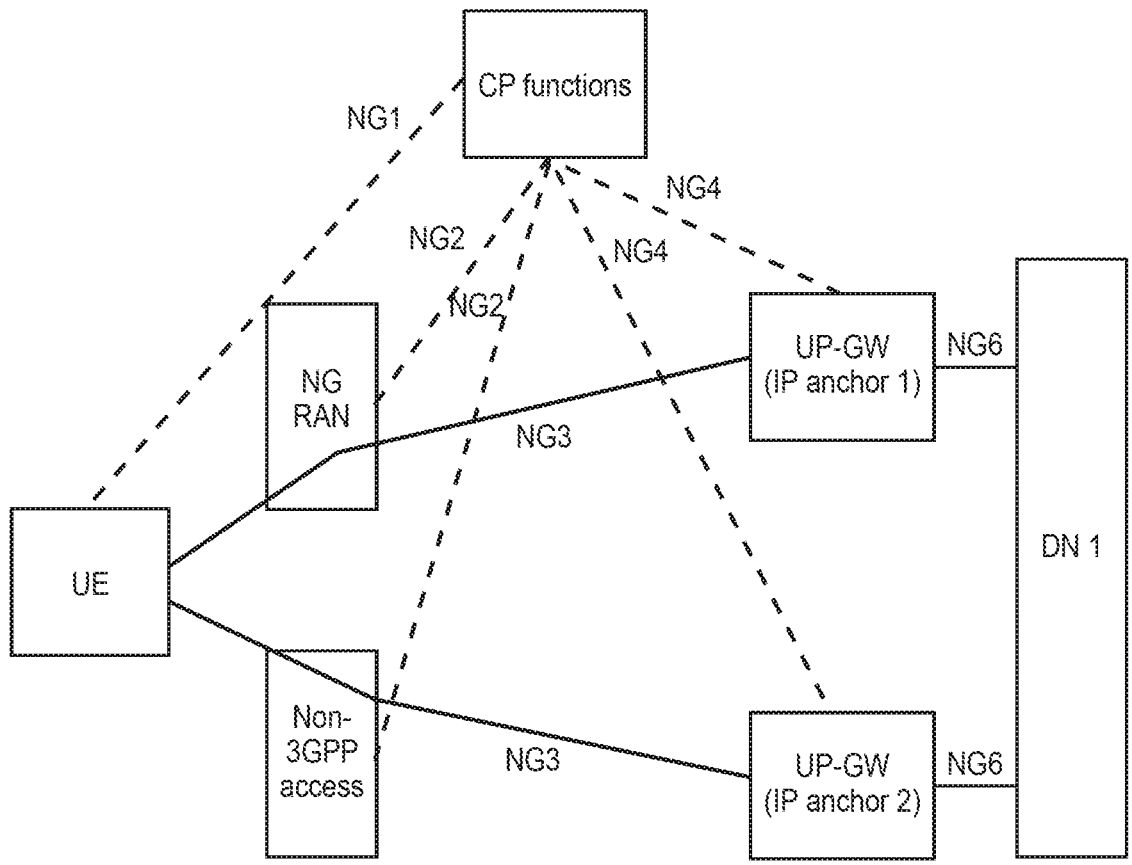
Figure 1C:
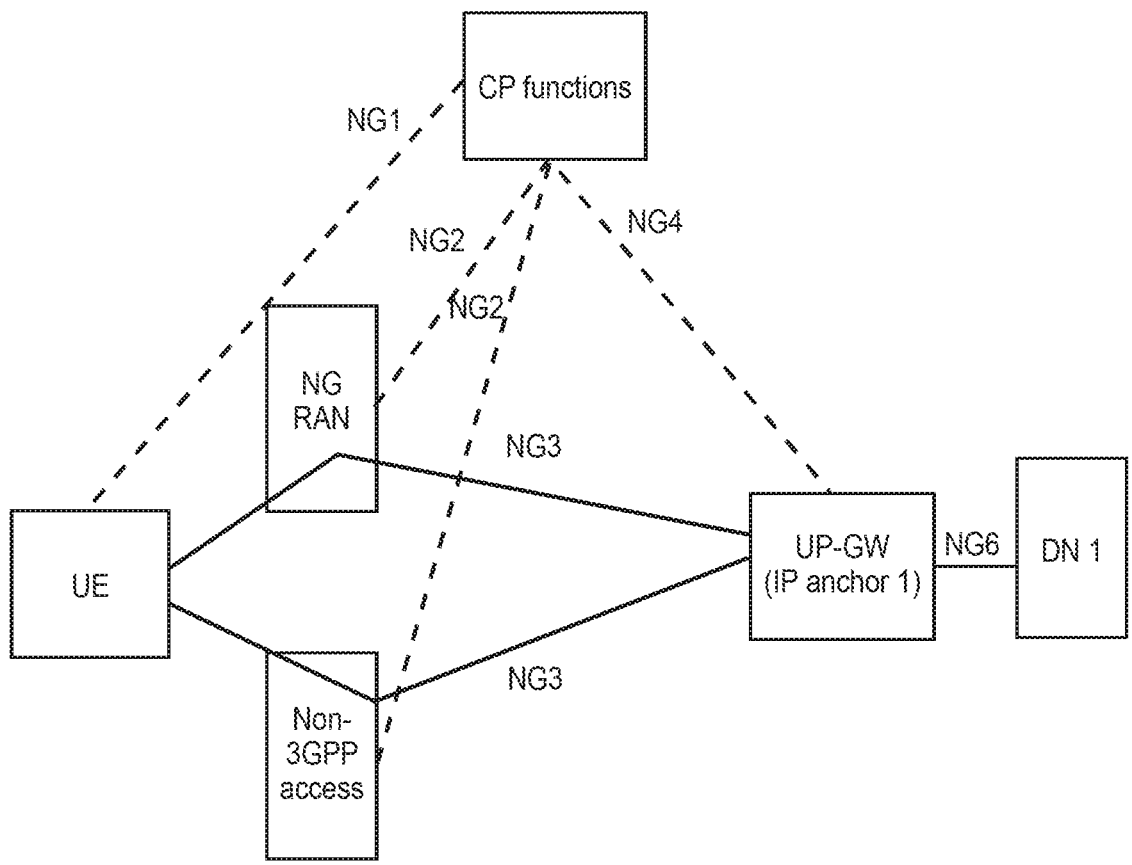

Referring initially to FIGS. 1A-C, architecture options for multiple packet data unit (PDU) sessions via different accesses are described in 3GPP TR 23.799, Study on Architecture for Next Generation System, V0.7.0. The options include the following example cases: multiple PDU sessions via different accesses to different data networks (FIG. 1A); multiple PDU sessions via different accesses to the same data network (FIG. 1B); and a PDU session via different accesses to the same data network, which can be referred to as a multi-access PDU session (FIG. 1C).

As shown, NG1 identifies the reference point for the control plane between a next generation (NextGen) user equipment (UE) and a Next Gen core network or core. NG2 identifies the reference point for the control plane between the NextGen radio access network or access network ((R)AN and NextGen core. NG3 identifies the reference point for the user plane between the NextGen (R)AN and NextGen Core. NG4 identifies the reference point between an NG Core Control function and NG User Plane Functions. NG5 identifies the reference point between the NG Control function and Application Functions. NG6 identifies the reference point between the NextGen Core and the data network. The data network may be an operator external public or private data network or an intra-operator data network. NG-U refers to the User Plane Interface between the gNB and Next Generation Core network (NGC). NG2 and NG-U can be used interchangeably herein, without limitation, unless otherwise specified. NG-C refers to the Control Plane Interface between the gNB and NGC. NG3 and NG-C can be used interchangeable herein, without limitation, unless otherwise specified. NR Uu refers to the radio interface between the gNB and UE. NG1 is the reference point over NR Uu between NextGen UE and NextGen Core. As used herein, the term gNB refers to a new radio (NR) node, for instance a logical access network node or a radio access network node.

As used herein, unless otherwise specified, Access Network (AN) and the Radio Access Network (RAN) can be used interchangeable, without limitation. Further, terms gNB, Access Network Node, Access Network Functions, Radio Access Network node, Radio Access Network Functions, can be used interchangeable herein, without limitation, unless otherwise specified. As used herein, the Access Network CP Functions (AN CP Functions) or AN CP Node may refer to the logical node that implements the control plane functions of the gNB, Access Network Node, Access Network Functions, Radio Access Network node, or Radio Access Network Functions. Similarly, Access Network UP Functions (AN UP Functions) or AN UP Node may refer to the logical node that implements the user plane functions of the gNB, Access Network Node, Access Network Functions, Radio Access Network Node, or Radio Access Network Functions.

Referring now to FIG. 2, an example system architecture 200 allows for decoupling and independent evolution of the access network and core network. As shown, an example deployment use case (Case 1) is for 3GPP access only, an example deployment use case (Case 2) is for non-3GPP access under an umbrella coverage of controlling 3GPP access, and another example deployment use case (Case 3) is for stand-alone non-3GPP access. While the decoupling between CP and UP is illustrated in the core network, similar decoupling between the control plane and the user plane may be implemented in the radio access network.

Figure 3:
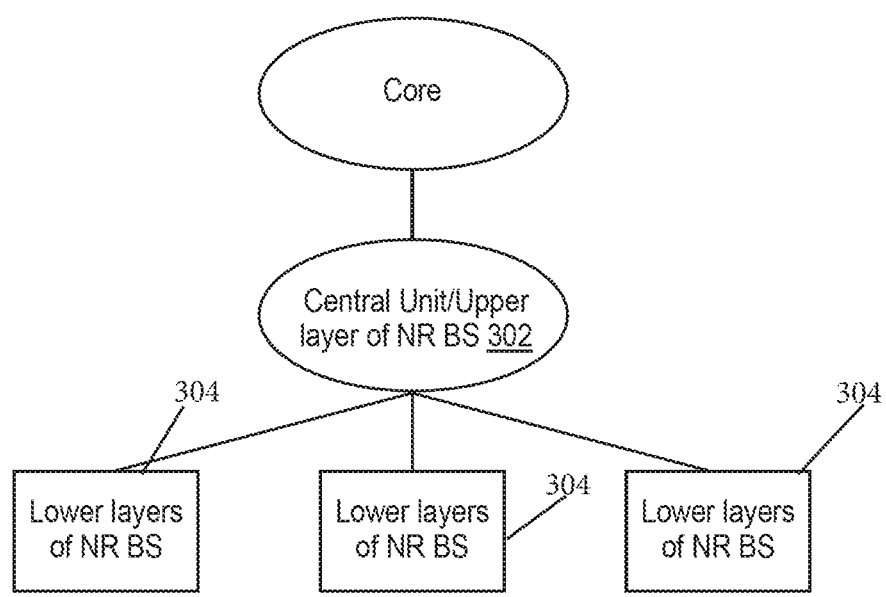
FIG. 3 is a diagram illustrating an example of centralized deployment.
Figure 4:
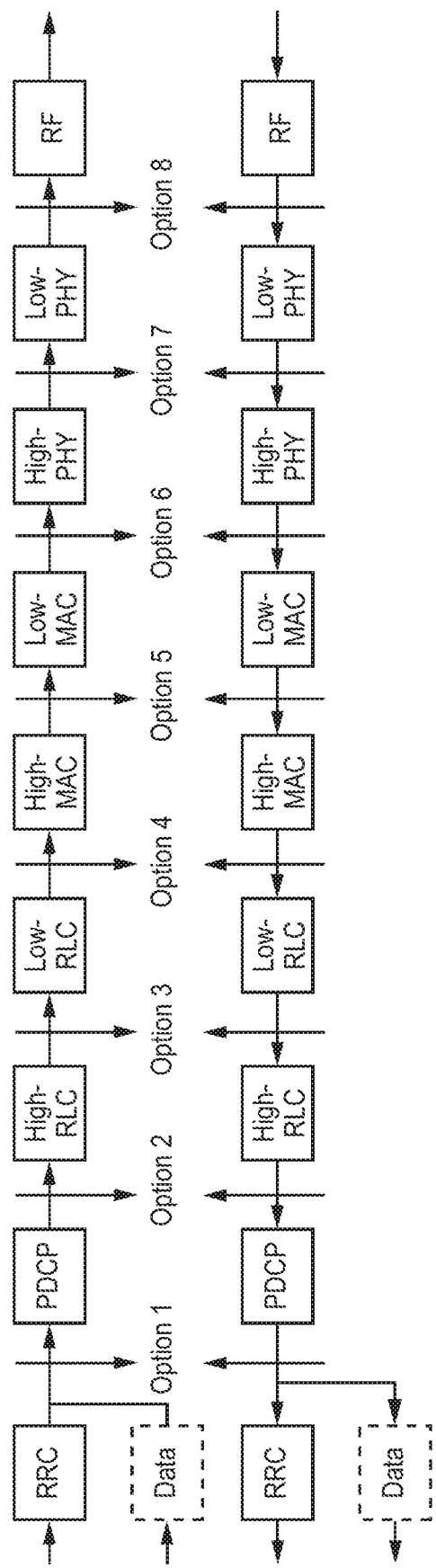
FIG. 4 is a diagram illustrating an example function split between a central and distributed unit.

Referring to FIG. 3, an example is shown in which upper layers of new RAN radio stacks are centralized in a central unit 302. Different protocol split options between the central unit 302 and lower layers of NR BS nodes 304 are possible. Example protocol split options are depicted in FIG. 4 as Options 1 to 8.

Figure 5:
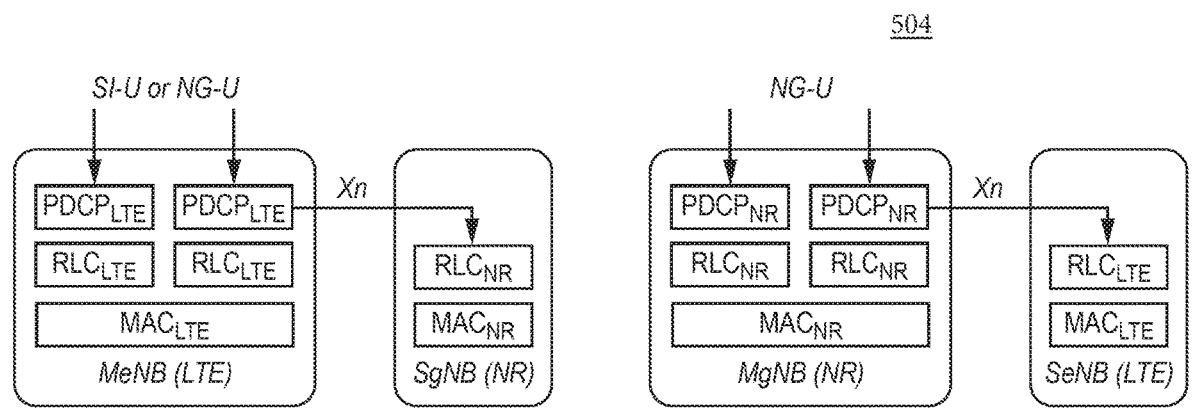
FIG. 5 is a diagram illustrating a split bearer via Master Cells Group (MCG).
Figure 6:
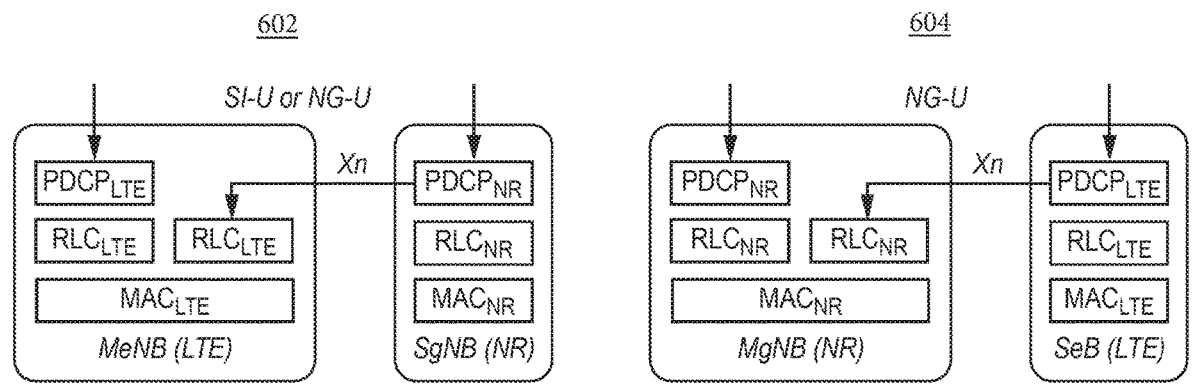
FIG. 6 is a diagram illustrating a Split Bearer via Secondary Cells group (SCG).
Figure 7:
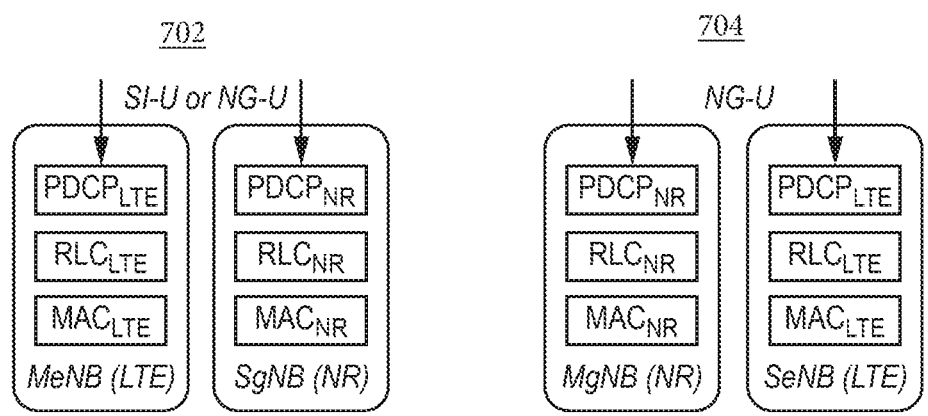
FIG. 7 is a diagram illustrating a secondary cells group bearer.

Turning now to bearer types for dual connectivity between LTE and NR, various types of bears support dual connectivity between LTE radio and new radio (NR). FIG. 5 illustrates an example of split bearer via a Master Cells group (MCG). In this example scenario, the core network may be the evolved packet core network (EPC) or the next generation (NextGen) core network (NG CN). Example 504 depicts the example scenario where LTE is the secondary cells group (SCG) and NR is the MCG. In this example scenario, the core network is the next generation (NextGen) core network (NG CN). FIG. 6 illustrates an example of split bearer via the Secondary Cells group (SCG). Example 602 depicts the scenario where LTE is the MCG and NR is the SCG. In this scenario, the core network may be the evolved packet core network (EPC) or the next generation (NextGen) core network (NG CN). Example 604 depicts the scenario where LTE is the SCG and NR is the MCG. In this scenario, the core network is the next generation (NextGen) core network (NG CN). FIG. 7 illustrates an example of the secondary cells group bearer. For instance, a bearer can be routed to the SCG directly from the core network. Example 702 depicts a scenario where LTE is the MCG. In this scenario, the core network may be the evolved packet core network (EPC) or the next generation (NextGen) core network (NG CN). Example 704 depicts a scenario where LTE is the SCG and NR is the MCG. In this scenario, the core network is the next generation (NextGen) core network (NG CN).

Figure 8:
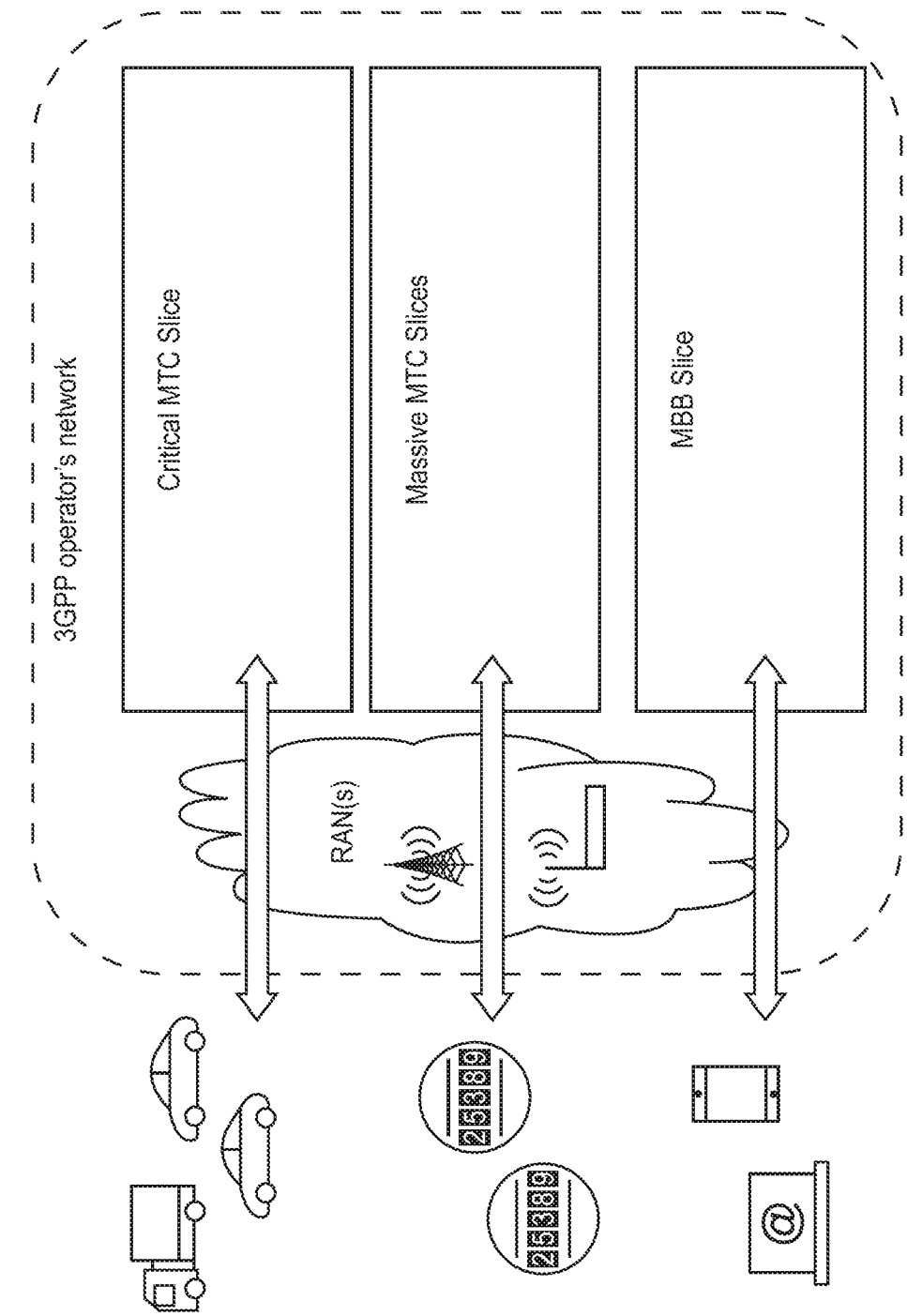
FIG. 8 and FIG. 9 are diagrams illustrating examples of uses of network slicing.
Figure 9:
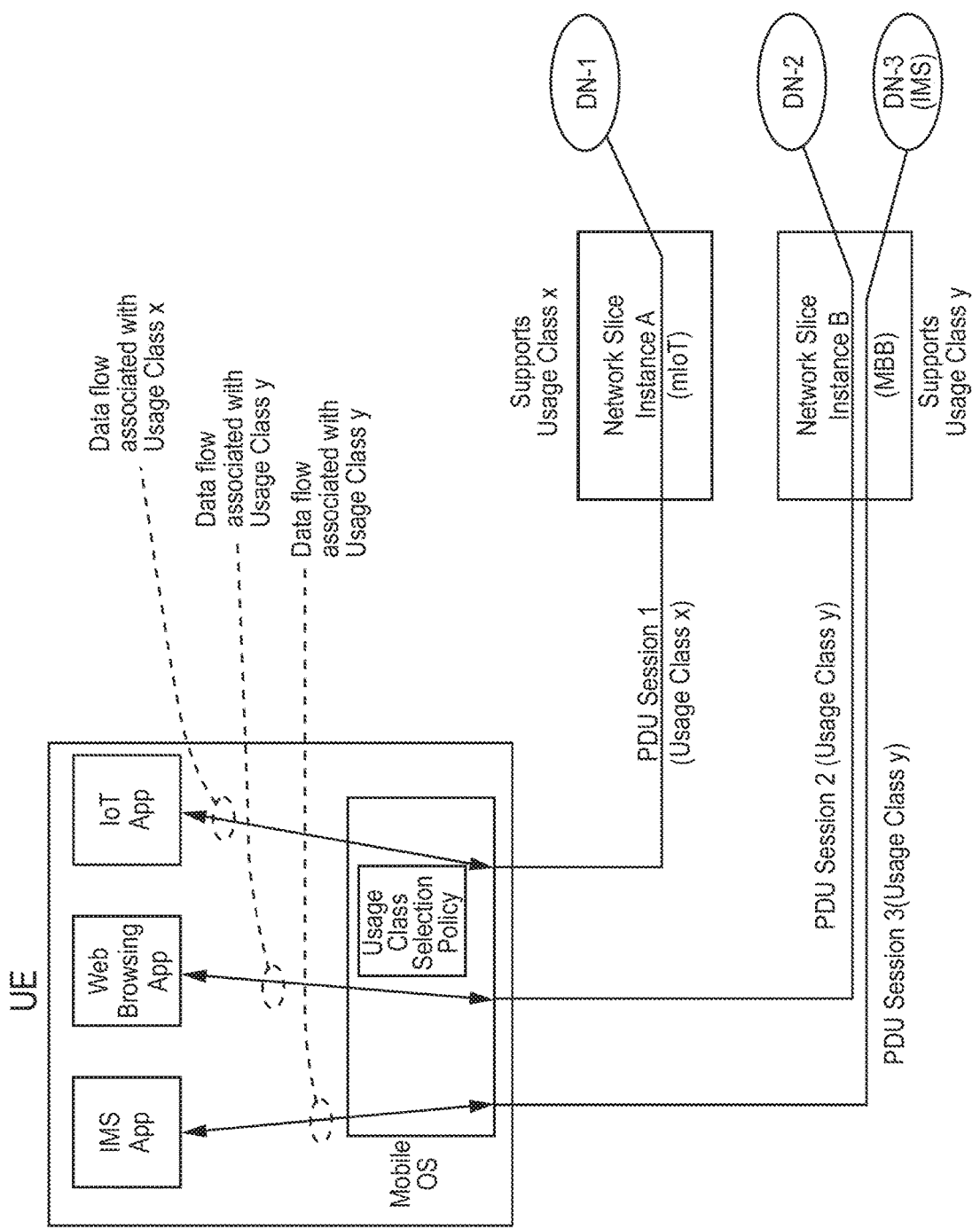

Turning now to network slicing, FIG. 8 depicts a high level illustration of an example network slicing concept. A network slice may be composed of a collection of logical network functions that support the communication service requirements of one or more particular use cases. In some cases, terminals can be directed to selected slices in a way that fulfills operator or user needs. For example, terminals (UEs) can be directed to selected slices based on subscriptions or terminal types. The network slicing may target a partition of the core network. In some cases, the Radio Access Network (RAN) may need specific functionality to support multiple slices or to support partitioning of resources for different network slices. An example of the use of network slicing is depicted in FIG. 9.

Figure 10:
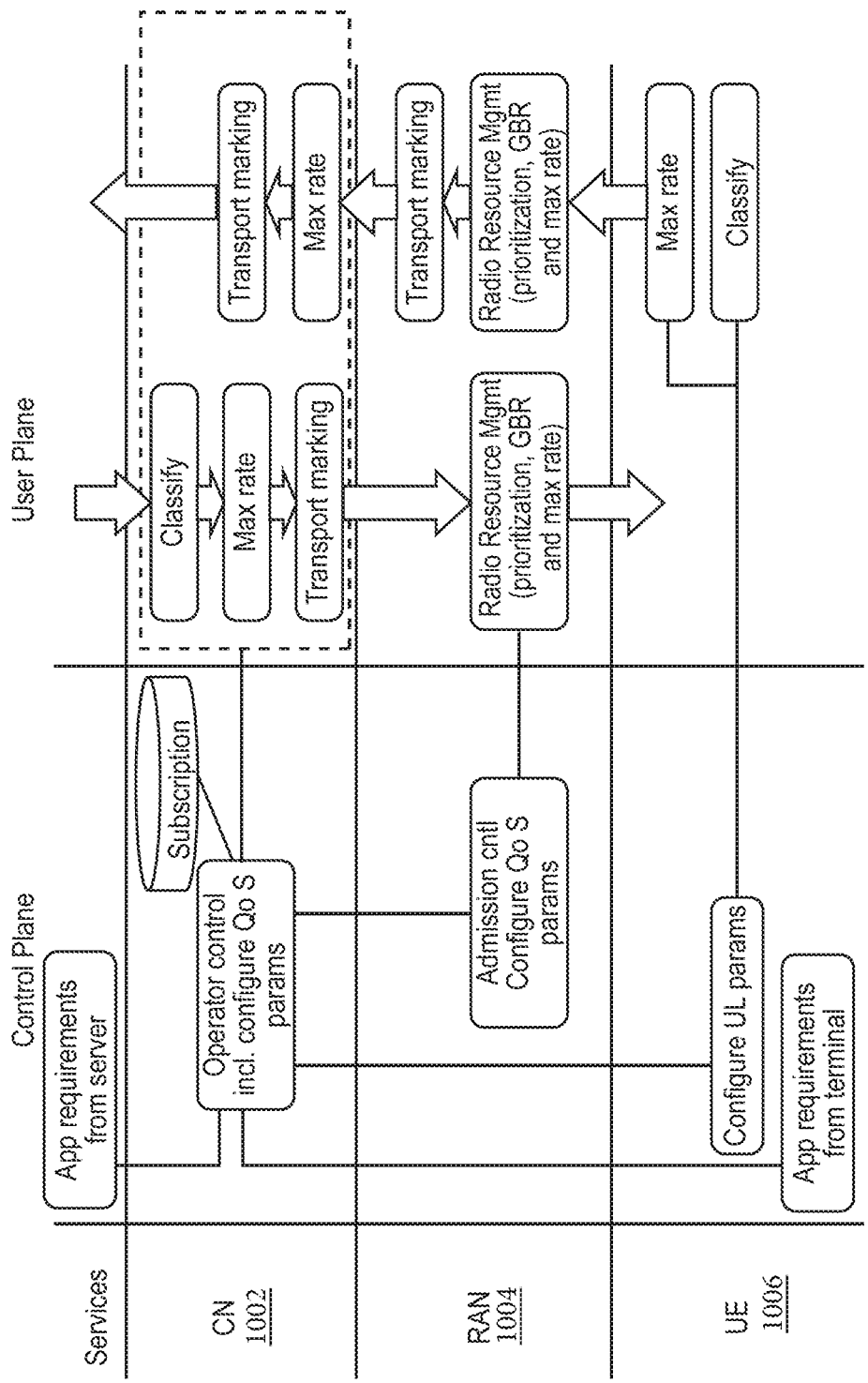
FIG. 10 is a diagram illustrating an example quality of service (QoS) Functional Split.

Turning now to a quality of service (QoS) framework for a NextGen system, FIG. 10 depicts an example distribution of QoS functionality between a core network (CN) 1002, a Radio Access Network (RAN) 1004, and a User Equipment (UE) 1006. QoS parameters may include one or more of the following, presented by way of example and without limitation:

Flow Priority Indicator (FPI), which may define priority per flow treatment at UP and AN functions. It may corresponds to scheduling priority as well as priority handling in case of congestion. This may be similar to the priority defined in the existing system with the standardized QCI.

Flow Priority Level (FPL), which may define the flow relative importance to access to AN resource. This may be similar to the allocation and retention priority (ARP) defined in the existing LTE system.

Packet Priority Indicator (PPI), which may define a scheduling priority per packet at UP and AN functions. Different PPIs may be marked to the packets in the same flow.

Packet Discard Priority Indicator (PDPI), which may define the discard priority per packet in case of congestion, for example, to differentiate content within the same flow. In some cases, the PDPI marking in the downlink is set by the UP functions and is used by the AN.

Maximum Flow Bitrate (DL, UL): UL and DL bitrate value applicable for a single flow or aggregation of flows. It may indicate the maximum bitrate authorized for the data flow identified by a flow descriptor.

Guarantee Flow Bitrate (DL, UL): UL and DL bitrate value applicable for a single flow or aggregation of flows. It may indicate the guaranteed bitrate authorized for the data flow.

Session Bitrate (DL, UL): UL and DL bitrate value applicable for the established user session. It may indicate the maximum bitrate authorized for user session.

Reflective QoS Indication (RQI): DL indication applicable for a single flow or aggregation of flows. When used as U-plane marking, it may be determined by the UP functions and may be applied on a per-packet basis for the lifetime of a flow.

Resource Type: GBR or Non-GBR.

Packet Delay Budget, which may define an upper bound for the time that a packet may be delayed between the UE and the UP function.

Packet Error Loss Rate, which may define an upper bound for the rate of SDUs (e.g., IP packets) that have been processed by the sender of a data link layer protocol (e.g., RLC in E UTRAN), but that are not successfully delivered by the corresponding receiver to the upper layer (e.g., PDCP in E-UTRAN).

Reliability, which may define the success probability of transmitting X bytes within a latency bound. For example, with respect to URLL, the target for user plane latency may be 0.5 ms for UL, and 0.5 ms for DL, which implies a 1 ms roundtrip delay, or equivalently a maximum of 1 ms retransmission latency. A reliability of 1-10-5 within 1 ms latency implies a reliability of 1-10-5 with retransmission latency of no more than 1 ms. This is the case for URLL applications with target reliability of 1-10-5 within 1 ms latency bound.

Allocation and Retention Priority, which may contain information about the priority level, the pre-emption capability, and the pre-emption vulnerability. In some cases, this priority level defines the relative importance of a resource request.

QoS ID, which may be used as a pointer to a QoS profile.

As used herein, unless otherwise specified, PDU (Packet Data Unit) Connectivity Service refers to a service that provides an exchange of PDUs between a UE and a data network. A PDU Session, unless otherwise specified, refers to an association between the UE and a data network that provides a PDU connectivity service. The type of the association may include IP type, Ethernet type, and non-IP type. A PDU Session of IP Type may refer to an association between the UE and an IP data network. A PDU session may include one or more service data unit flows. As used herein, unless otherwise specified, an application detection filter refers to logic used to detect packets generated by an application based on extended inspection of those packets (e.g., header and/or payload information). The dynamics of packet flows may also be detected. An application identifier, unless otherwise specified, refers to an identifier referring to a specific application detection filter. A Service Data unit Flow (SDF), unless otherwise specified, refers to an aggregate set of packet flows potentially carried through a policy control and an enforcement function that matches a service data flow template. For convenience, this may also be referred to as a packet flow, where a packet flow may be a specific user data flow from and/or to the UE. Multiple packet flows, each corresponding to a specific service data flow filter, may belong to a SDF.

As used herein, unless otherwise specified, a service data flow filter refers to a set of packet flow header parameter values/ranges used to identify one or more of the packet flows. This can also be referred to herein as a traffic flow filter (TFF), and can be classified as a flow descriptor, which can be specified for DL, UL, or both. A service data flow filter template may refer to a set of service data flow filters or application identifiers that may be required for defining a SDF. This can also be referred to herein as a Traffic Flow Template (TFT). A service data flow filter identifier may be a scalar that is unique for a specific service data flow (SDF) filter (e.g., used on the interface between the CN CP Policy Function and the Enforcement Function in the CP UP), within a PDU session. A service data flow template may refer to the set of service data flow filters referring to an application detection filter, and may be required for defining a service data flow. A service identifier refers to an identifier for a service. The service identifier may provide the most detailed identification, specified for flow based charging, of a service data flow. In some cases, a concrete instance of a service may be identified if additional AF information is available. An IP CAN session may refer to an association between a UE and an IP network. AN IP CAN session can be viewed as a PDU session of IP type. An IP CAN bearer may refer to an IP transmission path of defined capacity, delay and bit error rate, etc. From an end to end system perspective, an IP CAN bearer may include a concatenation of an EPS bearer, Radio Access bearer (RAB), and Data Radio bearer (DRB). As used herein, unless otherwise specified, a packet mark (or marker) refers to a mark included in the packet encapsulating header in order to uniquely associate data packets characterized by a given Traffic Flow Filter (TFF) or Traffic Flow filter Template (TFT) with predefined matching QoS profile(s). Each QoS profile may be associated and identified by a mark. As used herein, unless otherwise specified, a QoS profile may refer to a combination of all or a subset of QoS parameters as defined above. For Downlink traffic, in some cases, a mark may be applied to each packet by UP functions located in the CN before transferring the packet toward the access network. In the access network, the UP functions may apply a packet mark before transmitting the packet toward the UE over the radio interface. In the uplink, the UE may apply a packet mark before transferring the packet toward the access network. The access network may do the same before relaying the packet toward the core network. A QoS rule generally refers to information that enables the detection of a service data flow, and defines its associated QoS parameters or profiles, including the QoS mark for example.

Figure 11:
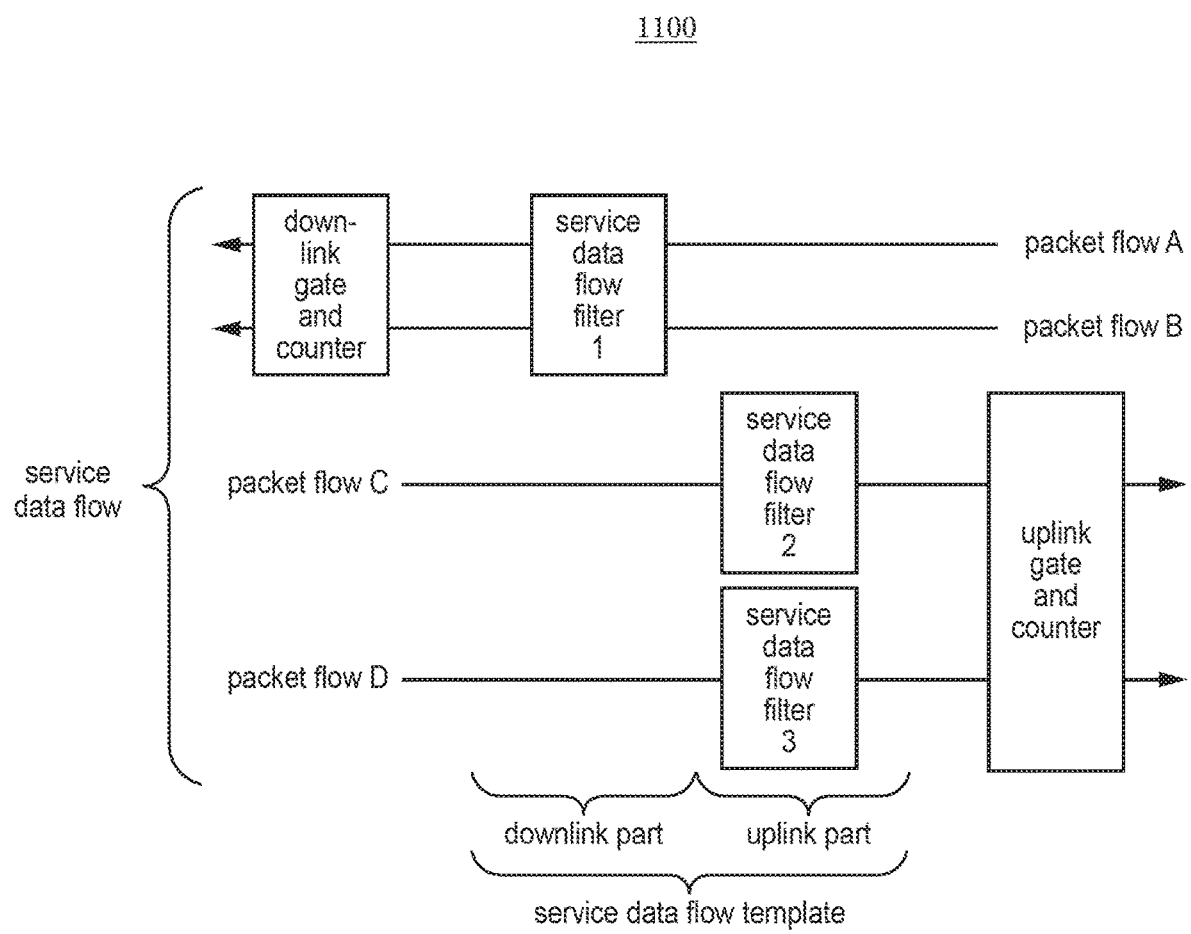
FIG. 11 is a diagram illustrating a relationship of a service data flow, packet flow, service data flow template, and service data flow filter.
Figure 12:
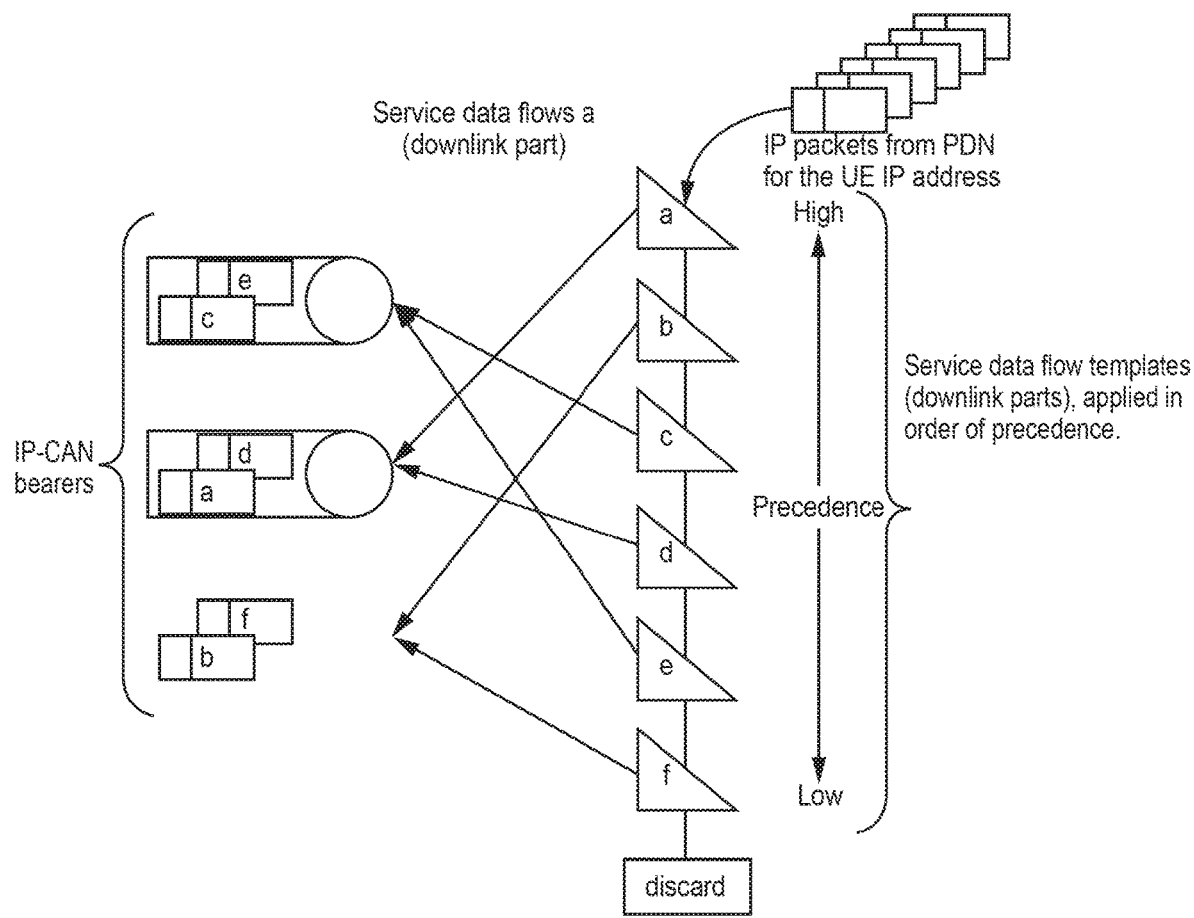
FIG. 12 is a diagram illustrating the service data flow template role in detecting the downlink part of a service data flow.
Figure 13:
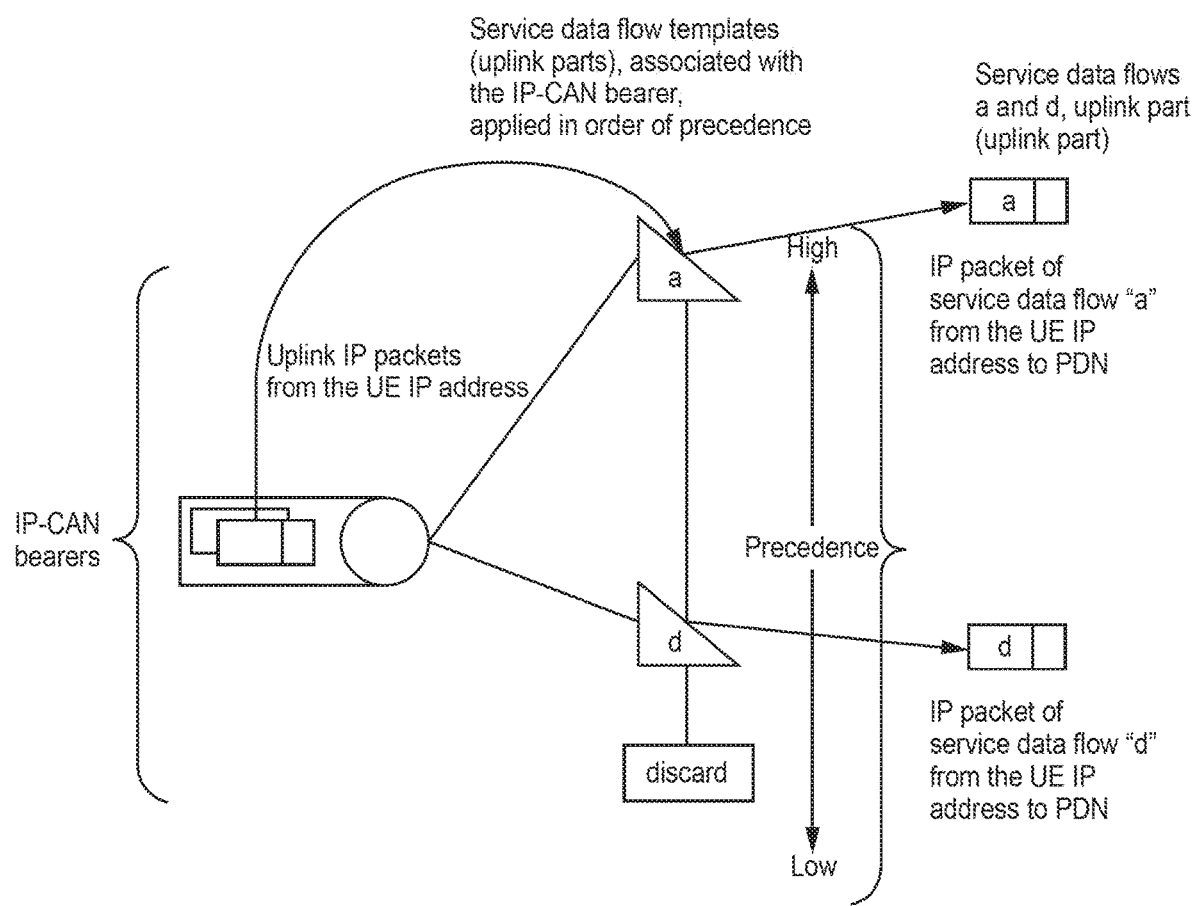
FIG. 13 is a diagram illustrating the service data flow template role in detecting the uplink part of a service data flow.
Figure 14:
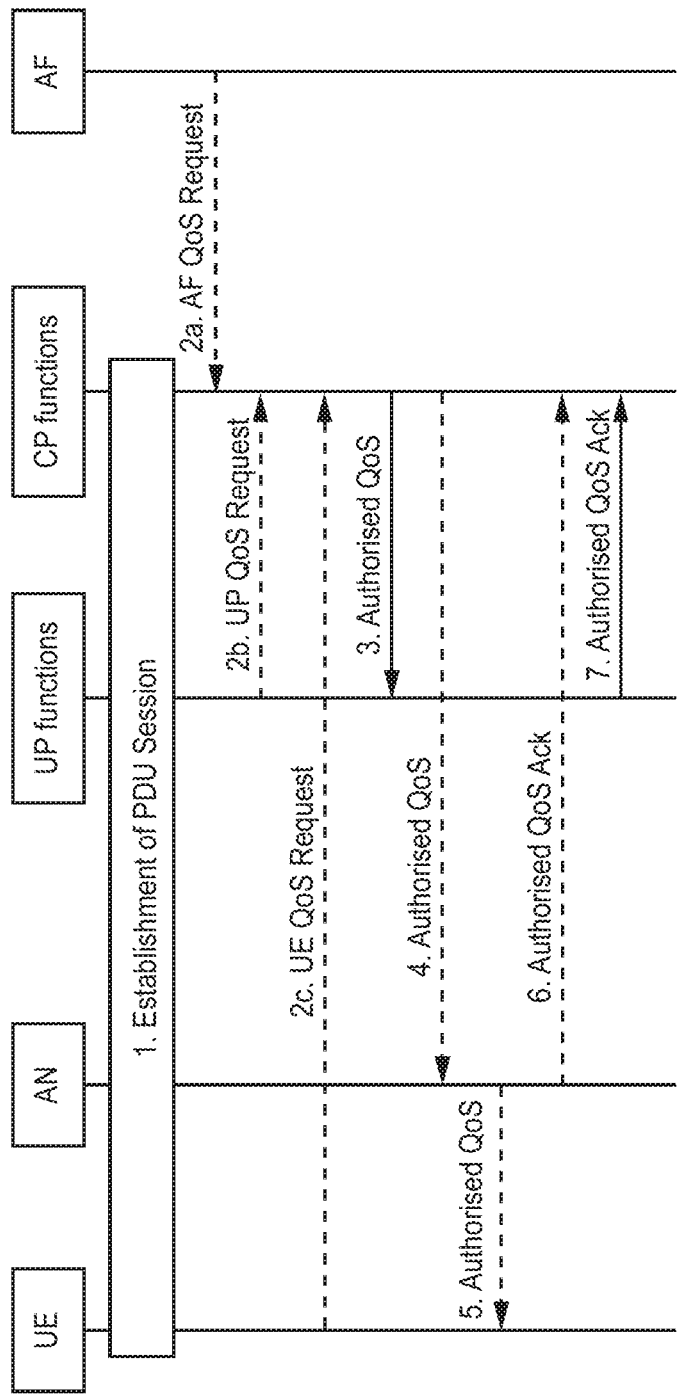
FIG. 14 is a diagram illustrating a flow based QoS architecture with control plane signaling.

Referring now to FIG. 11, an example system 1100 illustrates a relationship between a service data flow, a packet flow, a service data flow template, and service data flow filter. For an IP type PDU session, the service data flow filters that identify the service data flow may identify a pattern for matching the IP 5 tuple (e.g., source IP address or IPv6 network prefix, destination IP address or IPv6 network prefix, source port number, destination port number, protocol ID of the protocol above IP). An example detection process that identifies the packets belonging to a service data flow is illustrated in FIG. 12 (downlink) and FIG. 13 (uplink). For downlink traffic, the downlink parts of the service data flow templates associated with the IP-CAN session for the destination address are candidates for matching in the detection process. For uplink traffic, the uplink parts of all the service data flow templates associated with the IP CAN bearer, are candidates for matching in the detection process. FIG. 14 is an example of call flow describing the control plane signaling from 3GPP TR 23.799.

Figure 15:
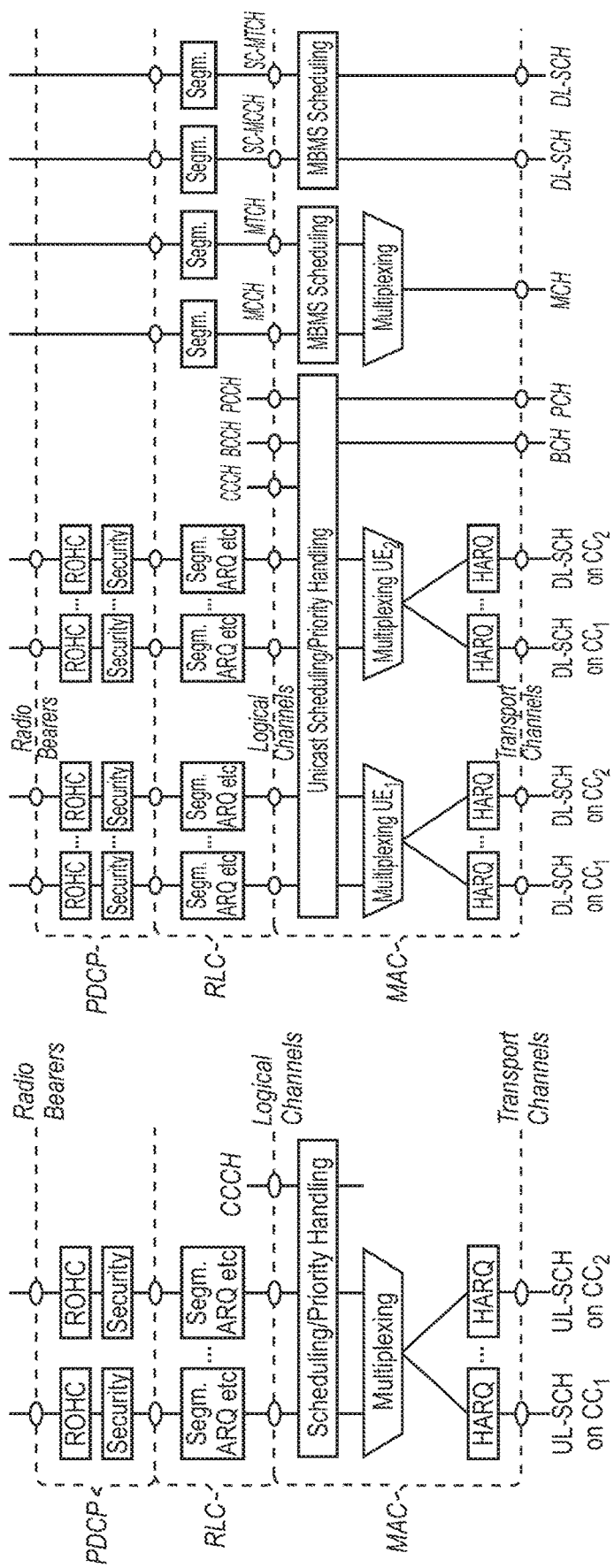
FIG. 15 is a diagram illustrating a Long Term Evolution (LTE) Layer 2 Structure.

Turning now to logical channels in Long Term Evolution (LTE), the physical layer offers information transfer services to MAC and higher layers. The physical layer transport services are described by how and with what characteristics data are transferred over the radio interface. This is referred to as "Transport Channel". The transport channels are SAPs between MAC and Layer 1, logical channels are SAPs between MAC and RLC. The MAC layer provides data transfer services on logical channels. A set of logical channel types is defined for different kinds of data transfer services as offered by MAC. Each logical channel type is defined by what type of information is transferred. In LTE, MAC provides the control and traffic channels. The mapping of logical channels on transport channels depends on the multiplexing that is configured by RRC. FIG. 15 depicts an example LTE data link (L2) structure and LTE logical channels.

Figure 16:
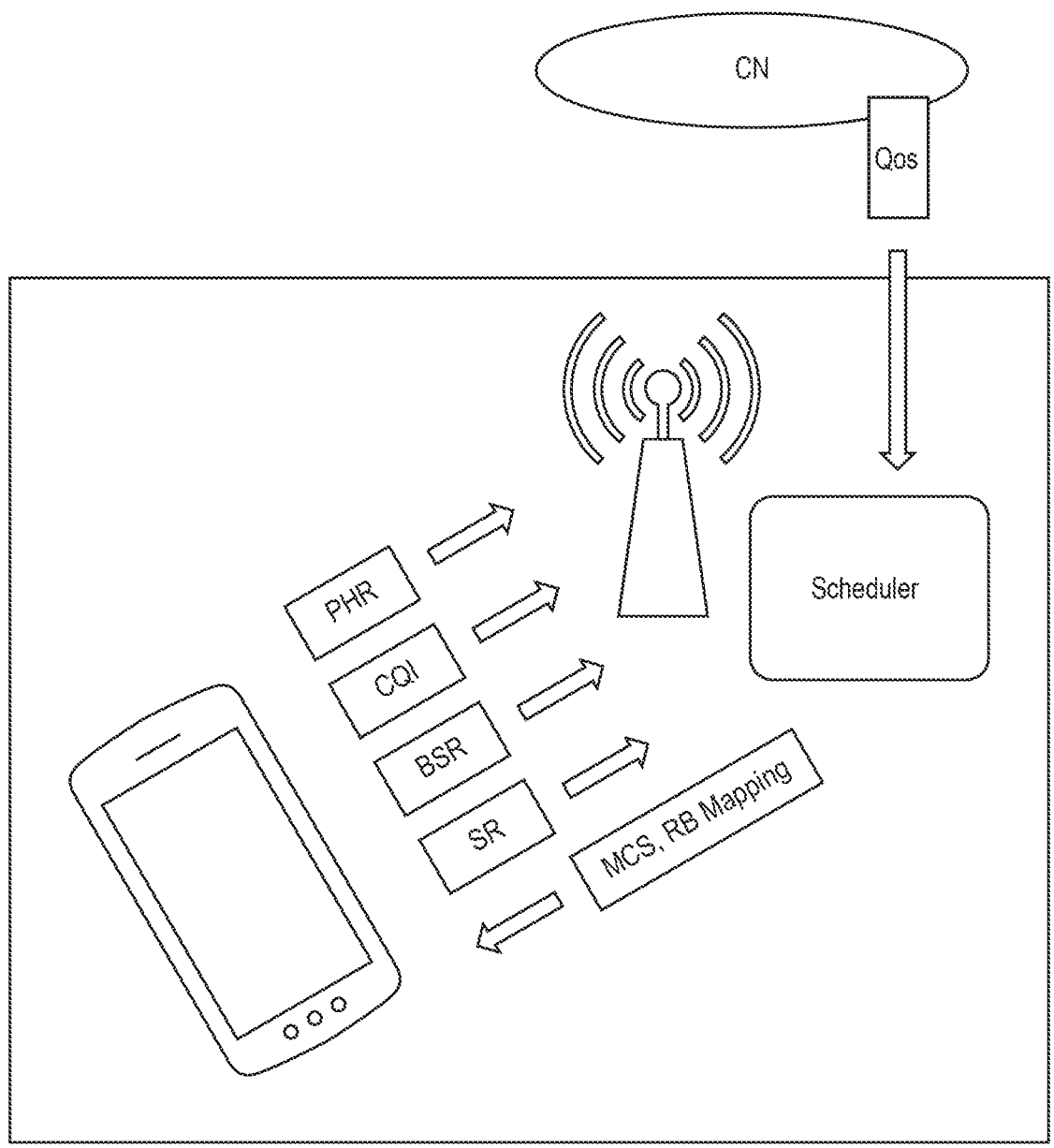
FIG. 16 is a diagram illustrating a scheduling example in LTE.

Turning now to scheduling and QoS differentiation in LTE, with reference to FIG. 16, a scheduler in LTE makes use of the QoS configuration from the core network and input from the UE, such as the Buffer Status Report (BSR) from the UE, Power Headroom Report (PHR), and the Channel State Indicator (CSI), to make scheduling decision and provide QoS differentiation for downlink traffic as well as uplink traffic. In LTE, the QoS differentiation is provided at the granularity of the bearer level.

With respect to logical channel prioritization, a logical channel prioritization procedure can be applied for uplink transmission when a new transmission is performed. In an example, the RRC controls the scheduling of uplink data by signaling, for each logical channel, a priority where an increasing priority value indicates a lower priority level, a prioritisedBitRate that sets the Prioritized Bit Rate (PBR), and a bucketSizeDuration that sets the Bucket Size Duration (BSD). For NB-IoT, prioritisedBitRate, bucketSizeDuration and the corresponding steps of the Logical Channel Prioritization procedure (e.g., Step 1 and Step 2 below) are not applicable.

In some cases, the MAC entity maintains a variable Bj for each logical channel j. Bj is initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it is set to the bucket size. The bucket size of a logical channel is equal to PBR×BSD, where PBR and BSD are configured by upper layers.

In some cases, the MAC entity performs the following Logical Channel Prioritization procedure when a new transmission is performed. The MAC entity allocates resources to the logical channels in the following steps. At Step 1, all the logical channels with Bj>0 are allocated resources in a decreasing priority order. If the PBR of a logical channel is set to "infinity", the MAC entity allocates resources for all the data that is available for transmission on the logical channel before meeting the PBR of the lower priority logical channel(s). At Step 2, the MAC entity decrements Bj by the total size of MAC SDUs served to logical channel j in Step 1. The value of Bj can be negative. At Step 3, in some cases, if any resources remain, all the logical channels are served in a strict decreasing priority order (regardless of the value of Bj) until either the data for that logical channel or the UL grant is exhausted, whichever comes first. Logical channels configured with equal priority should be served equally.

For the example Logical Channel Prioritization procedure, the MAC entity takes into account the following relative priority in decreasing order: MAC control element for Cell Radio Network Temporary Identifier (C-RNTI) or data from UL-CCCH; MAC control element for BSR, with exception of BSR included for padding; MAC control element for PHR, Extended PHR, or Dual Connectivity PHR; MAC control element for Sidelink BSR, with exception of Sidelink BSR included for padding; data from any Logical Channel, except data from UL-CCCH; MAC control element for BSR included for padding; MAC control element for Sidelink BSR included for padding.

When the MAC entity is requested to transmit multiple MAC PDUs in one TTI, steps 1 to 3 above and the associated rules may be applied either to each grant independently or to the sum of the capacities of the grants. Also, the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed. The MAC entity multiplexes MAC control elements and MAC SDUs in a MAC PDU according to the above.

Figure 17:
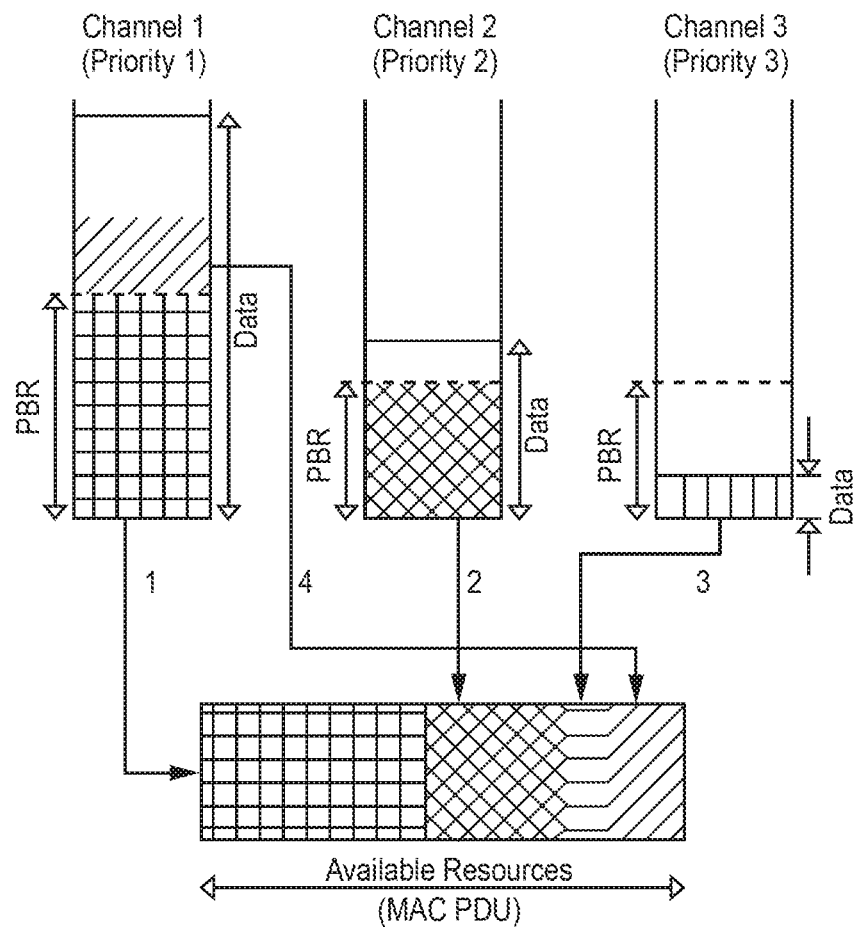
FIG. 17 is a diagram illustrating an example of LTE logical channel prioritization for MAC multiplexing.

An example of LTE logical channel prioritization operation for MAC multiplexing is depicted in FIG. 17, wherein channel 1, channel 2, and channel 3 are in a decreasing order of priority. In accordance with the example, channel 1 is first served up to its PBR, channel 2 is served up to its PBR, and then channel 3 is served with as much data as is available (since in this example the amount of data available is less than would be permitted by the PBR configured for that channel). After that, the remaining space in the MAC PDU is filled with data from the channel 1, which is of the highest priority, until there is no further room in the MAC PDU or there is no further data from channel 1. If there is still room after serving the channel 1, channel 2 may be served in a similar way.

Turning now to buffer status reporting, buffer status reporting may be used to provide the serving eNB with information about the amount of data available for transmission in the UL buffers associated with the MAC entity. RRC controls BSR reporting by configuring the timers (periodicBSR-Timer, retxBSR-Timer and logicalChannelSR-ProhibitTimer) and by, for each logical channel, optionally signaling logicalChannelGroup, which allocates the logical channel to an LCG. A Buffer Status Report (BSR) may be triggered if any of the following events occur:

Arrival of data with higher priority than currently in the transmission buffer that is, data in a logical-channel group with higher priority than the one currently being transmitted as this may impact the scheduling decision Change of serving cell, in which case a buffer-status report is useful to provide the new serving cell with information about the situation in the terminal Periodically as controlled by a timer Instead of padding. If the amount of padding required to match the scheduled transport block size is larger than a buffer-status report, a buffer-status report is inserted In addition to buffer status, the amount of transmission power available in each terminal may also be relevant for the uplink scheduler. Power Headroom Reporting (PHR) is reported to the terminal in a similar manner as BSR on UL-SCH. PHR may be triggered periodically as controlled by a timer, by a change in path loss (e.g., when the difference between the current power headroom and the last report is larger than a configurable threshold), or in place of padding.

Figure 18:
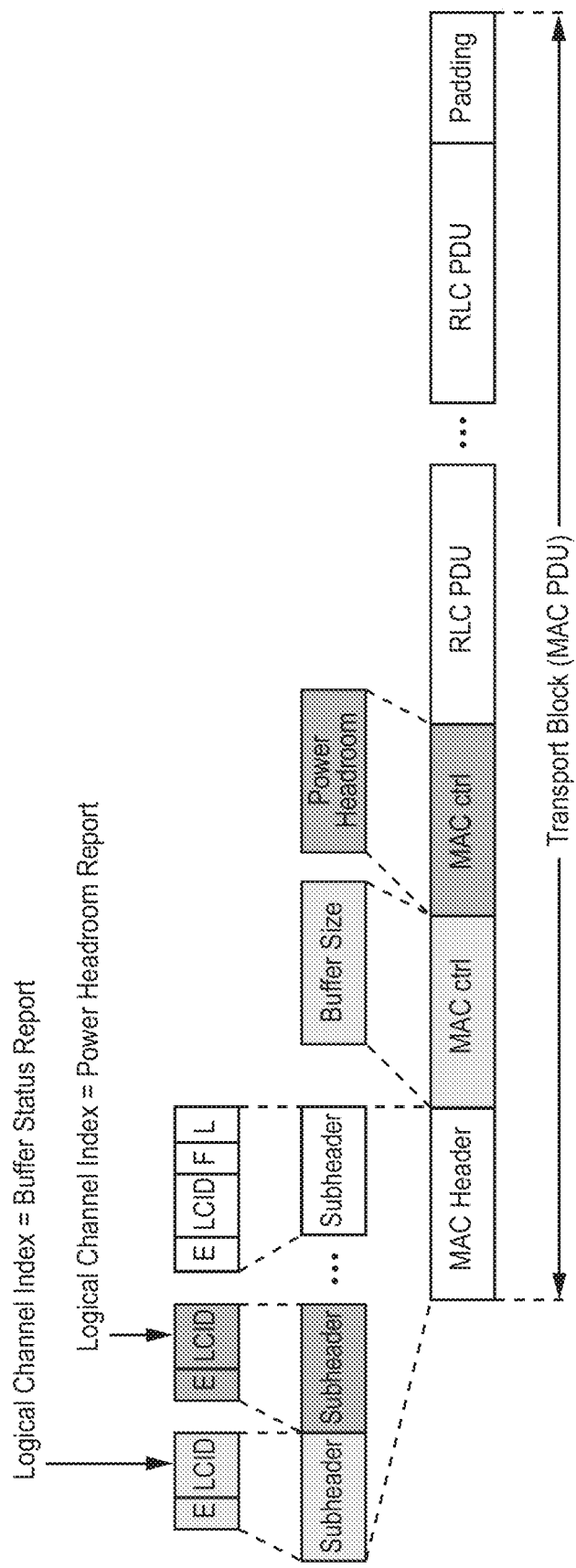
FIG. 18 is a diagram illustrating the example signaling of buffer status and power headroom reports.

Different types of PHR are defined. Type 1 reporting reflects the power headroom assuming PUSCH-only transmission on the carrier. Type 2 report assumes PUSCH and PUCCH transmission. Type 1 reports are provided for all carriers while Type 2 reports are for primary component carrier only since PUCCH can be transmitted on primary component carrier only. Signaling of buffer status and power headroom reports is illustrated in FIG. 18.

With respect to the scheduling request in LTE, the scheduler needs knowledge about terminals having data to transmit and therefore needs to be scheduled uplink resources. There is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request. Scheduling requests are used for terminals not having a valid scheduling grant. The scheduling request is a simple flag (bit) raised by the terminal to request uplink resources from the uplink scheduler. Each terminal can be assigned a dedicated PUCCH scheduling request resource, occurring every nth subframe. With a dedicated scheduling-request mechanism, there is no need to provide the identity of the terminal requesting to be scheduled as the identity of the terminal is implicitly known from the resources upon which the request is transmitted. When data with higher priority than already existing in the transmit buffers arrives at the terminal and the terminal has no grant, and hence cannot transmit the data, the terminal transmits a scheduling request at the next possible instant. Upon reception of the request, the scheduler can assign a grant to the terminal. If the terminal does not receive a scheduling grant until the next possible scheduling-request instant, then the scheduling request is repeated. In the case of carrier aggregation, the scheduling request is transmitted on the primary component carrier, in line with the general principle of PUCCH transmission on the primary component carrier only. There is only a single scheduling-request bit, irrespective of the number of uplink component carriers the terminal is capable of.

In the uplink, E-UTRAN can dynamically allocate resources (Physical Resource Blocks (PRBs) and Modulation and Coding Scheme, MCS) to UEs at each Transmission Time Interval (TTI) via the C-RNTI on PDCCH(s). The resources are allocated in resource block pairs. Resource-block pairs correspond to a time-frequency unit of 1 ms times 180 kHz. A UE always monitors the PDCCH(s) in order to find possible allocation for uplink transmission when its downlink reception is enabled (activity governed by Discontinuous reception (DRX) when configured). When carrier aggregation (CA) is configured, the same C-RNTI applies to all serving cells.

In addition, E-UTRAN can allocate a semi-persistent uplink resource for the first HARQ transmissions and potentially retransmissions to UEs. The RRC can define the periodicity of the semi-persistent uplink grant, and the Physical Downlink Control Channel (PDCCH) can indicate whether the uplink grant is a semi-persistent one (e.g., whether it can be implicitly reused in the following TTIs according to the periodicity defined by RRC).

In the sub-frames where the UE has semi-persistent uplink resource, if the UE cannot find its C-RNTI on the PDCCH(s), an uplink transmission according to the semi-persistent allocation that the UE has been assigned in the TTI can be made. In some examples, the network performs decoding of the pre-defined PRBs according to the pre-defined MCS. Otherwise, in the sub-frames where the UE has semi-persistent uplink resource, for example, if the UE finds its C-RNTI on the PDCCH(s), the PDCCH allocation overrides the persistent allocation for that TTI and the UE's transmission follows the PDCCH allocation, not the semi-persistent allocation. Retransmissions may be either implicitly allocated, in which case the UE uses the semi-persistent uplink allocation, or explicitly allocated via PDCCH(s), in which case the UE does not follow the semi-persistent allocation. In some cases, there is no blind decoding in uplink, and when the UE does not have enough data to fill the allocated resource, padding is used.

When the UE is provided with valid uplink grants in several serving cells in one TTI, the order in which the grants are processed during logical channel prioritization, and whether joint or serial processing is applied, in some cases, are left up to UE implementation, while adhering to transmission restrictions of a logical channel via LTE Augmented Access (LAA) SCells.

Similarly, with respect to the downlink, in some cases, semi-persistent uplink resources can only be configured for the PCell and only PDCCH allocations for the PCell can override the semi-persistent allocation. When Downlink Control (DC) is configured, in some cases, semi-persistent uplink resources can only be configured for the PCell or PSCell. In various examples, only PDCCH allocations for the PCell can override the semi-persistent allocation for Pcell, and only PDCCH allocations for the PSCell can override the semi-persistent allocation for PSCell.

In LTE, the transmission time interval (TTI) is defined has a fixed duration of the same value (e.g., 1 ms) in both UL and DL. The TTI duration (e.g., the TTI length) is the smallest periodicity of scheduling occasions (PDCCH monitoring period). For example, in the case of dynamic UL scheduling, the network can signal to the UE, a scheduling grant information every TTI. In the case of a semi static resource allocation scheme like Semi-Persistent Scheduling (SPS), UL scheduling opportunity periodicity may be bigger than a TTI duration as the network tries to reduce scheduling overhead by providing to the UE through semi-static signaling (e.g. RRC signaling), a scheduling grant with an indication that the scheduling grant applies every nth sub-frames, i.e. until further notice. Once configured through RRC signaling, the SPS scheduling grant may be activated or de-activated with (E)PDCCH signaling using the SPS C-RNTI. In LTE, it so happens that the PDCCH monitoring period and UL transmission time interval are the same. Similarly, the PDCCH monitoring period and DL transmission time interval are the same. Table 1 below provide a summary of the NR numerologies with their key parameters. There is a proportional relationship between the duration of symbols, the duration of slots or mini-slots of the numerologies.

In Table 1.

Table 2, and Table 3 below, the parameter $N_{symb}^{slot}$ represents the number of OFDM symbols per slot; the parameter $N_{slot}^{frame,\mu}$ represents the number of slots per radio frame; and the parameter $N_{slot}^{subframe,\mu}$ represents the number of slots per radio subframe.

TABLE 1

Example Illustration of Proportional Relationship between the durations of Symbols, Slots (or mini-slots) across NR numerologies

| Numerology $\mu$ | $\Delta f = 2^\mu \cdot 15$[kHz] | Cyclic prefix | Symbol duration (μs) | Symbol + CP (μs) | $N_{symb}^{slot}$ | Slot duration (μs) | Slot duration + CP (μs) | Mini-Slot |
|---|---|---|---|---|---|---|---|---|
| 0 | 15 | Normal | 66.67 (1/1) | 71.43 | 14 | 933.33 (1/1) | 1000 | Configurable number of symbols, potentially more than one mini-slot configuration per numerology |
| 1 | 30 | Normal | 33.33 (1/2) | 35.71 | 14 | 466.67 (1/2) | 500 | Configurable number of symbols, potentially more than one mini-slot configuration per numerology |
| 2 | 60 | Normal, Extended | 16.67 (1/4) | 17.86 | 14 | 233.33 (1/4) | 250 | Configurable number of symbols, potentially more than one mini-slot configuration per numerology |
| 3 | 120 | Normal | 8.33 (1/8) | 8.93 | 14 | 116.67 (1/8) | 125 | Configurable number of symbols, potentially more than one mini-slot configuration per numerology |
| 4 | 240 | Normal | 4.17 (1/16) | 4.46 | 14 | 58.33 (1/16) | 62.5 | Configurable number of symbols, potentially more than one mini-slot configuration per numerology |
| 5 | 480 | Normal | 2.08 (1/32) | 2.23 | 14 | 29.17 (1/32) | 31.25 | Configurable number of symbols, potentially more than one mini-slot configuration per numerology |

TABLE 2

Number of OFDM symbols per slot, $N_{symb}^{slot}$, for normal cyclic prefix

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 3

Number of OFDM symbols per slot, $N_{slot}^{symb, \mu}$, for extended cyclic prefix

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

It is recognized herein that the existing LTE design provides limited support for UL service differentiation. The QoS requirements and/or service differentiation mappings to UL grants is not deterministic. The highest QoS requirements are forced on all multiplexed services. This leads to a sub-optimal use of radio resources. 3GPP adopted this non-deterministic service based grant design based on complexity vs. performance trade-off analysis. With a new network generation wireless system architecture, LTE design decisions for UL QoS differentiation may be revisited. It is recognized herein that LTE limitations may be worse in light of the diverse 5G use cases.

Figure 19B:
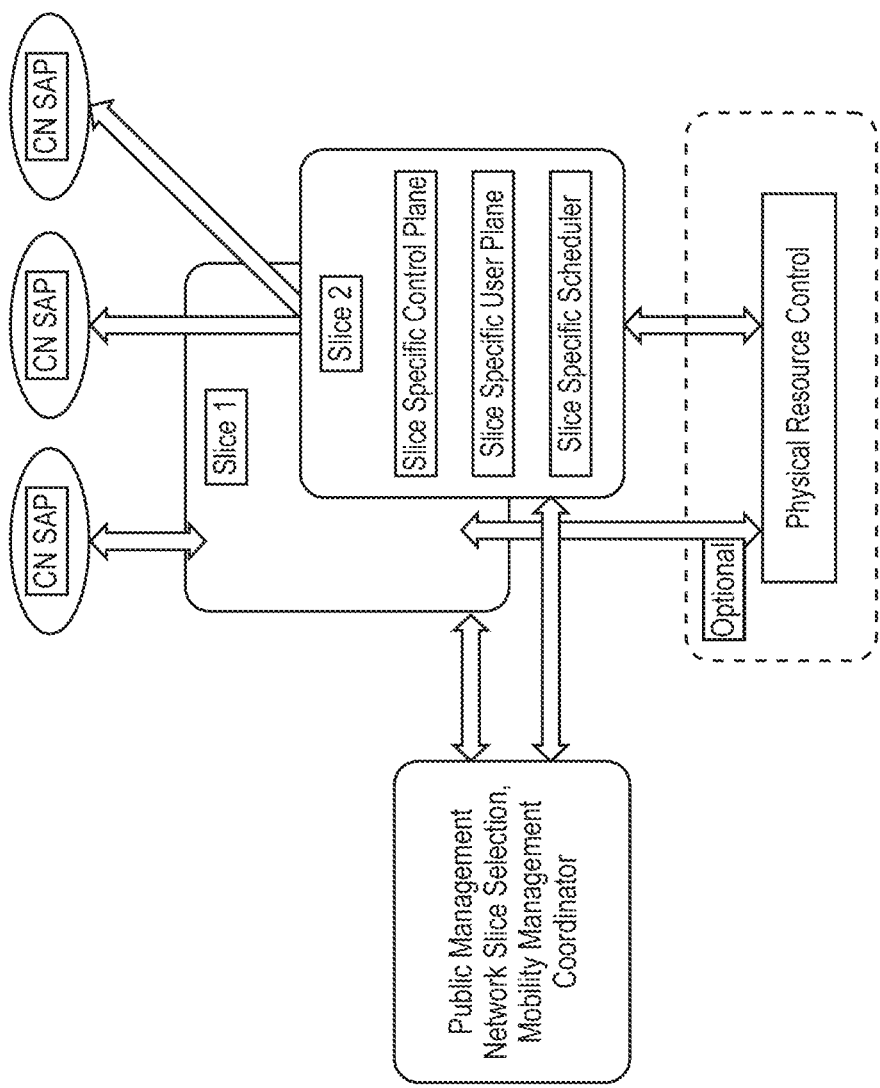
FIG. 19A, FIG. 19B, and FIG. 19C illustrate example radio access network (RAN) slicing architecture models.
Figure 19A:
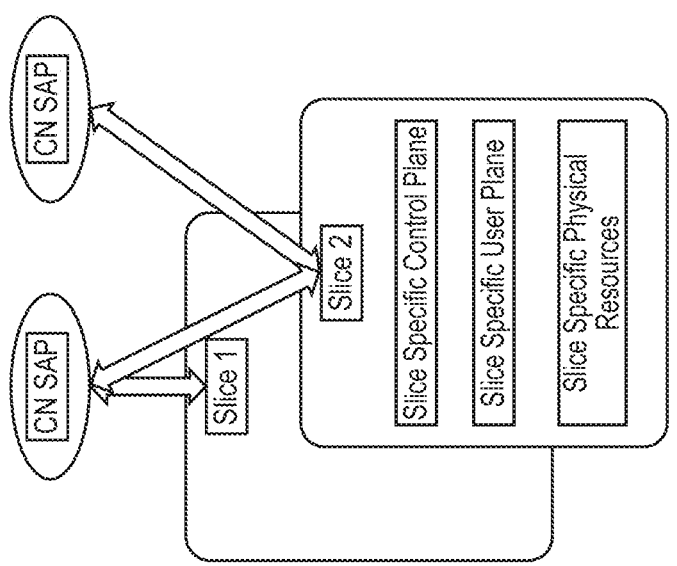
Figure 19C:
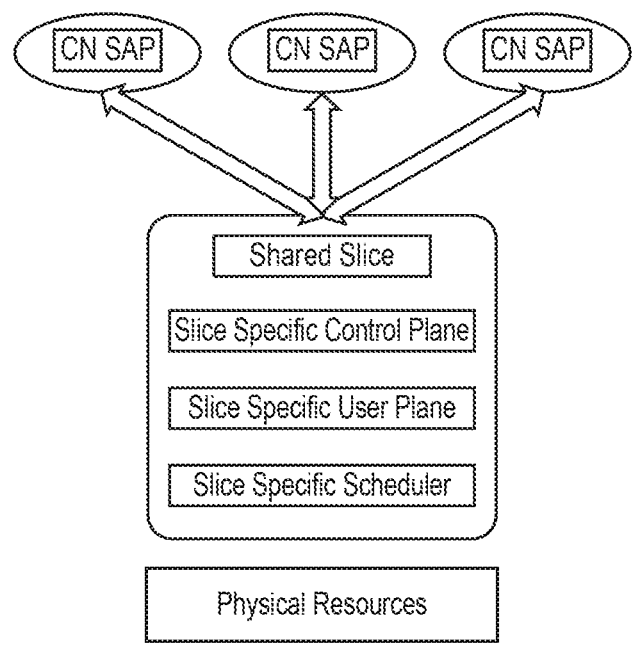
Figure 20:
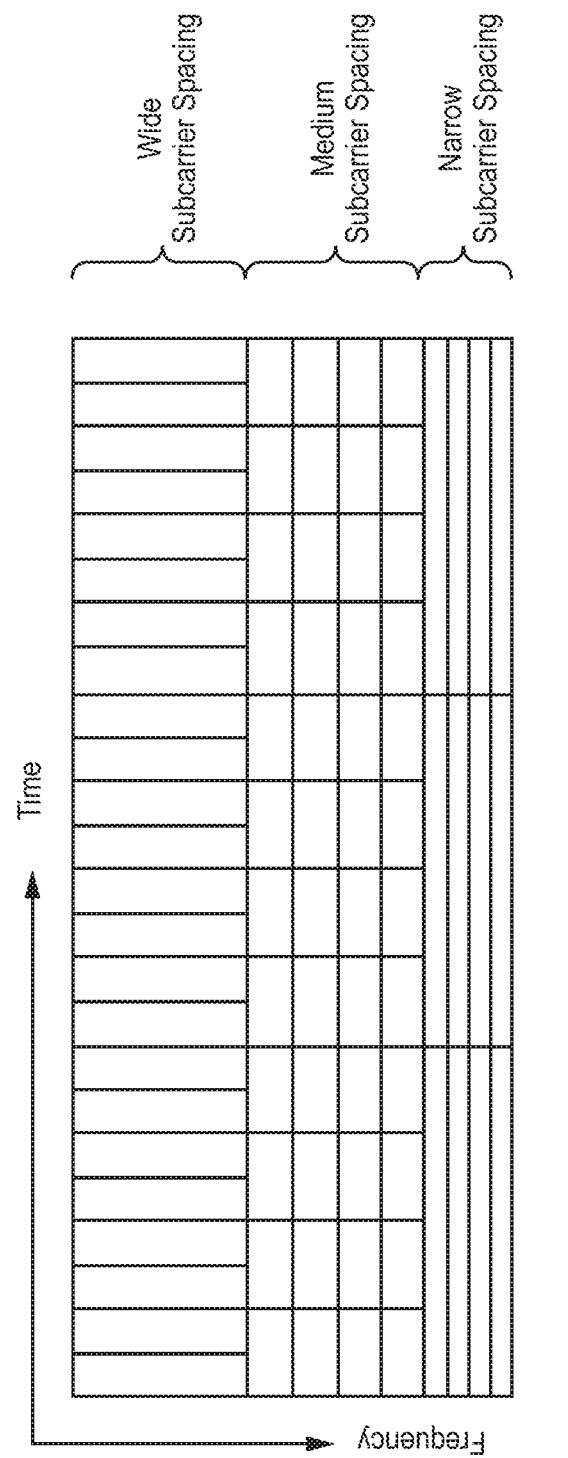
FIG. 20 is a diagram illustrating an example of numerology multiplexing on a carrier.
Figure 21:
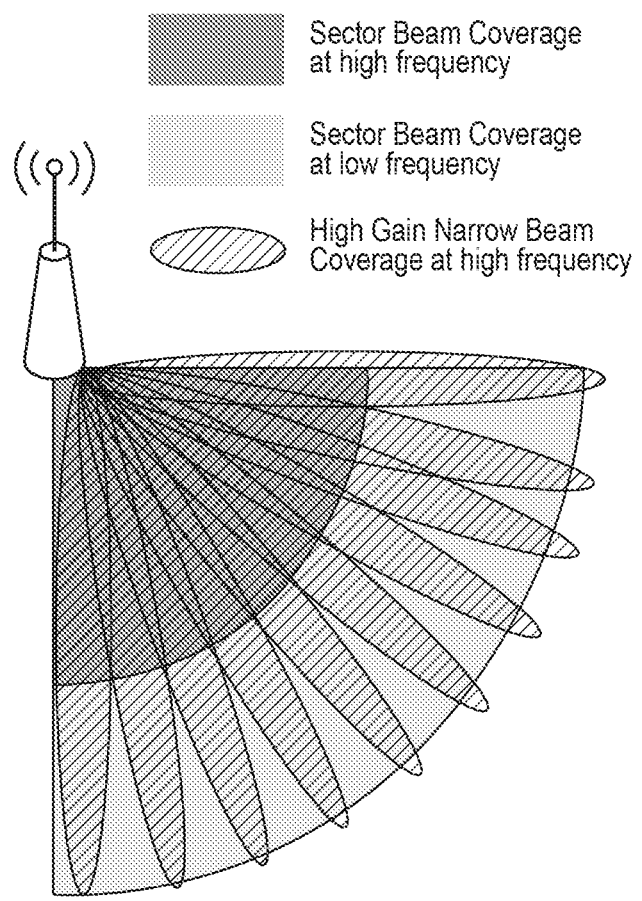
FIG. 21 is a diagram illustrating an example of a Sectored-cell Coverage with beams.

As discussed herein, the use of network slicing and physical layer numerology multiplexing may support the diverse and conflicting requirements of the target use cases for the next generation cellular systems that are generically referred to as 5G systems. From the Radio Access Network (RAN), several architecture models for network slicing are possible. In one model (Model 1 depicted in FIG. 19A), it is assumed that there is a network slice specific control plane, a network slice specific user plane, and network slice specific physical resources. Another mode (Model 2 depicted in FIG. 19B) assumes a network slice specific control plane, a network slice specific user plane, a network slice specific scheduler, and optionally a common pool of physical resources. In this model, the public management network function allocates/reallocates physical resources among the slices. The slices are physical resources specific once resources are allocated to slices. Yet another model (Model 3 depicted in FIG. 19C) assumes shared network slice control plane, shared network slice user plane, shared network slice scheduler and physical resources. An example of numerology multiplexing on a carrier is illustrated in FIG. 20. It is recognized herein that a New Radio (NR) architecture may be beam centric. An example of a sectored-cell coverage by means of beams is illustrated in FIG. 21.

Described herein are mechanisms for resource grant allocation by an NR node, and mechanisms for the allocation of resource grants received by the UE to UL traffic. Specifically, assumed data link structures, resource grant allocations by the NR node, options for the allocation of resource grants received by the UE to UL traffic, options for buffer status report, options for power headroom report, and options for scheduling request are now described.

With respect to an L2 (data link) structure, a numerology may be defined by the combination of one or more of the following, presented by way of example and without limitation: subframe duration, guard time interval, number of symbols per subframe, subcarrier spacing, and the Transmission Time Intervals (TTI). In some cases, one numerology may be associated with more than one TTI. The TTI may be defined at the slot granularity level (e.g., 7 or 14 OFDM symbols), or at the mini-slot granularity level. The mini-slot may be defined as one or more symbols. A numerology may be associated with a Bandwidth Part (BWP). The bandwidth of a carrier may be divided into the BWP, where each BWP is configured with a given numerology. The gNB may reconfigure the numerology of a BWP for the UE. As used herein, unless otherwise specified, numerology and BWP may be used interchangeably, without limitation.

Turning now to Radio Bearer (RB) models, unless otherwise specified herein, the radio bearer can be used to denote both data radio bearer or signaling radio bearer. Models are now considered for radio bearers (signaling radio bearers or data radio bearers). In one example, RBs are specific to each network slice configured for a UE. For example, data that belongs to different network slices are mapped to different sets of RBs within a UE context, where RB configurations are specific for each network slice configured for the UE. Each network slice may have more than one RB configured per UE. For example, any of the main next generation system use cases (e.g., eMBB, URLL or mMTC) may cover a broad range of applications with different QoS requirements. Several RBs may therefore be configured within a UE context, for instance in support of eMBB networks in order to provide differentiated QoS. This model may correspond to the scenario where the RAN network is sliced, for example in support of different core network slices, where core network slices are associated with RAN network slices either through static configuration or semi-static configuration (e.g., at session establishment).

In another example model, RBs are common to network slices configured for a UE. For example, RB configurations might not be network slice specific. In one embodiment, data from different network slices may be mapped to the same RB, possibly simultaneously, and data from different RBs may be data generated by the same network slice. This model may correspond to the scenario where the RAN network, for example, is not sliced.

In another example, RBs configuration are specific to each numerology configured for a UE. For example, in some cases, each RB can be associated with only one PHY numerology within a UE context, and data carried by an RB can only be mapped to one PHY numerology. Each PHY numerology may be associated with more than one RB within a UE context. A radio bearer may be reconfigured to another PHY numerology. As an example of this embodiment, and since a numerology may have more than one TTI, the gNB may configure the UE with radio bearer (data radio bearer or signaling radio bearer) mapped to only one numerology with one or more TTIs. For the same bearer, the gNB may configure the UE with a mapping of radio bearer (data radio bearer or signaling radio bearer) to numerology and/or TTI in the uplink direction that is different from the mapping of radio bearer (data radio bearer or signaling radio bearer) to numerology and/or TTI in the downlink direction.

In yet another example, RB configurations may be common to physical layer (PHY) numerologies configured for a given UE. For example, RBs configuration might not be PHY numerology specific. Data on a given RB may be dynamically (over time) mapped to different numerology, for example, as a result of MAC scheduling decision. As an example of this embodiment, the gNB may configure the UE with a radio bearer mapped to more than one numerology, each numerology having one or more TTIs. For the same radio bearer (data radio bearer and signaling radio bearer), the gNB may configure the UE with different mappings of radio bearer to numerology and/or TTIs in downlink direction and uplink direction. For example, for each radio bearer the UE is configured with, the set of numerologies and/or TTI in the UL direction that the radio bearer is mapped to may be different from the set of numerologies and/or TTIs, the logical channel is mapped to in the downlink direction. Similarly, multiple RBs may share the same numerology. For example, in the UE in the uplink direction, data from more than one RB may be mapped to the same numerology as a result of MAC scheduling decision. In some cases, different layers in spatial multiplexing may belong to different numerologies.

In yet another aspect, the example RB models described above may be combined. For example, in some cases, some RBs may be configured to be network slice specific while some other RBs are configured as common RBs among two or more network slices. A common signaling radio bearer (SRB) may be used to support UE configuration and control plane signaling for more than one network slices. For example, the core network work may have one common control plane network slice. The NAS signaling associated with the common control plane may be mapped to common SRB in the radio access network. The radio access network may itself have a common control plane RAN slices that is mapped to the common core network control plane slice. In another example, the gNB may configure the UE with one radio bearer mapped to only one numerology with one or more TTI and another radio bearer mapped to more than one numerology mapped to one or more TTIs. Furthermore, the mapping of radio bearer to numerology and/or TTI in one direction (e.g., uplink (UL) direction or downlink (DL) direction) may be different from one radio bearer to another radio bearer of the same UE.

In some cases, the configuration of mapping of the radio bearer to numerologies and/or TTIs may be considered as a one phase or two phase process. In an example one phase process, the gNB may signal the radio bearer to numerology and/or TTI mapping to the UE during the RRC connection establishment, RRC connection reconfiguration, or the RRC connection resume procedure. In an example, the gNB may also configure the UE with the radio bearer mapping to numerology and/or TTI using the MAC Control Element (MAC CE) signaling. The UE may consider all the mapping configurations active, for example, upon a successful completion of the procedure. In an example two phase process, the UE is configured first (phase 1) with the potential mappings between the configured radio bearers, and the numerologies and/or TTIs through RRC signaling, for example, during the RRC connection establishment or the RRC connection reconfiguration. In a second phase, the UE is instructed by the gNB through MAC CE signaling, to activate (use) part or all of the mapping configurations received during the first phase. In one embodiment, the gNB configures the UE with the mapping of radio bearer to numerology and/or TTI through explicit mapping. For example, the UE may be explicitly configured with the numerologies and/or TTIs allowed for each radio bearer, in uplink, in downlink, or both. In another embodiment, the UE implicitly derives the mapping of radio bearer to numerology and/or TTI. For example, for each radio bearer, the gNB configures the UE with the numerologies and/or TTI not allowed for the radio bearer, in uplink, in downlink, or both. For each radio bearer, the UE uses the configuration from gNB to identify which numerologies and/or TTIs are allowed by the gNB and which ones are not allowed by the gNB.

Turning now to example logical channel models (e.g., control and traffic channels), in one example, logical channels are specific to each network slice configured for a UE. For example, data that belongs to different network slices including data for MAC control elements (MAC CEs) are mapped to different sets of logical channels within a UE context, where logical channel configurations are specific for each network slice configured for the UE. Each network slice may have more than one logical channel configured per UE. For example, any of the main next generation system use cases (e.g., eMBB, URLL or mMTC) may cover a broad range of applications with different QoS requirements. Several logical channels may therefore be configured within a UE context, for instance in support of eMBB network, in order to provide differentiated data transfer service access points into the MAC layer and therefore differentiated QoS. This model may correspond to the scenario where the RAN network is sliced, for example in support of different core network slices, where core network slices and associated with RAN network slices are configured either through static configuration or semi-static configuration (e.g., at session establishment).

In another logical channel example, logical channels are common to network slices configured for a UE. For example, logical configurations might not be network slice specific. This might be the case for deployment scenarios where the RAN is not sliced while the core network is sliced. Data from different network slices may be mapped to the same logical channel, possibly simultaneously, and data from different logical channels may be data generated by the same network slice.

In yet another logical channel example, logical channels configurations are specific to each numerology configured for a UE. For example, in some cases, each logical can be associated with only one PHY numerology within a UE context, and data carried by a logical channel can only be mapped to one PHY numerology. Each PHY numerology may be associated with more than one logical channel within a UE context. A logical channel may be reconfigured to another PHY numerology. As an example of this embodiment, and since a numerology may have more than one TTI, the gNB may configure the UE with a logical channel mapped to only one numerology with one or more TTIs. For the same logical channel, the gNB may configure the UE with a mapping to numerology and/or TTI in the uplink direction that is different from the mapping of the logical channel to numerology and/or TTI in the downlink direction.

In yet another example, logical channel may be common to physical layer (PHY) numerologies configured for UE. For example, logical channels configurations might not be PHY numerology specific. Data on a given logical channel may be dynamically (over time) mapped to different numerology for example as a result of MAC scheduling decision. For example, data of a logical channel corresponding to BCCH may be mapped to the numerology of a physical channel dedicated to information broadcast (e.g., PBCH) or to the numerology of a physical downlink shared channel used by other signaling or data traffic such as PDSCH. As an example of this embodiment, the gNB may configure the UE with a logical channel mapped to more than one numerology, each numerology having one or more TTIs. For the same logical channel, the gNB may configure the UE with different mappings of the logical channel to numerology and/or TTIs in downlink direction and uplink direction. For example, for each logical channel the UE is configured with, the set of numerologies and/or TTI in the UL direction that the logical channel is mapped to may be different from the set of numerologies and/or TTIs in which the logical channel is mapped to in the downlink direction.

In some cases, two or more of the example logical models described above may be combined with each other. By way of example, some logical channels may be configured to be network slice specific while some other logical channels are configured as common to two or more network slices. A logical channel mapped to a common signaling radio bearer (SRB) may be used to support network configuration and control plane signaling for more than one network slice. For example, the core network work may have one common control plane network slice. The NAS signaling associated with the common control plane may be mapped to common SRB in the radio access network. The radio access network may itself have a common control plane RAN slices that is mapped to the common core network control plane slice. In another example, the gNB may configure the UE with one radio bearer mapped to only one numerology with one or more TTI and another radio bearer mapped to more than one numerology, each numerology having one or more TTIs. Furthermore, the mapping of radio bearer to numerology and/or TTI in one direction e.g. uplink (UL) direction or downlink (DL) direction) may be different from one radio bearer to another radio bearer of the same UE.

Figure 22:
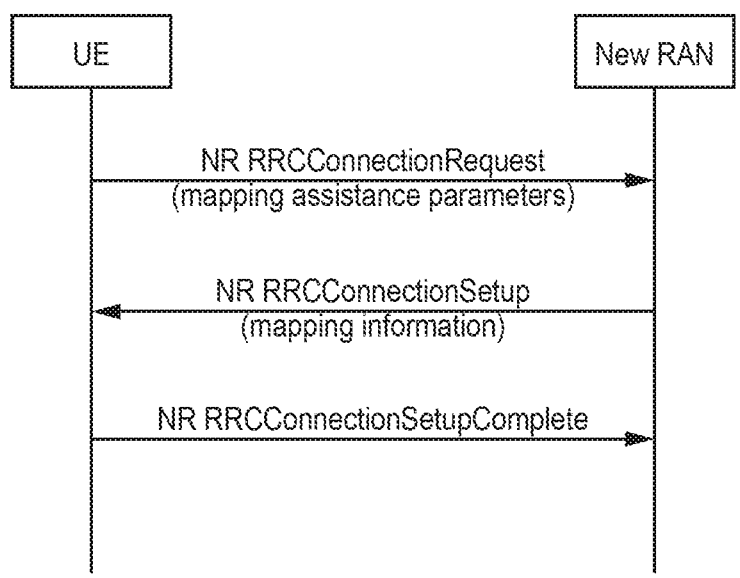
FIG. 22 is a call flow illustrating an example of logical channel (or radio bearer) mapping configuration signaling.
Figure 23:
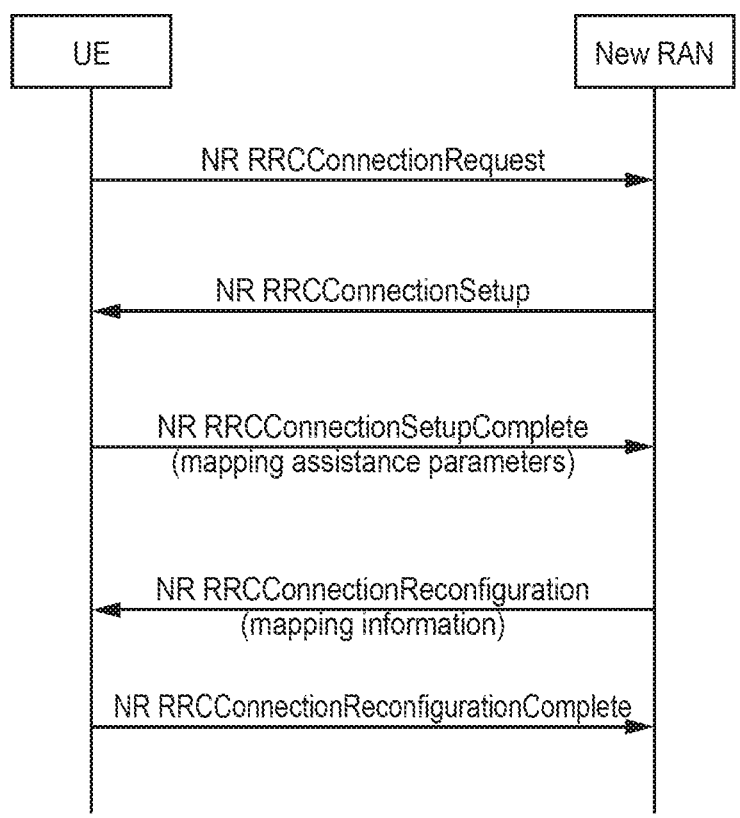
FIG. 23 is a call flow illustrating an alternative example of logical channel (or radio bearer) mapping configuration signaling.
Figure 24:
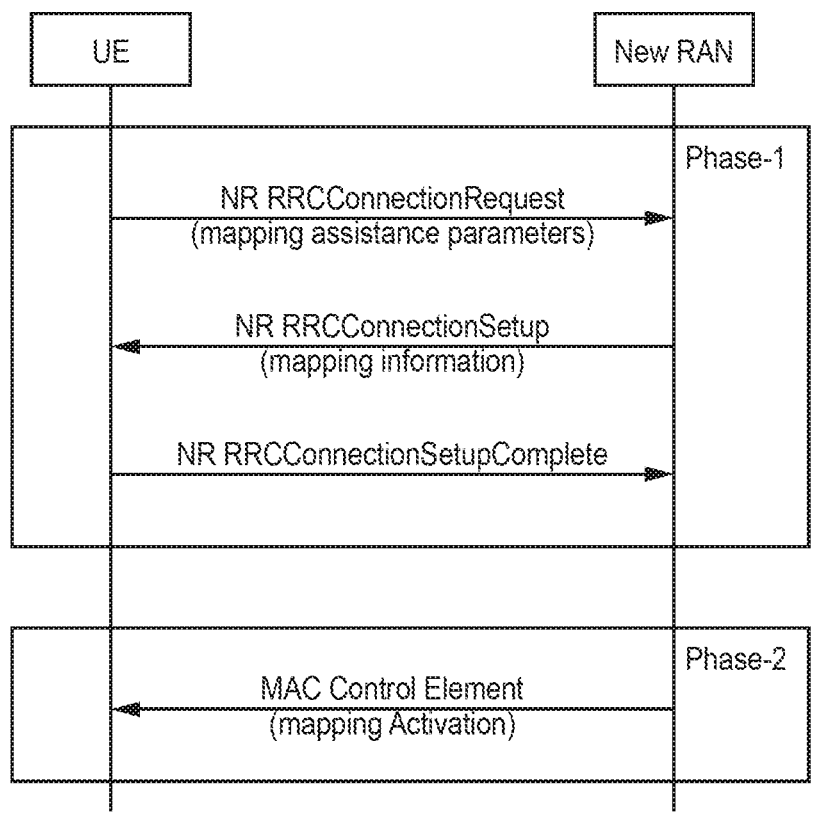
FIG. 24 is a call flow illustrating an example of logical channel (or radio bearer) mapping configuration signaling performed in two phases.
Figure 25:
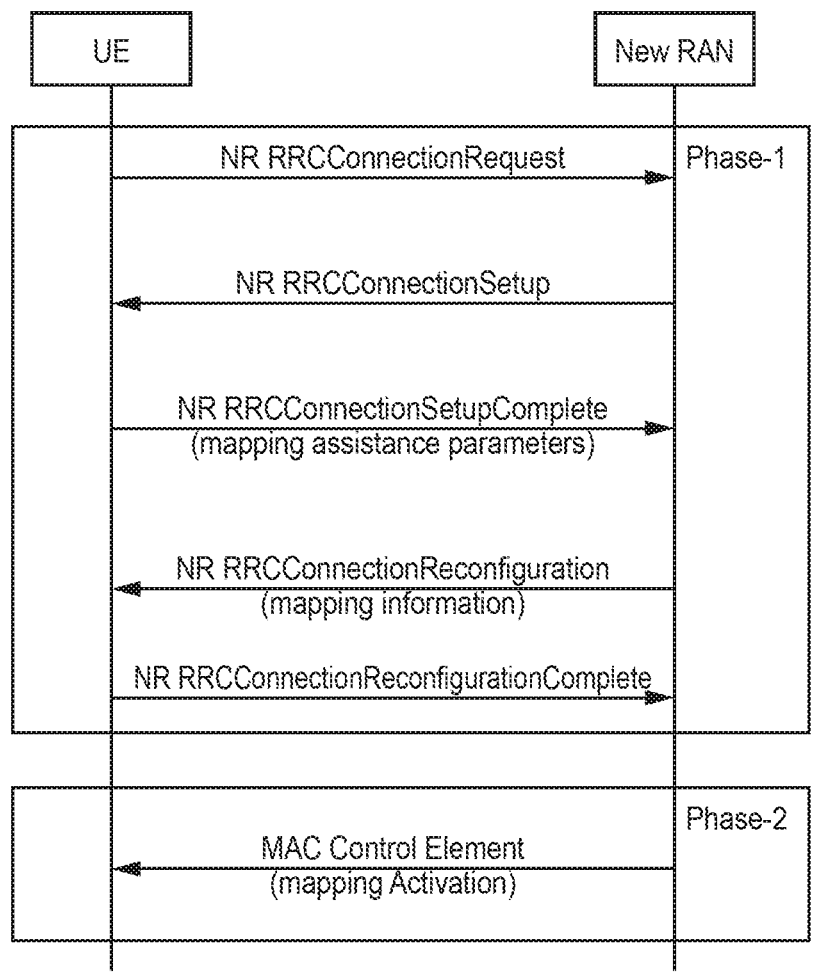
FIG. 25 is a diagram illustrating an alternative example of logical channel (or radio bearer) mapping configuration signaling in two phases.

In some cases, the configuration of mapping of logical channel to numerologies and/or TTIs may be a one-step (one phase) procedure or two-step (two phases). In example one phase embodiment, with reference to FIGS. 22 and 23, the gNB may signal the logical channel to numerology and/or TTI mapping to the UE during the RRC connection establishment procedure, RRC connection reconfiguration procedure, or RRC connection resume procedure. The gNB may also configure the UE with the logical channel mapping to numerology and/or TTI using the MAC Control Element (MAC CE) signaling. In some cases, the UE considers all mapping configurations active, for example applicable upon a successful completion of the procedure. In an example two phase aspect, with reference to FIGS. 24 and 25, the UE is configured first (phase 1) with the potential mappings between the configured logical channel, and the numerologies and/or TTIs through RRC signaling, for example, during RRC connection establishment or RRC connection reconfiguration. In a second phase, the UE is instructed by the gNB through MAC CE signaling to activate (use) part or all of the mapping configurations received during the first phase. In one embodiment, the gNB configures the UE with the mapping of logical to numerology and/or TTI through explicit mapping. For example, the UE may be explicitly configured with the numerologies and/or TTIs allowed for each logical channel, in uplink, in downlink, or both. In another embodiment, the UE implicitly derives the mapping of logical channel to numerology and/or TTI. For example, for each radio bearer, the gNB configures the UE with the numerologies and/or TTIs not allowed for the logical channel, in uplink, in downlink or both. For each logical channel, the UE uses the configuration from gNB to identify which numerologies and/or TTIs are allowed by the gNB and which ones are not allowed by the gNB.

Figure 52A:
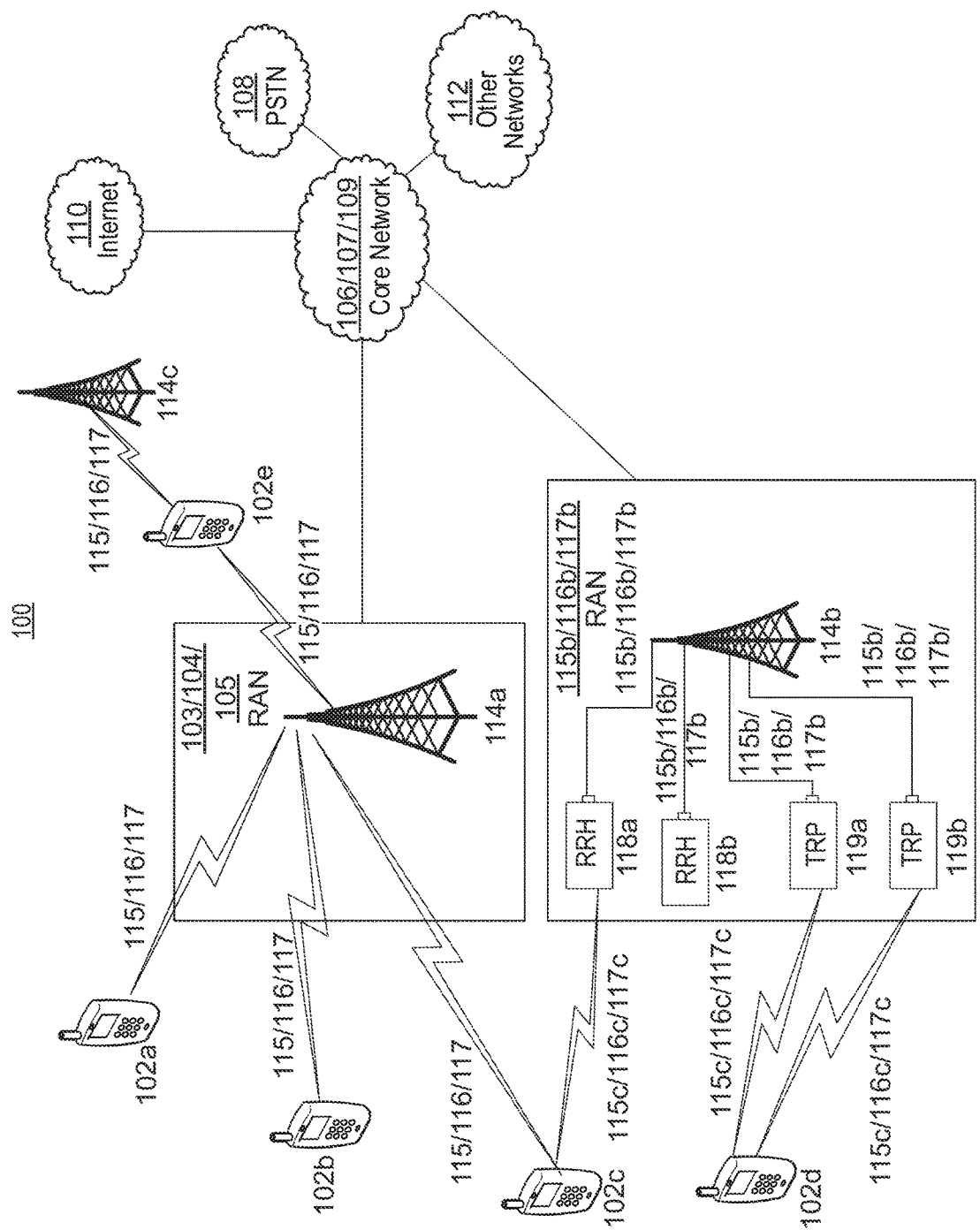
FIG. 52A illustrates one embodiment of an example communications system in which the methods and apparatuses described and claimed herein may be embodiment.
Figure 52B:
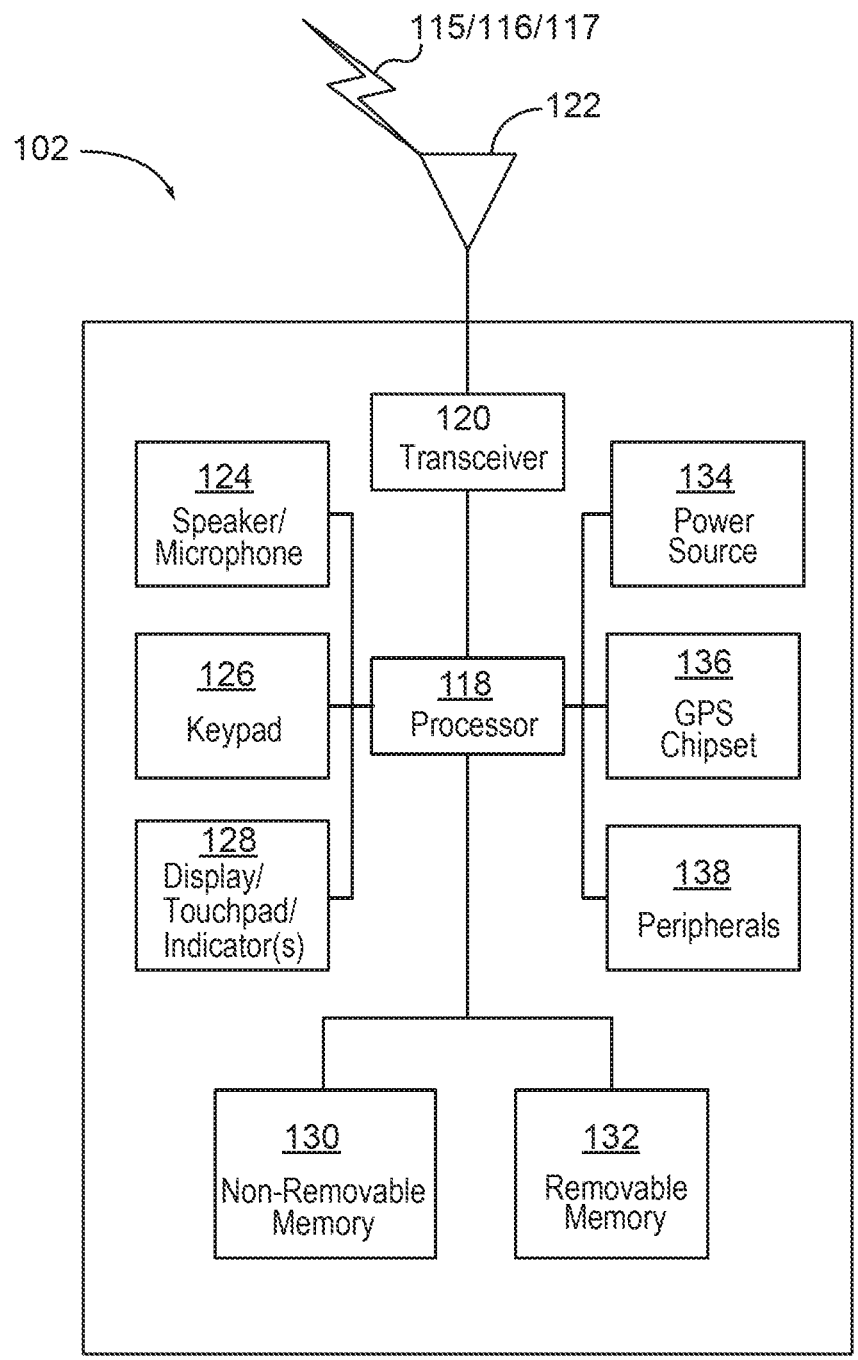
FIG. 52B is a block diagram of an example apparatus or device configured for wireless communications in accordance with the embodiments illustrated herein.

It is understood that the entities performing the steps illustrated in FIGS. 22-25 may be logical entities that may be implemented in the form of software (i.e., computer-executable instructions) stored in a memory of, and executing on a processor of, an apparatus configured for wireless and/or network communications or a computer system such as those illustrated in FIGS. 52B and F. That is, the method(s) illustrated in FIG. 22-25 may be implemented in the form of software (i.e., computer-executable instructions) stored in a memory of an apparatus, such as the apparatus or computer system illustrated in FIGS. 52B and F, which computer executable instructions, when executed by a processor of the apparatus, perform the steps illustrated in FIGS. 22-25. It is also understood that any transmitting and receiving steps illustrated in FIGS. 22-25 may be performed by communication circuitry of the apparatus under control of the processor of the apparatus and the computer-executable instructions (e.g., software) that it executes.

Turning now to examples RRC logical channel configuration information elements (IEs), FIG. 26 illustrates an example of an RRC logical channel configuration IE and a LogicalChannelConfig information element. FIG. 27 is a diagram illustrating an example of an RRC Configuration Numerology Structure. For each component carrier, the UE may be configured with a list of numerologies, where each numerology may be defined as illustrated by the data structure of FIG. 27, for example. In some cases, each numerology within the overall set of numerologies the UE is configured with is indexed. The parameter NumerologyIndex in the structure points to one numerology in the list of numerologies configured for the UE. Each numerology has a list of TTIs represented by the parameter tti-List. The possible values of TTIs are enumerated (e.g., TTI x, TTI y and TTI z). A numerology may be configured with a list of TTIs which is a subset of the possible values of TTIs. The terms Numerology Index and Transmission Profile are used interchangeably herein, without limitation, unless otherwise specified.

In terms of MAC architecture, the various example models are now described. In one example, one MAC entity is configured in the UE. This MAC entity is common to all slices configured for the UE. In multi-connectivity (e.g., dual connectivity), one MAC entity is configured in the UE per connection with a distinct scheduler in the network. Each of these MAC entities may be common to all slices configured for the UE. Multi-connectivity may refer to a mode of operation wherein a multiple Rx/Tx UE in the connected mode is configured to utilize radio resources amongst E-UTRA and/or NR provided by multiple distinct schedulers connected via non-ideal backhaul. For example, in dual connectivity, two MAC entities may be configured in the UE, one for the MCG and one for the SCG. Each of the MAC entities may be common to the slices configured for the UE. In some examples, the MAC entities handle the transport channels defined for NR, for example, which may be the NR equivalent of the following transport channels: Broadcast Channel (BCH), Downlink Shared Channel(s) (DL-SCH), Paging Channel (PCH), Uplink Shared Channel(s) (UL-SCH), Random Access Channel(s) (RACH), Multicast Channel(s) (MCH), Sidelink Broadcast Channel (SL-BCH), Sidelink Discovery Channel (SL-DCH), Sidelink Shared Channel (SL-SCH). In some cases, each MAC entity is configured by RRC with a serving cell supporting physical uplink control channel (e.g., LTE PUCCH or an equivalent NR channel) transmission and contention based Random Access. In an example, for each MAC entity, some of the transport channels may be configured per network slice configured in the UE for e.g. traffic transport channels (e.g., eMBB, URLL or mMTC). This may mean that even if there is no SCell, there may be multiple DL-SCH (or NR equivalent DL transport channel), and there may be multiple UL-SCH (or NR equivalent UL transport channel) and RACH per MAC entity configured in the UE. If the MAC entity is configured with one or more SCells, there may be multiple DL-SCH (or NR equivalent DL transport channel), and there may be multiple UL-SCH (or NR equivalent UL transport channel) and RACH per MAC entity configured in the UE; one DL-SCH and UL-SCH possibly per slice on the SpCell, one DL-SCH, zero or one UL-SCH possibly per slice and zero or one RACH for each SCell.

By way of another example, one MAC entity is configured in the UE per slice. In multi-connectivity (dual connectivity), one MAC entity may be configured in the UE per slice per connection with a distinct scheduler in the network. Multi-connectivity refers to a mode of operation wherein a multiple Rx/Tx UE in the connected mode is configured to utilize radio resources amongst E-UTRA and/or NR provided by multiple distinct schedulers connected via non-ideal backhaul. For example, in dual connectivity, two MAC entities are configured in the UE per slice, one for the MCG and one for the SCG. In this example scenario, in order to have an initial access procedure (e.g., random access procedure, paging or SI information provisioning) common to all network slices, one MAC entity dedicated to the handling of initial access procedure may be configured in the UE. In multi-connectivity (dual connectivity), one MAC entity dedicated to the handling of initial access procedure is configured in the UE per connection with a distinct scheduler in the network. This MAC entity is configured by RRC with a serving cell supporting physical uplink control channel (e.g. LTE PUCCH or an equivalent NR channel) transmission and contention based Random Access. In some cases, the MAC entities handle the transport channels defined for NR, for example the NR equivalent of the following transport channels: Broadcast Channel (BCH), Downlink Shared Channel(s) (DL-SCH), Paging Channel (PCH), Uplink Shared Channel(s) (UL-SCH), Random Access Channel(s) (RACH), Multicast Channel(s) (MCH), Sidelink Broadcast Channel (SL-BCH), Sidelink Discovery Channel (SL-DCH), Sidelink Shared Channel (SL-SCH). The transport channels may be configured per network slice configured in the UE (e.g., traffic transport channels (e.g. eMBB, URLL or mMTC). If the MAC entity is configured with one or more SCells, there are multiple DL-SCH (or NR equivalent DL transport channel) and there may be multiple UL-SCH (or NR equivalent UL transport channel) and RACH per MAC entity configured in the UE; one DL-SCH and UL-SCH per slice on the SpCell, one DL-SCH, zero or one UL-SCH possibly per slice and zero or one RACH for each SCell.

In another example, a combination the above-described examples are implemented, wherein some MAC entities are common to network slices and some are specific to a slice.

The PHY numerology is visible to the MAC sublayer. For each PHY numerology that the UE is configured with, the UE MAC may be provided with the relevant configuration (e.g., TTI, subcarrier spacing, CP length, frequency-time domain resource mapping, etc.). In another embodiment, the MAC configuration has no explicit numerology configuration. Rather, in some cases, the numerology configuration is defined per component carrier as part of the component carrier configuration. For example, the numerology configuration may be defined as part of an IE structure like pdsch-ConfigDedicated (in downlink) or pucch-ConfigDedicated (in uplink) of the PhysicalConfigDedicated structure used in LTE to specify UE specific physical channel configuration. For each numerology that the UE PHY is configured with, the UE PHY sublayer may make the numerology configuration visible to the UE MAC. In yet another alternative, the PHY does not expose to the MAC numerology configuration. Rather, the MAC may rely on the priority values of the numerologies, logical channel priorities, and logical channel mapping to numerology configuration to perform logical channel multiplexing and scheduling functions.

In some cases, the MAC scheduler enforces the mapping of bearer to the correct numerologies or more specifically the mapping of logical channels (the bearers are mapped to) to the correct numerologies through proper component carrier scheduling, for example, by ensuring that based on each component carrier configuration information in terms of supported numerologies and/or TTIs, data from the logical channels or form the data radio bearers are only mapped to the component carriers which support only subset or all of the allowed numerologies and or TTIs. In this example option, the MAC scheduler does not schedule data from a logical channel to a component carrier with one or more numerologies not allowed for this logical channel, even if the component carrier is also configured with at least one numerology and or TTI allowed for the said logical channel.

The HARQ may be modelled in accordance with various example embodiments. In one example, in downlink, there is one HARQ entity at the MAC entity for each Serving Cell, which maintains a number of parallel HARQ processes. Similarly, in uplink, there may be one HARQ entity at the MAC entity for each Serving Cell with configured uplink which maintains a number of parallel HARQ processes allowing transmissions to take place continuously while waiting for the HARQ feedback on the successful or unsuccessful reception of previous transmissions. The HARQ entity may be common to network slices. For example, in some cases, HARQ entities are not network slice specific. Data from different network slices may be mapped to the same HARQ entity, and data from the same network slice may be configured over different HARQ entities. The number of parallel HARQ processes per HARQ entity may be configurable, for example, through RRC signaling. In some cases, the HARQ entity may be configured to support more than one PHY numerology. For example, data from one HARQ entity may be transmitted using resources from more than one numerology. Within the same HARQ entity, data with different PHY numerology (for example, shorter TTI/symbol length due to latency requirement, etc.) may be mapped to different HARQ processes. An exemplary embodiment of this option is where there is one HARQ entity per component carrier (cell), wherein each component carrier supports more than one numerology and/or TTI. The numerology configuration may be defined per component carrier as part of the component carrier configuration for e.g. as part of an IE structures like pdsch-ConfigDedicated (in downlink) or pucch-ConfigDedicated (in uplink) of the PhysicalConfigDedicated structure used in LTE to specify UE specific physical channel configuration.

In another example, there is one HARQ entity per network slice at the MAC entity for each Serving Cell with configured uplink, which maintains a number of parallel HARQ processes allowing transmissions to take place continuously while waiting for the HARQ feedback on the successful or unsuccessful reception of previous transmissions.

In yet another example, HARQ entities are network slice specific. For example, data from different network slices may be mapped to different HARQ entities. Each network slice may have more than one HARQ entity. The number of parallel HARQ processes per HARQ entity may be configurable, for example, through RRC signaling.

In yet another example, HARQ entities are numerology specific. For example, each HARQ entity may be configured with a specific PHY numerology and all data transmitted from a HARQ entity may use the same PHY numerology. An exemplary embodiment of this option is where there is one HARQ entity per component carrier (cell), wherein each component carrier is defined with only one numerology and/or TTI.

In some cases, HARQ entities are not numerology specific. Numerology assignment to data transmitted from a HARQ entity may be dynamic as a result of scheduling decision.

In another example HARQ model, a combination of two or more of the example options described above is implemented. For example, some HARQ entities may be configured to be network slice specific, while some other HARQ entities are configured as common HARQ entities among two or more network slices.

Based on the above potential models for RB, logical channel, MAC and HARQ, the following embodiments for NR radio data link (L2) architecture are now described. It will be understood that while these embodiments are illustrated using UL L2 structure for purposes of example, the same concepts may apply to downlink.

Figure 28:
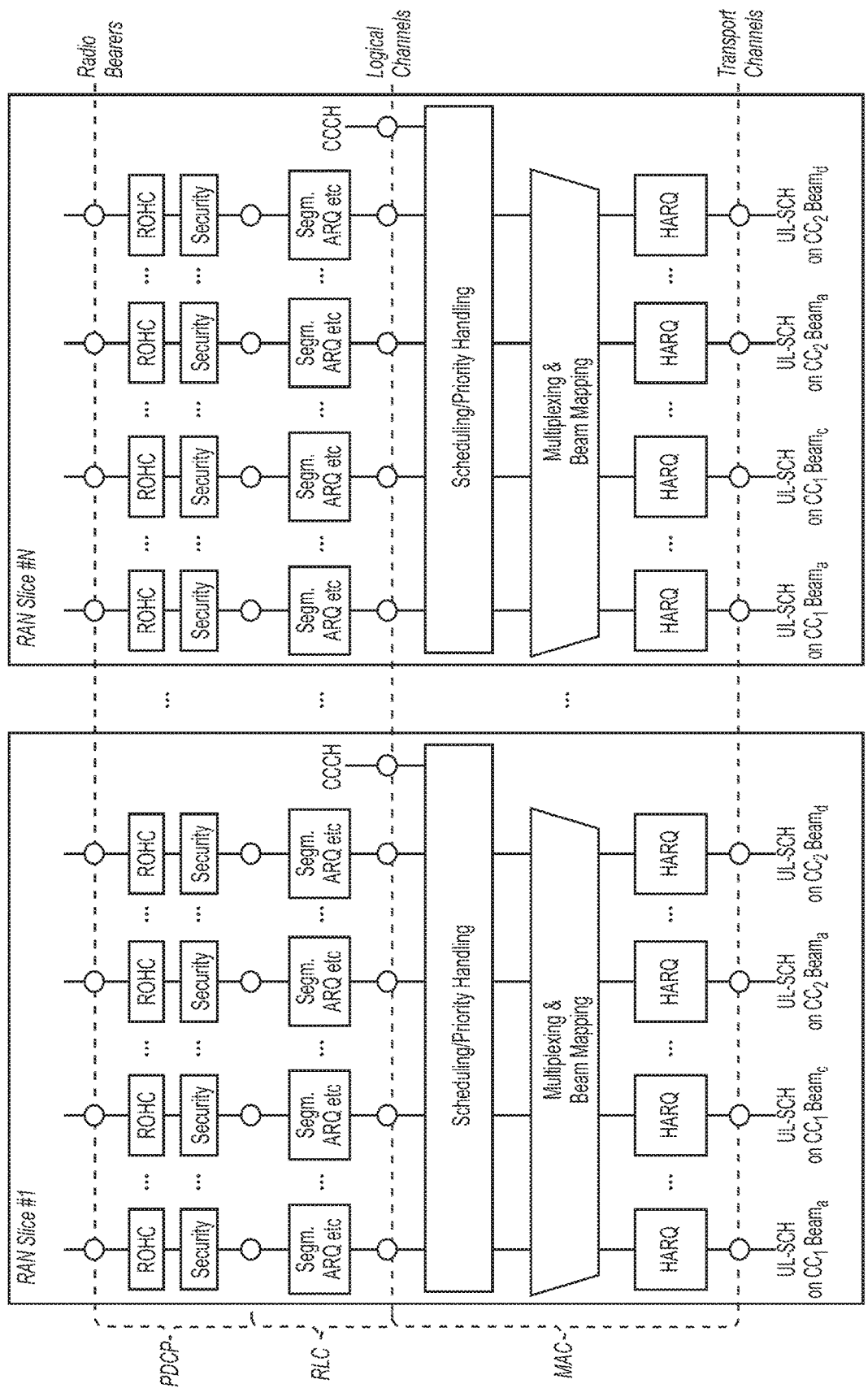
FIG. 28 is a diagram illustrating an example uplink (UL) L2 Structure (slice specific resource blocks (RBs), logical channels, and MAC).
Figure 29:
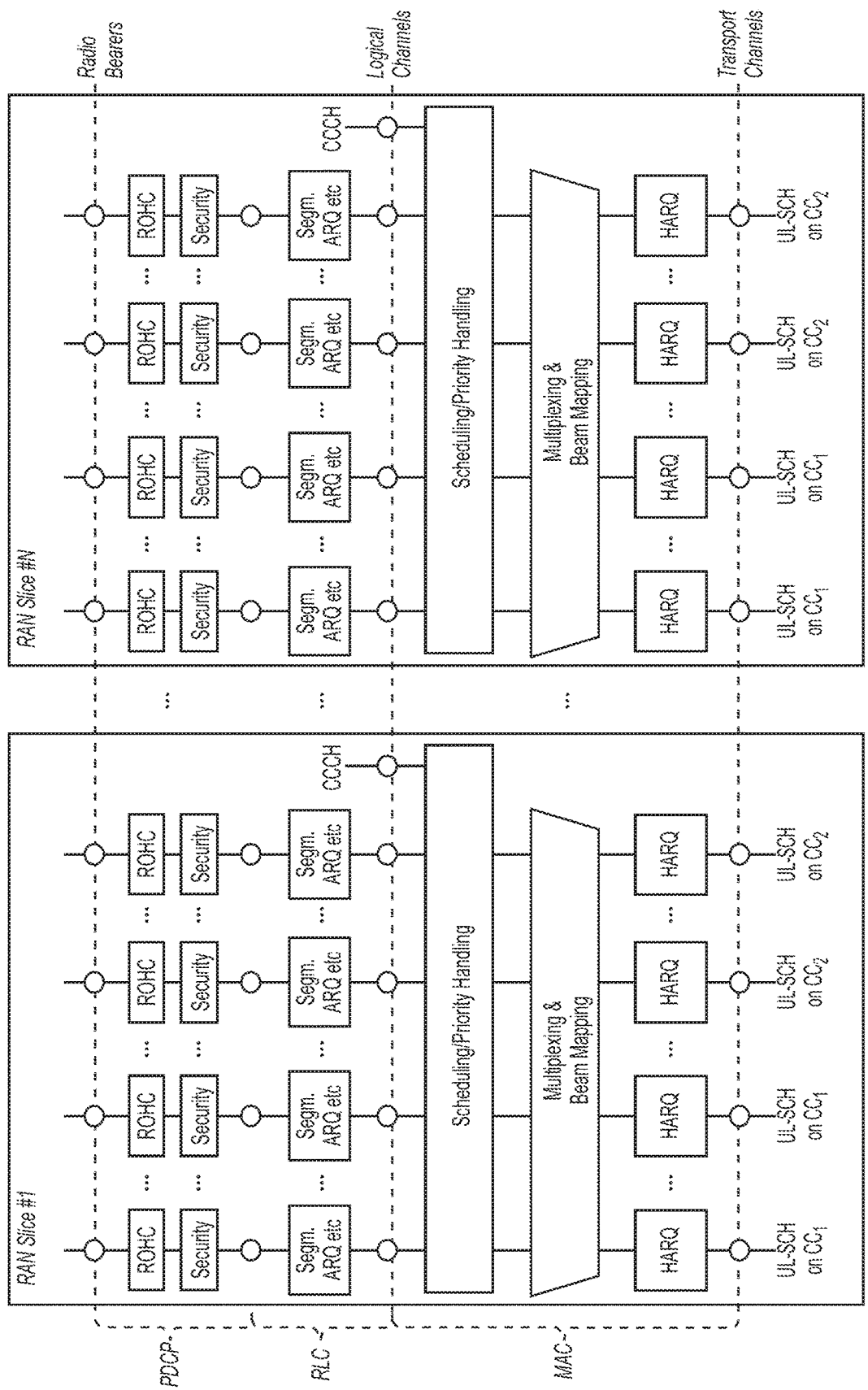
FIG. 29 is a diagram illustrating an example UL L2 Structure (slice specific RBs, logical channels and MAC, beam configuration transparent to MAC).

Referring now to FIG. 28, in accordance with an example embodiment, a slice specific L2 structure is used. FIG. 28 depicts an example of an UL L2 structure that supports slice specific RBs, slice specific logical channels, and slice specific MAC sublayer. This example supports configurations where a common pool of physical resources is shared between slices, as well as configurations where the physical resources (i.e. component carriers (CCs) and/or beams) are slice specific. In this example, with reference to FIG. 28, the multi-beam nature of the PHY is exposed to the MAC sublayer. For example, beam configurations may be known to the MAC sublayer. In some case, if UL transmission on multiple beams are supported at the UE, then separate HARQ entity per beam may be used. The beam configuration may also be slice specific. In one embodiment, the beams configuration may be visible to the MAC but is not HARQ entity specific, and all the HARQ entities or serving cells may share the same beam configuration per network slice. Alternatively, these details may remain transparent to the MAC sublayer, in which case there may be one HARQ entity per CC, as opposed to having one HARQ entity per beam, per CC. In some cases, for each of the architecture examples depicted in this section, alternative examples are also contemplated where there is one HARQ entity per serving cell regardless of the number of beams used for transmission at either the UE or the NR Node. For example, for the UL data structure, there may be one HARQ entity per serving cell (Component Carrier) at the UE regardless of the number of transmit beams used by the UE. An example is depicted in FIG. 29. Similarly, in the DL, in some cases, there may be one HARQ entity per serving cell (Component carrier) at the NR Node regardless of the number of transmit beams by the NR node.

In some examples, the MAC sublayer is responsible for multiplexing the data from the logical channels and mapping the generated transport block(s) to the CC(s)/beam(s) for which the UE has received an UL grant.

Figure 30:
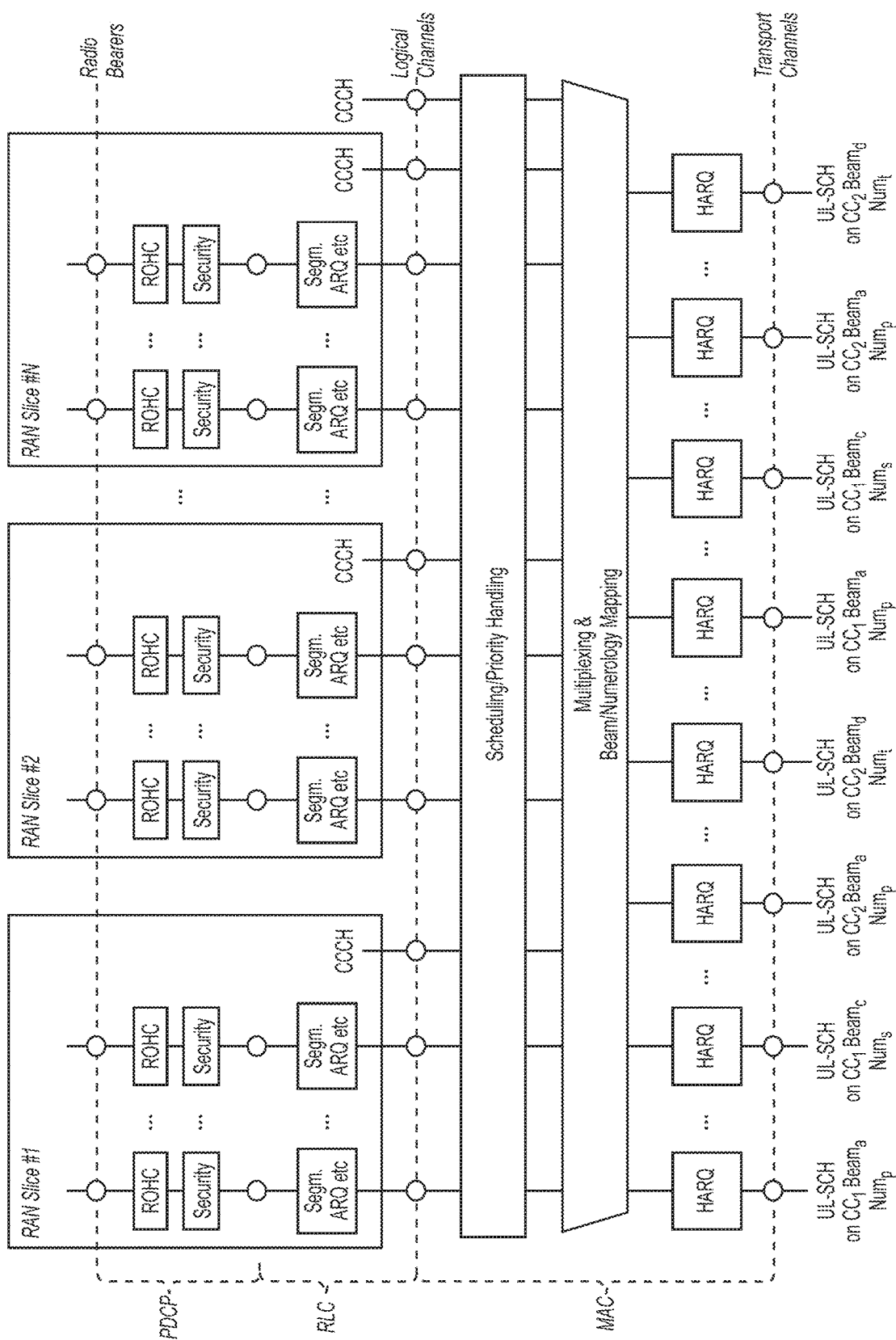
FIG. 30 is a diagram illustrating an example UL L2 Structure (slice specific RBs & logical channels, common MAC).

Referring now to FIG. 30, an example of an UL L2 structure that supports slice specific RBs and logical channels, and a common MAC sublayer, is shown. This example may supports configurations where a common pool of physical resources is shared between slices. In this embodiment shown in FIG. 30, the multi-beam nature of the PHY and the supported numerologies is exposed to the MAC sublayer. If UL transmission on multiple beams are supported at the UE, in some cases, then separate HARQ entity per beam can be used. Alternatively, one or both of these characteristics of the PHY may remain transparent to the MAC sublayer. For example, in some cases, there is not one HARQ entity per numerology, per beam, per CC, but rather one HARQ entity per CC.

The MAC sublayer may be responsible for multiplexing the data from the logical channels and mapping the generated block(s) to the CC(s)/beam(s)/numerologies for which the UE has received an UL grant.

Figure 31:
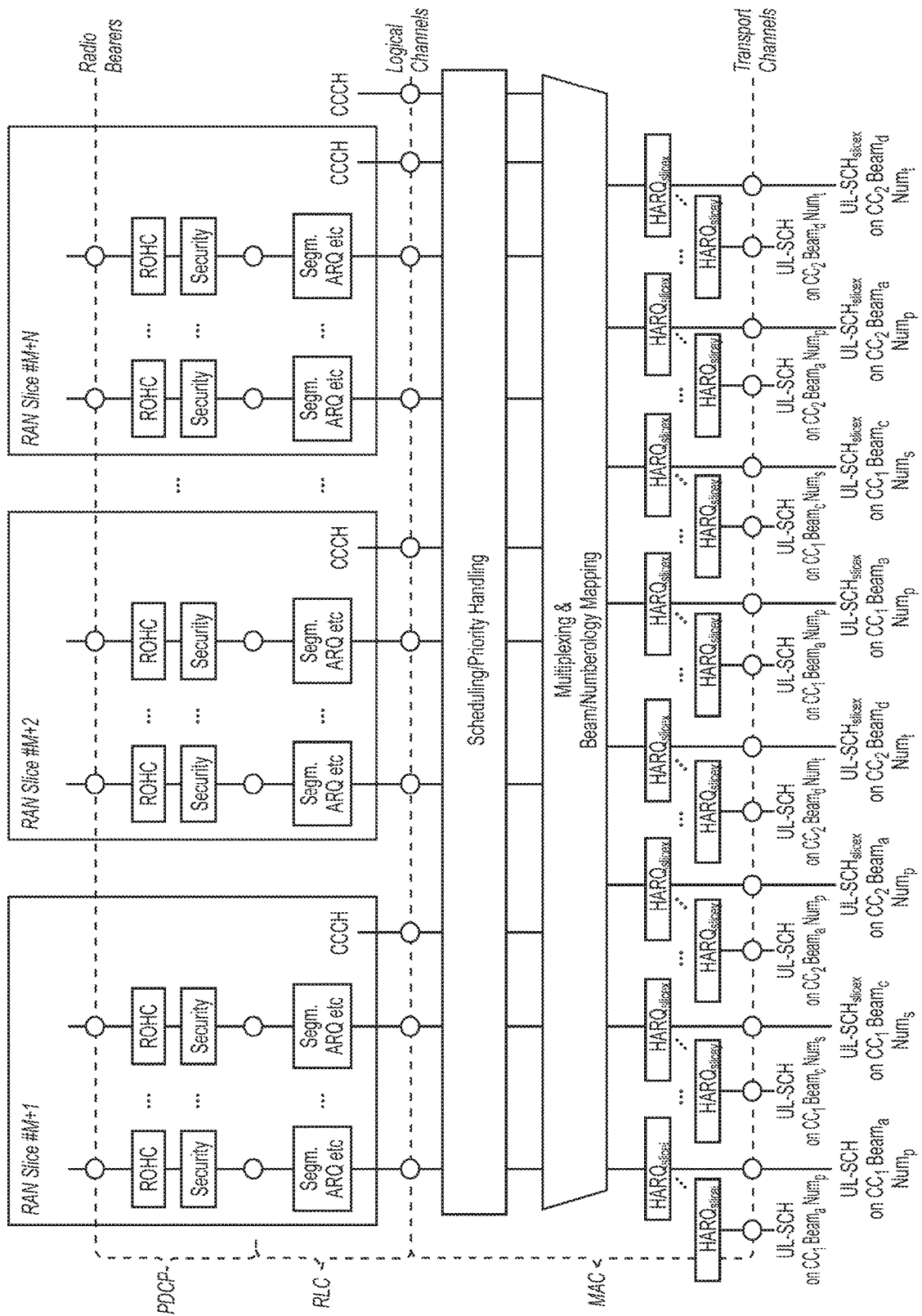
FIG. 31 is a diagram illustrating an example UL L2 Structure (slice specific RBs & logical channels, common upper MAC and slice specific HARQ per serving cell).

Referring now to FIG. 31, the L2 structure supports slice specific RBs, slice specific logical channels, a common upper MAC layer for scheduling and multiplexing and slice specific HARQ. In this example, the UL shared transport channel (or the equivalent channel in NR) is slice specific. For example, a URLL network slice may be mapped to a dedicated HARQ with a transport channel that is configured along with a PHY channel to fulfill URLL requirements. There may be more than one slice per CC and therefore more than one HARQ and more than one associated transport within a CC.

Figure 32:
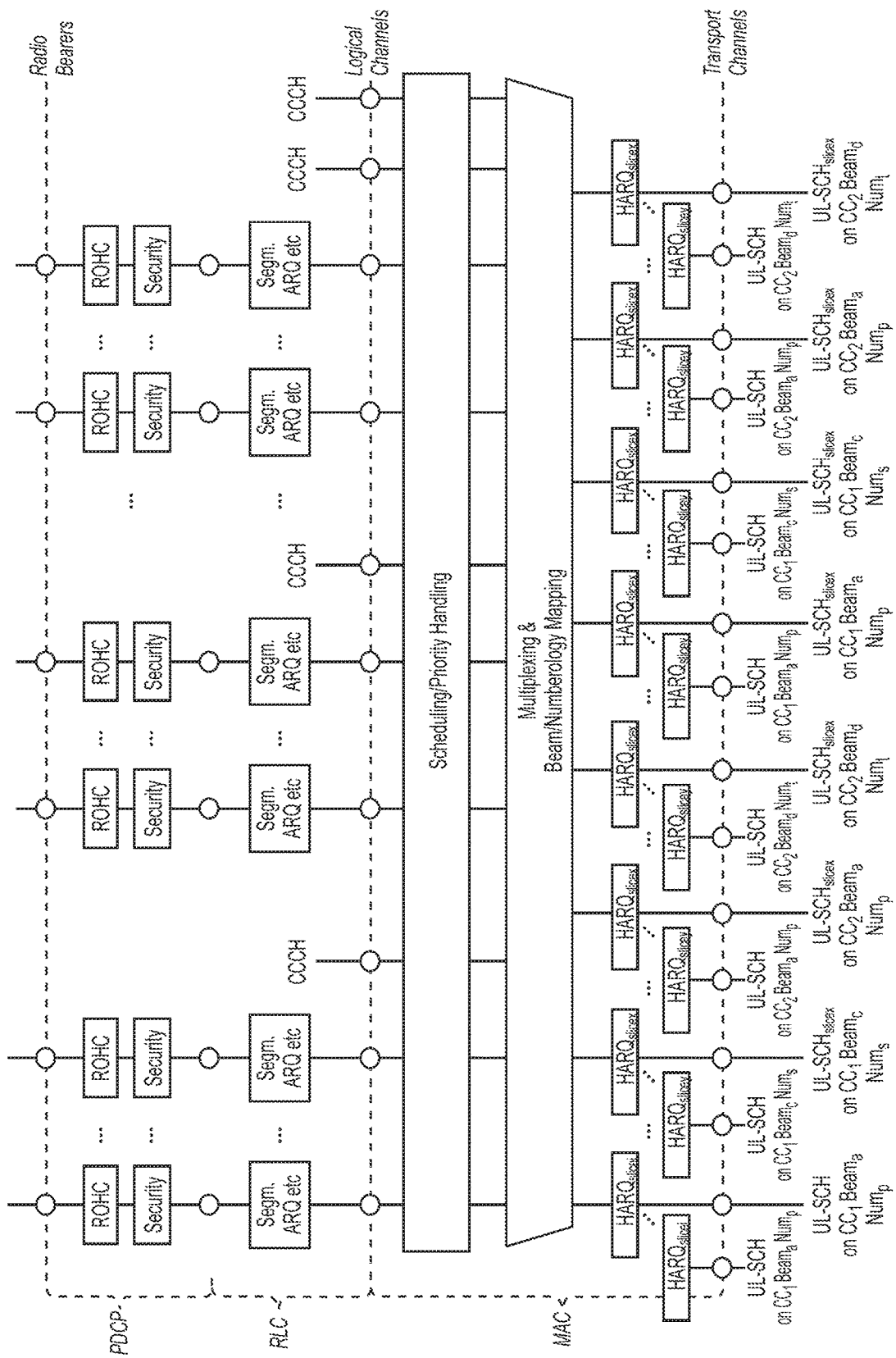
FIG. 32 is a diagram illustrating an example UL L2 Structure (common RBs, logical channels, common upper mac and slice specific HARQ per serving cell).

The example depicted in FIG. 32 is similar to the example depicted in FIG. 31, but the RBs and the logical channels are not slice specific.

Figure 33:
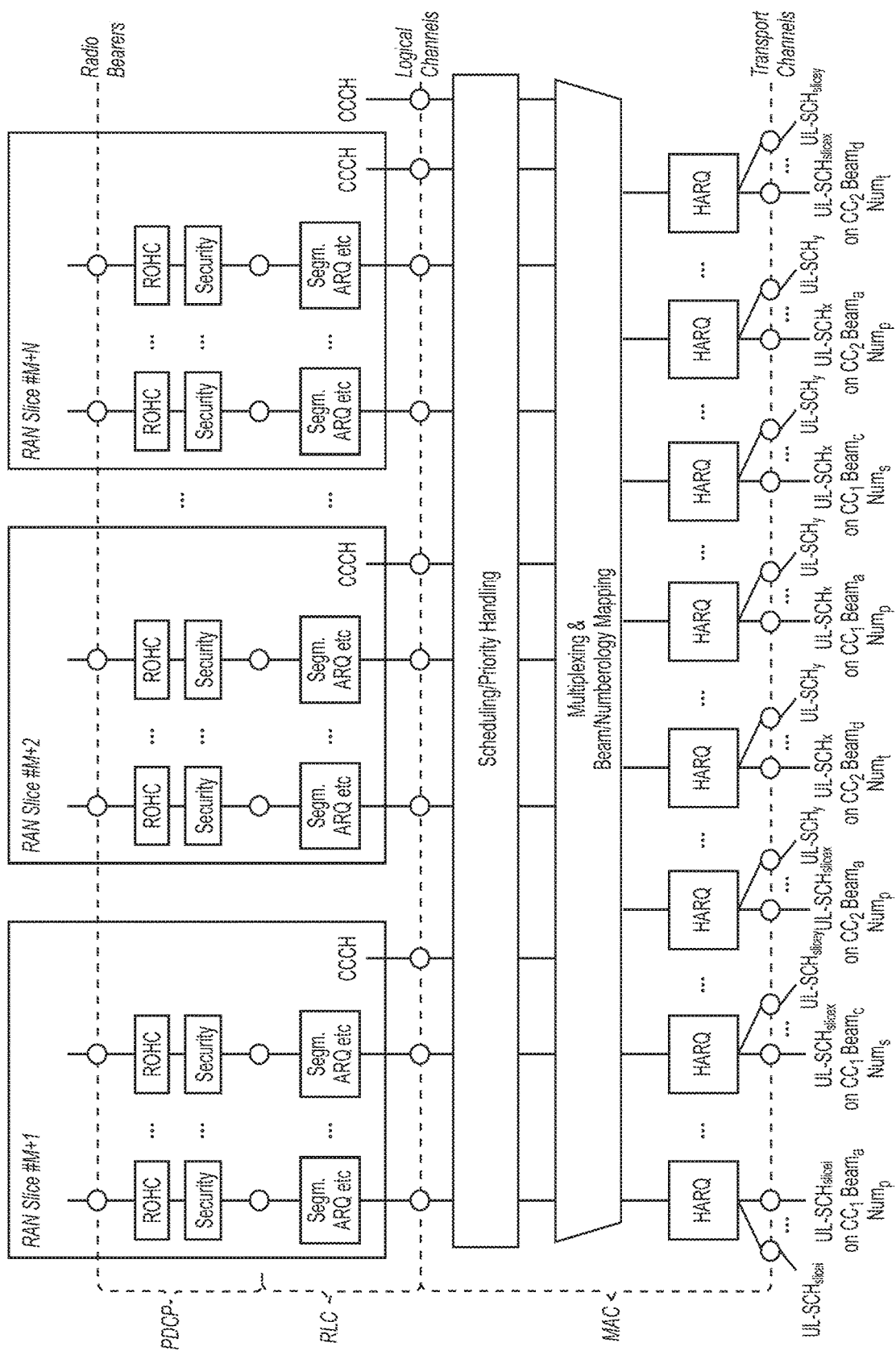
FIG. 33 is a diagram illustrating an example UL L2 Structure (common RBs, logical channels, common upper MAC, one HARQ per serving cell and slice specific Shared Channel).

Referring now to FIG. 33, the BRs and logical channel are slice specific. The MAC including HARQ entities are common to slices, and they are not slice specific. This example is similar to the example depicted in FIG. 30, but the transport channels, such as the UL transport channel (UL SCH or the NR equivalent), is slice specific. In this model, each HARQ entity may have multiple UL SCH, for instance one per slice. The transport channels that belong to difference slices are associated to different HARQ processes with the HARQ entity.

Figure 34:
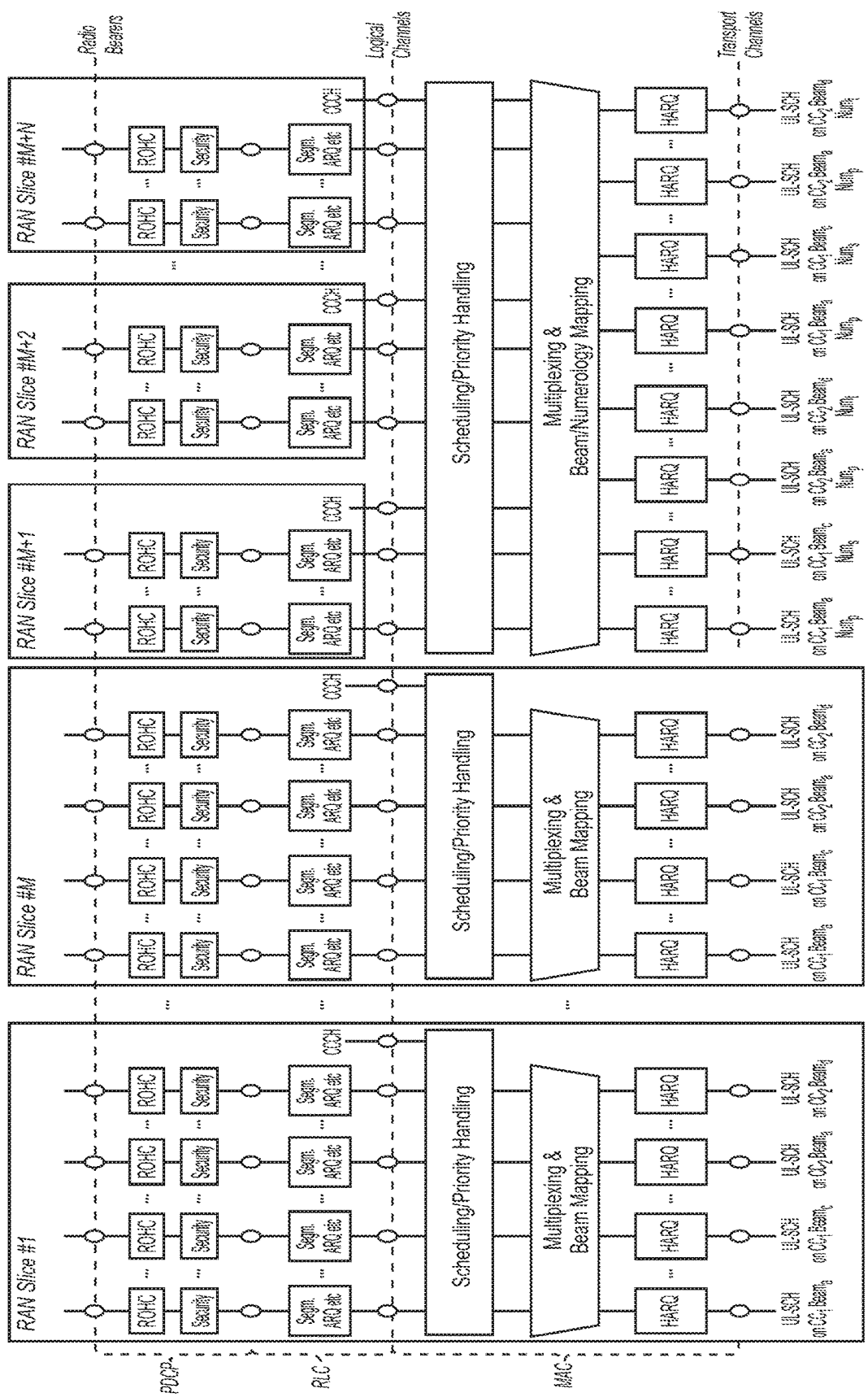
FIG. 34 is a diagram illustrating an example UL L2 Structure, Slice Specific RBs, Slice Specific Logical Channels, Slice Specific MAC or Common MAC.

Referring to FIG. 34, an example architecture is shown in which the L2 structure may be slice specific while for some other network slices, only RBs and logical channels are slices specific.

Turning now to QoS provisioning and bearer mapping, as indicated above, a packet mark may be a mark included in the packet encapsulating header in order to uniquely associate data packets characterized by a given Traffic Flow Filter (TFF) or Traffic Flow filter Template (TFT) with predefined matching QoS profile(s). A packet mark used in packet marking may be one or more the following, for example and without limitation: Application ID, Flow Priority Indicator (FPI), QoS flow ID, Packet Priority Indicator (PPI), Packet Discard Priority Indicator (PDPI), Reflective QoS Indication (RQI) or just any scalar value. Part or all of the value range of the packet mark may be specified to allow inter-operability between AN and CN nodes.

Figure 35:
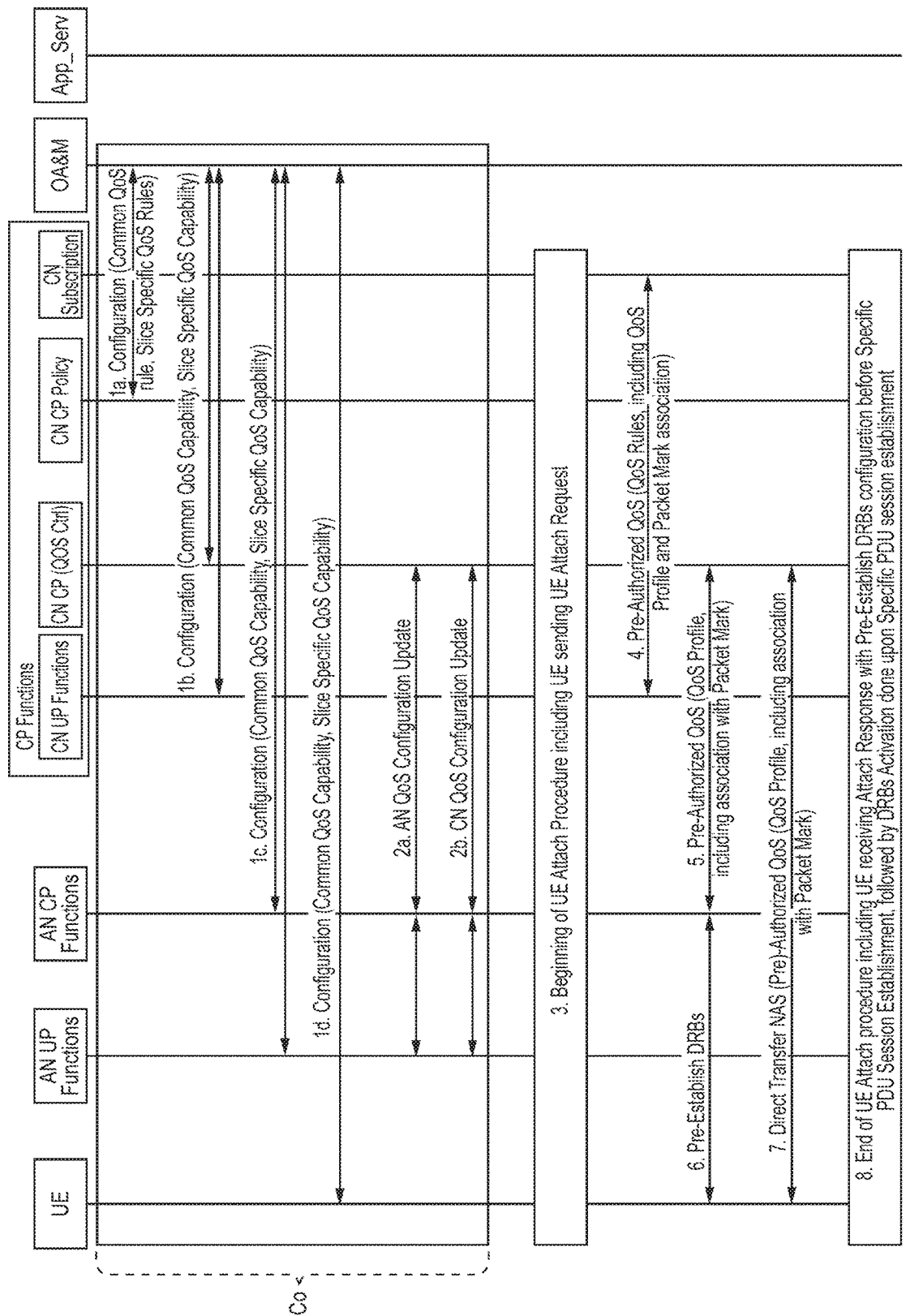
FIG. 35 is a diagram illustrating example control plane signaling that includes a pre-authorization of a QoS Profile.

Referring to FIG. 35, an example flow describing C-Plane signaling for pre-authorization of QoS profiles upon attachment of the UE to the network is shown, in order to accelerate and minimize control plane latency for subsequent service specific PDU session. For illustration purpose, the CN is broken down in to CN UP Functions and CN CP Functions. The CN CP functions are further broken down into CN CP Mobility Management (MM) and Session Management (including QoS control) functions, CN CP policy functions and CN subscription functions. By analogy to EPS/LTE architecture, the CN UP function may correspond to functions hosted by S-GW and P-GW. Similarly, the CN CP functions map correspond to functions hosted for e.g. by MME, PCRF and HSS.

In accordance with the example, at 1, the OA&M entity configures the CN CP Functions, specifically the CN CP policy Function with the supported QoS rules. The rules may comprise common QoS rules and network slice specific rules. The OA&M entity may configure the CN CP and UP Functions with the QoS capability that these functions can supported. Configured capability may be used for example in admission control or traffic throttling, for e.g. the CN CP may use the configured OA&M capability to admission control decision while the CN UP may use the configured capability to perform traffic throttling. The capability may be common capability of network slice specific capability and may be defined for e.g. in the form of various system capability metrics (e.g., DL & UL fronthaul bandwidth, DL & UL backhaul bandwidth, max CPU usage, etc.) and load metric (e.g. DL & UL maximum data rate, maximum number of sessions per PDU session type, etc.). An example of capability may be the total aggregate data rate that can flow through a CN UP function. Similarly, the OA&M entity may configure the AN CP Functions and AN UP Functions with the QoS capability that these functions can support. The capability may be common capability of network slice specific capability and may be defined for e.g. in the form of various system capability metric and load metric. The OA&M entity may also configure the UE (for e.g. via DM OTA procedures) with the QoS capability the UE can support. The capability may be common capability of network slice specific capability and may be defined for e.g. in the form of various device capability metrics or load metric. The network node being configured with OA&M configuration parameters may ACK/NACK back to the OA&M entity, the outcome of the configuration (success or failure).

At 2, in accordance with the example, configuration information is exchanges between AN and CN. At 2a, the AN-CN interface application level configuration data needed for the AN CP Functions and the CN CP Functions to interoperate correctly on the AN-CN interface is updated, in support of QoS resource capability for example network slice specific QoS resource capability. In some cases, this procedure might not affect existing UE-related contexts, if any. The AN CP Functions may initiate the procedure. Referring to 2b, in an example, the purpose of the "CN Configuration Update (QoS)" with update to QoS related parameters is to update AN-CN interface application level configuration data needed for the AN CP Functions and the CN CP Functions to interoperate correctly on the AN-CN interface in support of QoS resource capability for example network slice specific QoS resource capability. In some cases, this procedure does not affect existing UE-related contexts, if any. The CN CP Functions may initiate the procedure.

Still referring to FIG. 35, in accordance with the example, at 3, the UE initiates the registration/attachment procedure to the network. The UE may include in the attach procedure, assistance information that may enable extended-QoS pre-authorization by the network. As used herein, extended-QoS may refer to a set of QoS rules required by services other than the QoS rule associated with the default PDU session allowed by the UE subscription. The assistance information may be network slice specific or service family/use case specific (e.g. eMBB, URLL, mMTC). The assistance information may include information on UE's usage setting, Preferred Network behavior, UE capability including Network Capability, (pre)-configured QoS rules, and other configured/installed application information (e.g. application ID and requirements). The attach procedure may be the result of polling from the network side (e.g. DM OTA mechanism) for pre-configuration of the UE with authorized QoS rules.

At 4, in accordance with the example, the CN CP Functions, taking into account the UE subscription information, the network policy, the assistance information from the UE and the network load, pre-authorizes a set of QoS rules. The QoS rule may refer to a set of information enabling the detection of a service data flow and defining its associated QoS parameters or profiles including the QoS mark. The CN CP may pre-authorize QoS rules for multiple service data flows or simply packet flows. In some examples, the CN CP configures the CN UP with the pre-authorized QoS rules.

At 5, the CN CP signals to the AN CP Functions information from the authorized QoS rules relevant to the AN so corresponding bearers (or L2 data link structures) can be pre-established in the AN. The CN CP provides to the AN CP Functions the authorized QoS profiles and the mark (NAS level QoS mark of NAS level QoS Flow ID) for each profile. As discussed earlier, the mark associated with a QoS profile is used by the CN UP for packet marking. The QoS profile is a combination of all or a subset of QoS parameters. Optionally, the CN CP may also provide to the AN CP Functions, the TFTs and their association with the QoS profiles. The CN CP also provides to the AN CP Functions, an identifier that uniquely identify data flows within the context of the PDU session. The identifier may identify a single packet flow, or a group of packet flows for e.g. a SDF. This identity may be referred to herein as a packet flow identity. The AN CP Functions may configure the AN UP node with DRBs for the pre-authorized packet flows. In some cases, the DRB configuration in the AN UP node may also happen after configuration of the DRBs in the UE. In the UP (AN UP and CN UP), an association in the user plane at the Service Access Point (SAP) between the AN UP node (DRBs) and the CN UP node (packet flows) may be created.

Still referring to FIG. 35, at 6, in accordance with the example, the AN CP Node initiates DRBs (pre)-establishment toward the UE. For example, this may be done through a procedure similar to the RRC Reconfiguration procedure. The AN CP node signals to the UE the DRBs configurations for the authorized QoS profiles (DL and/or UL) and the mark (AS level QoS mark or AS level QoS Flow ID) for each profile. The configuration may also include the packet flow identity for each DRB or group of DRBs. An example of the configuration is shown in FIG. 36. In the DL, in some examples, the UE uses the packet flow identity to identify the matching DRB or DRBs so the received data is routed to the correct SAP in the upper layer. Similarly, in the UL, the UE uses the packet flow identity to identify the matching DRB or DRBs so the received data is routed onto the correct DRB for UL transmission. As used herein, this identity may be referred by many terms, for example, DRB-packet flow binding ID, DRB—packet flow SAP ID, network convergence protocol SAP ID, etc. The detail of association between DRBs and packet flows and the mapping of data packet to DRBs is further discussed below.

At 7, the UE and CN CP node exchange over NAS signaling with a direct message transfer over the AN, upper layer configuration for the pre-authorized QoS rules, which may include authorized QoS profiles and the mark (NAS level QoS mark of NAS level QoS Flow ID) for each profile. The configuration also includes the packet flow identity for each packet flow or group of packet flows, which is the same packet flows identifiers communicated to the UE AS. At 8, an Attach Complete message (or an equivalent message is sent to the network to indicate completion of the UE registration. It should be noted that at this point, data transfer over the pre-established DRBs is not possible, in some cases. However, if the attach procedure includes an establishment of a default packet flow connectivity, then data transfer may be possible over that default packet flow connectivity.

It is understood that the entities performing the steps illustrated in FIG. 35 may be logical entities that may be implemented in the form of software (i.e., computer-executable instructions) stored in a memory of, and executing on a processor of, an apparatus configured for wireless and/or network communications or a computer system such as those illustrated in FIGS. 52B and F. That is, the method(s) illustrated in FIG. 35 may be implemented in the form of software (i.e., computer-executable instructions) stored in a memory of an apparatus, such as the apparatus or computer system illustrated in FIGS. 52B and F, which computer executable instructions, when executed by a processor of the apparatus, perform the steps illustrated in FIG. 35. It is also understood that any transmitting and receiving steps illustrated in FIG. 35 may be performed by communication circuitry of the apparatus under control of the processor of the apparatus and the computer-executable instructions (e.g., software) that it executes.

Figure 37:
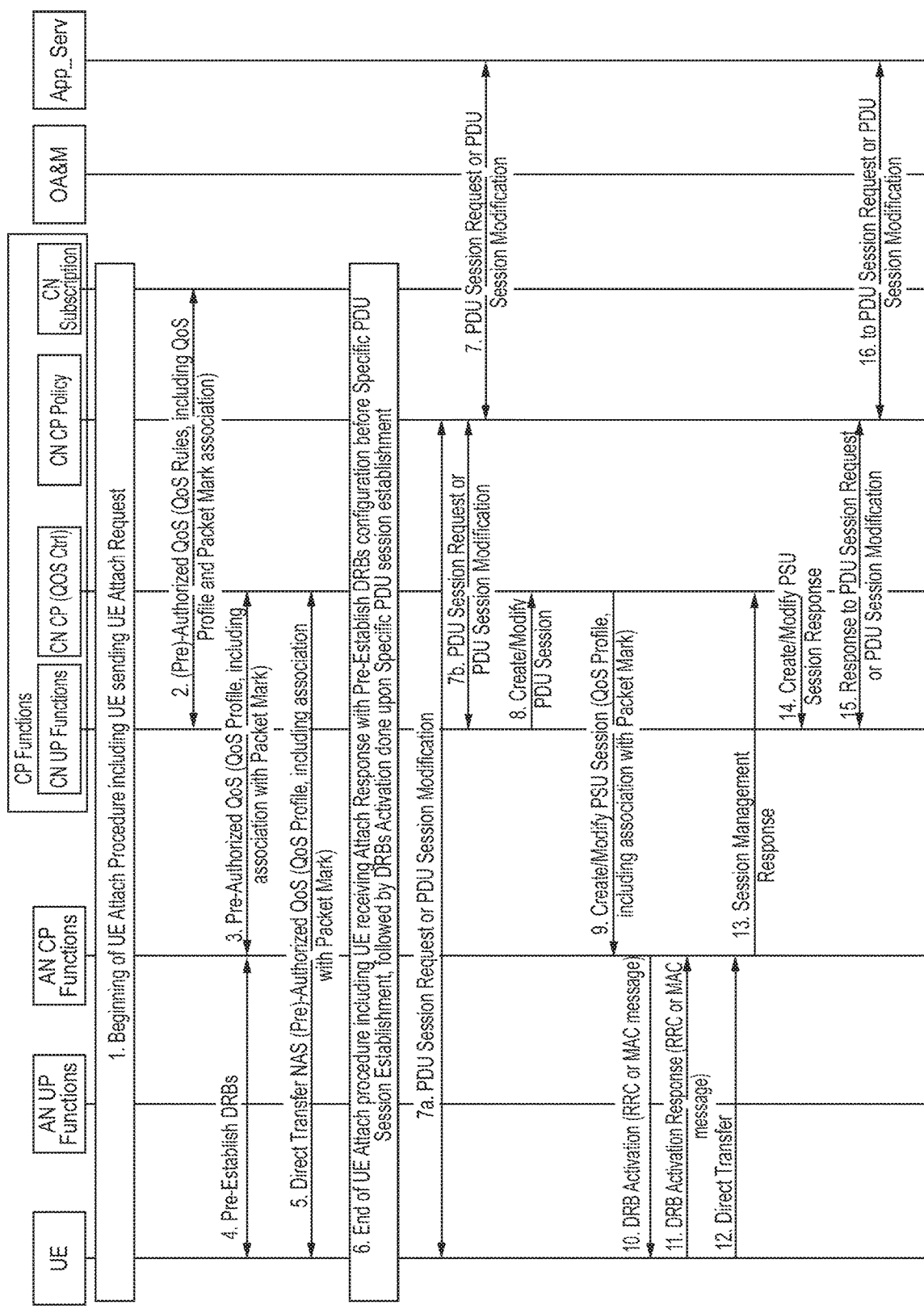
FIG. 37 is a diagram illustrating packet flows and an example DRB activation procedure.

Turning now to examples for Packet Flows and DRBs Activation, referring to FIG. 37, an example call flow describes C-Plane signaling for packet flow and DRB activation. Step 1 through 6 of FIG. 37 are the same as steps 3 to 8 of FIG. 35, which are described above.

At 7, a new PDU session establishment or Modification of an existing PDU session is triggered. This may be triggered by either the UE (step 7a) or the CN CP node (e.g. CN CP Policy entity, step 7b) or the Application server (step 7c) or by the AN (step 7d). The AN may trigger for e.g. a modification of an existing PDU session if the AN UP node received for e.g. a packet in the UL and detects a packet mark which doesn't have an association to a QoS profile within the context of this PDU session.

Still referring to FIG. 37, at 8, The CN Policy function authorize new QoS rule(s) and notifies the CN CP Functions for session management and QoS control. The notification to the CP Functions may include the authorized QoS profiles and the associated packet marks to be used in packet marking by the CN UP Functions. The CN UP is also notified with the authorized QoS rules.

At 9, the CN CP session management and QoS Control Functions then initiates toward the AN CP node, the activation of the pre-established packet flows that corresponds to the authorized QoS profiles. The CN CP node provides to the AN CP node, the packet flow identifiers of the pre-established flows to be activated. At this stage, the CN CP node may also initiate the establishment of packet flows not previously authorized. For e.g., if the AN CP node decides to change the mark of a previously pre-established packet flow, the CN may handle this as the establishment of a non-pre-established packet flow. In this case, the CN CP node provides to the AN CP node the authorized QoS profiles and the mark for each of the corresponding QoS profiles. As discussed earlier, the mark associated with a QoS profile is used by the CN UP node for packet marking. Optionally, the CN CP node may also provide to the AN CP node, the TFTs and their association with the QoS profiles. In some cases, the AN CP node performs admission control on the packet flow for which activation or establishment is being requested. The AN CP node may provide to the AN UP node, for each PDU session, the DRB IDs and the packet flow identifiers for the activated pre-authorized packet flows. In some examples, the AN CP node is also has configured the AN UP node with DRBs for the newly established packet flows. One or multiple DRBs may be configured for each admitted packet flow. In the UP (AN UP node and CN UP), an association in the user plane at the Service Access Point (SAP) between the AN UP node (DRBs) and the CN UP node (packet flows) is created for newly established packet flows i.e. for packet flows different from pre-authorized packet flows.

At 10, in accordance with the example, the AN CP node initiates DRB Activation toward the UE. The activation message includes for each PDU session, the DRB IDs and possibly the corresponding packet flow identifiers for the DRBs to be activated. The AN CP node also signals to the UE the configuration of new DRBs not previously pre-established QoS profiles (DL and/or UL) and the mark for each profile. The configuration also includes the packet flow identity for each DRB or group of DRBs, see example of configuration in FIG. 36. In the DL, the UE uses the packet flow identity to identify the matching DRB or DRBs so the received data is routed to the correct SAP in the upper layer. Similarly, in the UL, the UE uses the packet flow identity to identify the matching DRB or DRBs so the received data is routed onto the correct DRB for UL transmission. While we call DRB and packet flow association identity packet flow identity, this identity may be referred by many other terms for e.g. DRB-packet flow binding ID, DRB—packet flow SAP ID, network convergence protocol SAP ID, etc. The detail of association between DRBs and packet flows, and the mapping of data packet to DRBs are discussed below. RRC signaling may be used. For DRB activation, in some cases, MAC CE signaling may be used as well.

At 11, the UE sends DRB activation/New DRB establishment response message to the AN CP node. At 12, the UE sends a NAS direct transfer message to the AN CP node confirming the activation/new establishment of the packet flows. At 13, the AN CP node relays UE response message to the CN CP node. At 14, the CN CP node relays the UE response message to the CN UP node. At this step, the following actions may be executed if not already done. For example, the AN CP node may provide to the AN UP node, for each PDU session, the DRB IDs and the packet flow identifiers for the activated pre-authorized packet flows. The AN CP node may also configure the AN UP node with DRBs for the newly established packet flows. One or multiple DRBs may be configured for each admitted packet flow. In the UP (AN UP and CN UP), an association in the user plane at the Service Access Point (SAP) between the AN UP node (DRBs) and the CN UP node (packet flows) is created for newly established packet flows i.e. for packet flows different from pre-authorized packet flows. At 15 and 16, the CN CP node relays the UE response message to the CN Policy Functions and the network Application Function if necessary.

It is understood that the entities performing the steps illustrated in FIG. 37 may be logical entities that may be implemented in the form of software (i.e., computer-executable instructions) stored in a memory of, and executing on a processor of, an apparatus configured for wireless and/or network communications or a computer system such as those illustrated in FIGS. 52B and F. That is, the method(s) illustrated in FIG. 37 may be implemented in the form of software (i.e., computer-executable instructions) stored in a memory of an apparatus, such as the apparatus or computer system illustrated in FIGS. 52B and F, which computer executable instructions, when executed by a processor of the apparatus, perform the steps illustrated in FIG. 37. It is also understood that any transmitting and receiving steps illustrated in FIG. 37 may be performed by communication circuitry of the apparatus under control of the processor of the apparatus and the computer-executable instructions (e.g., software) that it executes.

Figure 38:
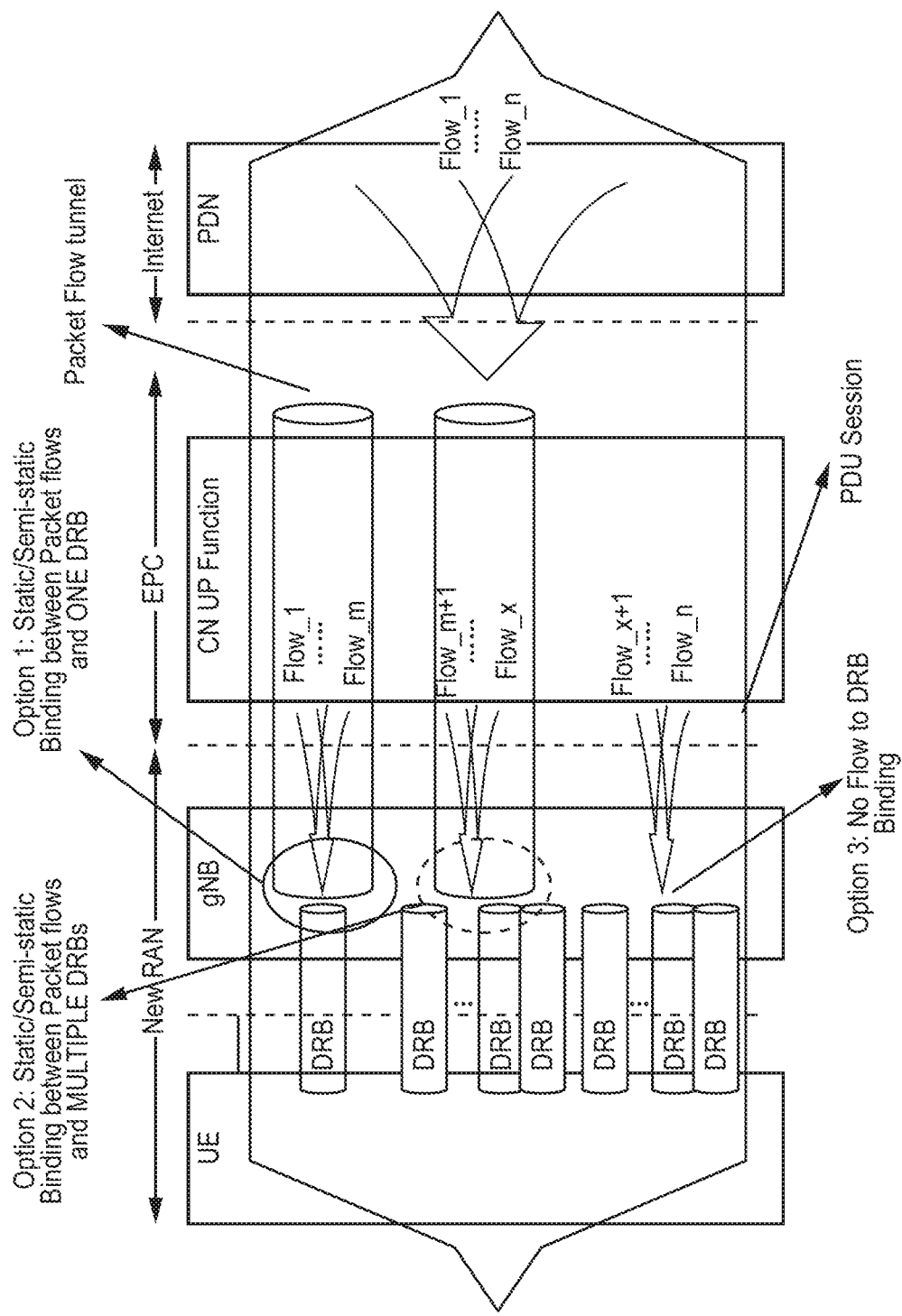
FIG. 38 is a diagram illustrating example association options between DRB and packet flows.

Turning now to associations between packet flows and DRBs in the control plane (CP), three examples are depicted in FIG. 38. In one example (Option 1), there is a static or Semi Static Binding between Packet Flows and One DRB. For example, the AN CP node (e.g. gNB CP Functions) configures one DRB or selects one DRB if already configured, capable of satisfying the QoS profile of the packet flow the DRB is being configured or selected to support. The AN CP node binds the DRB to the packet flow. As part of the binding, the AN CP node may instantiate internal user plane protocol stack data structure (downlink and uplink) that links the DRB to the packet flow. In one embodiment. the AN CP node records into its binding table (internal memory, database, etc.) an association between the DRB, the packet flow identifier, the QOS profile and the corresponding packet mark to be used in the user plane for packet marking. One packet flow (and one mark) is bound to only one DRB in this option. The biding remains in effect until the DRB is reconfigured (triggered by either the AN CP node, the UE, the CN or the application server) or the PDU session is reconfigured or modified. In another embodiment, the packet flow may be associated with a tunnel (downlink and uplink) that links the AN UP node with the CN UP node. The packet flows associated with the packet flow identifier are associated with the same tunnel (in uplink and in downlink). In this alternate embodiment, The AN CP node binds the DRB with the tunnel (in uplink direction and downlink direction). One DRB is bound to only one tunnel (in uplink and in downlink).

For each configured DRB, the AN CP node configures the UE with the corresponding packet flow identifier (see FIG. 36). The configuration message may be through MAC signaling (for e.g. in the case of DRB activation or RRC signaling in case of near DRB establishment). The CN CP node also configures the UE with the upper layer (layer above AS i.e. NAS) configuration information for example the QoS rules associated with the packet flow mapped to this DRB together with the packet flow identifier and the corresponding QoS mark. The UE use the packet flow identifier and/or the mark to bind the DRB (in both uplink and downlink) with the upper layer SAP associated with the packet flow the DRB is configured to support. As discussed earlier, the term packet flow is used generically here and might refer to group of packet flows (e.g., a service data flow.

In another example (Option 2, FIG. 38), there is Static/Semi-static Binding between Packet flows and multiple DRBs. I accordance with this example, the AN CP node configures more than one DRB or selects more than one DRB if already configured, capable of satisfying the QoS profile of the packet flow the DRBs are being configured or selected to support. As oppose to another example (Option 3) described further below, an aim of this option is to provide flexible QoS support without an additional overhead over the air interface. For e.g., in the downlink, the AN UP node may dynamically select from the set of DRBs bound by configuration to the packet flow the received packet belongs to, a DRB for transmission of the received packet. The AN CP node indicates as frequently as needed to the AN UP node, the DRB to use among the set of DRBs bound by configuration to the packet flow. The AN CP node may base such decision for e.g. on one or more of the following: the overall access network load condition which may include the radio interface load condition, the fronthaul, the backhaul load condition and hardware load condition, the service subscription level (e.g. platinum user, gold user, silver user, bronze user, etc.), the subscriber profile ID for RAT/frequency priority (SPID) parameter received by the NR node from the CN or from another NR node. Note SPID is an index referring to user information (e.g. mobility profile, service usage profile). The information is UE specific and applies to all its Radio Bearers.

In some cases, AN CP node binds the set of DRBs to the packet flow (in both downlink and uplink). As part of the binding, the AN CP node may instantiate internal user plane protocol stack data structure that links the set of DRBs to the packet flow. In one embodiment, the AN CP node records into its binding table (internal memory, database, etc.) an association between the set of DRBs, the packet flow identifier, the corresponding QOS profiles and the corresponding packet mark to be used in the user plane for packet marking. The biding remains in effect until the set of DRBs are reconfigured (triggered by either the AN CP node, the UE, the CN or the application server) or the PDU session is reconfigured or modified. In another embodiment, the packet flow may be associated with a tunnel (downlink and uplink) that links the AN UP node with the CN UP node. The packet flows associated with the packet flow identifier are associated with the same tunnel (in uplink and in downlink). In this alternate embodiment, the AN CP node binds the set of DRBs with the tunnel (in uplink direction and downlink direction). In some cases, one set of DRBs is bound to only one tunnel (in uplink and in downlink).

For each configured set of DRBs, the AN CP node configures the UE with the corresponding packet flow identifier (see FIG. 36). The configuration message may be through MAC signaling (for e.g. in the case of DRB activation or RRC signaling in case of near DRB establishment). The CN CP node also configures the UE with the upper layer (later above AS i.e. NAS) configuration information for example the QoS rules associated with the packet flow mapped to this set of DRBs together with the packet flow identifier and the corresponding QoS mark. The UE use the packet flow identifier and/or the mark to bind the set of DRBs (in both uplink and downlink) with the upper layer SAP associated with the packet flow the set of DRBs is configured to support. As discussed earlier, the term packet flow is used generically here and might refer to group of packet flows for e.g. a service data flow.

In yet another example (Option 3 in FIG. 38), there is no flow to DRB binding. Packets are dynamically mapped to DRB. For example, in some cases, there is no binding between DRBs and packet flows by configuration in either the UE or the AN. The behavior of both the NR Node and the UE are similar to what is described in option 2 with respect to the point that the selection of which DRB to use to transmit the received packet is somewhat dynamic. In the downlink, the AN CP node dynamically selects which DRB to use for transmission and notifies the AN UP node which then use that DRB until a change notification from AN CP node. The AN UP node may also autonomously select what DRB to use upon data packet reception. Similarly, in the uplink, the UE may dynamically selects which DRB to use upon reception of data packet from upper layer of the UE. One issue addressed below is how the received packets are routed to the correct upper layer SAPs since this is no configured binding between the DRB and the upper layer SAPs.

Turning now to data packet mapping to bearers in the user plane, in an example, DRBs and the packet flows are assumed to be bound by configuration, with one pack flow bound to only one DRB and one DRB bound to only one packet flow. Two packet flows with different identifiers are bound to different DRBs. With respect to DL in the AN UP node, in an example, the AN UP node uses the tunnel of the received packet to identify the DRB for the transmission of the received downlink packet. In another embodiment, the AN UP node uses the mark included in the received packet to identify the DRB for the transmission of the received downlink packet. The AN UP node maps the received packet to the identified DRB for transmission. The AN UP node may perform packet marking by including in the transmitted packet, the QoS mark for this packet. With respect to UL in the AN UP node, in one example, the AN UP node uses the internal bind/association between DRB data link structure and the tunnel or the data link structure associated with the DRB to route the received packet toward the CN UP node. In another embodiment, the AN UP node uses the mark included in the received packet to identify the packet flow and the routing path into the CN UP node for this packet. With respect to DL in the UE, in example, upon receiving a packet in the downlink, the UE forwards the packet to the upper layer Service Access Point (SAP) associated with DRB where the packet is received. In one embodiment, the UE uses its internal binding/association between DRB and upper layer SAP. In another embodiment, the UE uses the mark in the received packet to identify the upper layer SAP associated with this DRB. With respect to UL in the UE, in one example, in the uplink, the UE received packet data from the upper SAP associated with a packet flow identifier. The UE identifies the DRB associated with the SAP for e.g. from its internal database where the mapping between the SAPs and DRBs are maintained. The UE transfer the receive packet from the upper layer SAP to the PDCP entity (or the NR equivalent) associated with the identified DRB. The UE may perform packet marking by including in the header of the transmitted packet, the QoS mark associated with the packet flow identifier.

In another example in which there is Static/Semi-static Binding between Packet flows and MULTIPLE DRBs, DRBs and the packet flows are assumed to bound by configuration, with one pack flow bound to a set of DRBs and one set of DRBs bound to only one packet flow with one pack flow identifier. Two different set of DRBs are bound to different packet flows having different packet flow identifiers. During RB establishment (activation of pre-established bearer or establishment of new bearers), the AN CP node identifies a set of QoS profiles able to fulfill the QoS requirements for a packet flow and binds a set of DRBs matching these QoS profiles to the pack flow.

This example may allow flexible QoS differentiation where the DRB to use for a particular packet may be decided at the time of the reception of the packet or at least vary over time without reconfiguration signaling between AN CP node and the UE.

In one embodiment, the AN UP node uses the tunnel of the received packet to identify the set of DRBs that can be used for the transmission of the received downlink packet. In another embodiment, the AN UP node uses the mark included in the received packet to identify the set of DRBs that can be used for the transmission of the received downlink packet.

The following embodiments may be used to determine among the set of DRBs, the DRB to use for the transmission of the received packet. In one embodiment, the AN CP node (e.g. gNB in the control plane) may dynamically select from the set of DRBs bound by configuration to the pack flow, a DRB for transmission of the received packet. The AN CP node then instructs the AN UP node of the DRB selected for the transmission of this packet. The AN CP node may base such decision for e.g. on one or more of the following: the overall access network load condition which may include the radio interface load condition, the fronthaul, the backhaul load condition and hardware load condition, the service subscription level (e.g. platinum user, gold user, silver user, bronze user, etc.), the subscriber profile ID for RAT/frequency priority (SPI) parameter received by the NR node from the CN or from another NR node. Note SPID is an index referring to user information (e.g. mobility profile, service usage profile). The information is UE specific and applies to all its Radio Bearers. Upon trigger from the AN UP node or periodically with a preconfigured periodicity. The AN UP node may trigger AN CP node for DRB selection for e.g. upon packet reception or periodically according to a preconfigured periodicity. In another embodiment, the AN UP node may autonomously dynamically select from the set of DRBs bound by configuration to the pack flow, a DRB for transmission of the received packet. The AN UP node maps the received packet to the selected DRB for transmission. The AN UP node may perform packet marking by including in the transmitted packet, the QoS mark for this packet.

In one embodiment, the AN UP node uses the internal bind/association between DRB data link structure and the tunnel or the data link structure associated with the DRB to route the received packet toward the CN UP node. In another embodiment, the AN UP node uses the mark included in the received packet to identify the packet flow and the routing path into the CN UP node for this packet. With respect to DL in the UE, upon receiving a packet in the downlink, the UE forward the packet to the upper layer Service Access Point (SAP) associated with DRB where the packet is received. In one embodiment, the UE uses its internal binding/association between DRB and upper layer SAP. In another embodiment, the UE uses the mark in the received packet to identify the upper layer SAP associated with this DRB. With respect to UL in the UE, in an example, the UE received packet data from the upper SAP associated with a packet flow identifier. The UE identifies the set of DRBs associated with the SAP for e.g. from its internal database where the mapping between the SAPs and DRBs are maintained. The UE then select a DRB from the identify set of DRBs. The UE may select the DRB according to one of the following embodiments. The UE uses the in the UL, the same DRB as the one being used for the corresponding downlink packet flow. It should be noted that a DRB may be mapped to downlink packet flows and uplink packet flows. This embodiment assumes UE has previously received downlink packet of the same packet flow (i.e. same packet identifier). In another embodiment, the UE autonomously selects a DRB from the identified set of DRBs. Such selection may be based on indication from AN CP (through RRC signaling or MAC CE signaling). Alternatively, the UE may base its selection on one or more of the following: the overall access network load condition which may include the radio interface load condition, the fronthaul, the backhaul load condition and hardware load condition, the service subscription level (e.g. platinum user, gold user, silver user, bronze user, etc.), the operator policy for QoS profile usage (for e.g. based on load estimate and subscription profile).

The UE transfer the receive packet from the upper layer SAP to the PDCP entity (or the NR equivalent) associated with the selected DRB. The UE may perform packet marking by including in the header of the transmitted packet, the QoS mark associated with the packet flow identifier.

In another aspect in which there is no flow to DRM binding, there is no binding between DRBs and packet flow by configuration, the behavior of both the NR Node and the UE are similar to what is described in option 2 with respect to the point that the selection of which DRB to use to transmit the received packet is dynamic. In the downlink, the NR node dynamically selects which DRB to use upon reception of data packet. Similarly, in the uplink, the UE dynamically selects which DRB to use upon reception of data packet from upper layer of the UE.

It is recognized herein that one issue to address is how the received packets are routed to correct upper layer SAPs since this is no configured binding between the DRB and the upper layer SAPs. To address this issue, in one example described herein, a new packet Flow Encapsulation Protocol (FEP) that sits on top of the lower layer access stratum (AS) SAP (e.g., PDCP or NR equivalent). In some cases, the FEP is below the network/transport layer (for e.g. UDP/IP or PDCP/IP in case of IP data). While the term Flow Encapsulation Protocol is used herein, the term Service Data Adaptation Protocol (SDAP) may also be used. Thus, FEP and SDAP may be used interchangeably herein, without limitation.

With respect to downlink in the AN UP Node, in one embodiment, the AN UP node uses the mark included in the received packet to identify and select the QoS profile, and therefore the DRB that can be used for the transmission of the received downlink packet.

This may allow flexible QoS differentiation, where the DRB to use for a particular packet may be decided at the time of the reception of the packet or at least may be changed on the fly over time without reconfiguration signaling between AN CP node and the UE. Various example mechanisms may be used to determine the QoS Profile, and therefore the DRB to use for the transmission of the received packet. In one example, the AN CP node (e.g., gNB in the control plane) may dynamically select the QoS profile based on one or more of the following, presented by way of example and without limitation: the overall access network load condition which may include the radio interface load condition, the fronthaul, the backhaul load condition and hardware load condition, the service subscription level (e.g. platinum user, gold user, silver user, bronze user, etc.), the subscriber profile ID for RAT/frequency priority (SPID) parameter received by the NR node from the CN or from another NR node. The AN CP node may dynamically select the QoS profile upon trigger from the AN UP node or periodically with a preconfigured periodicity. The AN UP node may trigger AN CP node for DRB selection for e.g. upon packet reception or periodically according to a pre-configured periodicity. In another embodiment, the AN UP node may autonomously dynamically select a QoS profile and therefore the DRB for transmission of the received packet. Upon selection of QoS Profile, if there is no already established DRB with QoS profile that matches the selected QoS profile, a new DRB may need to be established. The node (either AN CP node or AN UP node) selecting the DRB may trigger a new DRB establishment. The AN UP node may trigger the AN CP node to initiate a new DRB establishment.

In some cases, the AN UP node maps the received packet to the selected DRB for transmission. The AN UP node may perform packet marking by including in the transmitted packet header (FEP header), the QoS mark for this packet. The AN UP node may also include additional information (e.g., binding identifier, packet flow identifier, etc.) into the packet header to help the routing of the packet in the UE to the correct upper layer service access point (SAP).

With respect to uplink in the AN UP node, in accordance with one example, the AN UP node may use the information (e.g., QoS mark, binding identifier, packet flow identifier) included in the received packet header (FEP header) to identify the packet flow and the routing path toward the CN UP node for this packet. Similarly to the downlink case, the AN UP node may autonomously identify the uplink routing path toward the CN UP node. Alternatively, the CN CP node may instruct the CN UP node of the routing path to use for routing the received packet toward the CN UP. The AN CP node may preconfigure the AN UP node with an association table between QoS marks (and/or information from the packet header such as binding identifier, packet flow identifier) and routing paths. The AN UP node may trigger the AN CP node for information on the association between routing path and the content of the header of the received packet. This trigger may be upon packet reception or a periodic request based on a predefined periodicity.

With respect to downlink in the UE, in one example, upon receiving a packet in the downlink, the UE uses the QoS mark included in the received packet header (FEP header) to identify the upper layer Service Access Point (SAP) for the delivery of the received packet. In another embodiment, the UE may use a binding identifier (e.g., tunnel identifier, packet flow identifier, etc.) that is encapsulated in the packet header to identify the upper layer Service Access Point (SAP) for the delivery of the received packet. In another embodiment, the UE may use a combination of the information in the received packet header (e.g., QoS mark, binding identifier, packet flow identifier) to identify the upper layer Service Access Point (SAP) for the delivery of the received packet. In the case a Reflective QoS Indicator (RQI) is included in the received packet header, the UE may associate this information with the QoS profile of the corresponding packet flow.

In the uplink, in an example, the UE received packet data from the upper SAP associated with a packet flow. The UE identifies a QoS profile (of the packet flow the received pack belongs to) for this SAP, for example, from its internal database. In the case of use of RQI, the QoS profile should match the QoS profile of DL packet flow associated with this UL packet flow. In one embodiment, the UE selects a DRB able to fulfil the identified QoS. The UE may select the DRB according to one of the following embodiments. The UE uses the in the UL, the same DRB as the one being used for the corresponding downlink packet flow. It should be noted that a DRB may be mapped to downlink packet flows and uplink packet flows. This embodiment assumes UE has previously received downlink packet of the same packet flow (i.e. same packet identifier). In another embodiment, the UE autonomously selects a DRB from the identified set of DRBs. Such selection may be based on indication from AN CP node (through RRC signaling or MAC CE signaling). Alternatively, the UE may base its selection on one or more of the following: the overall access network load condition which may include the radio interface load condition, the fronthaul, the backhaul load condition and hardware load condition, the service subscription level (e.g., platinum user, gold user, silver user, bronze user, etc.), the operator policy for QoS profile usage (for e.g. based on load estimate and subscription profile).

In some cases, the UE transfers the receive packet from the upper layer SAP to the PDCP entity (or the NR equivalent) associated with the selected DRB. The UE may perform packet marking by including in the packet header of the transmitted packet, one or more of the following: a QoS mark associated with the packet flow identifier, a binding identifier, packet flow identifier.

Thus, as described above, an apparatus may receive a first data packet that includes a mark that identifies a quality of service profile associated with the data packet. Based on the quality of service profile, the apparatus may select a destination for transmitting the packet, and the apparatus may transmit the data packet to the destination, wherein the data packet includes the mark. For example, the data packet may be received in a downlink communication in the network, and the destination may include an upper layer service access point of the apparatus. Further, in another example, based on the quality of service profile, the apparatus may select a data radio bearer for transmitting the packet, thereby selecting the destination. The apparatus may transmit the data packet to the destination over the selected data radio bearer.

In accordance with another example, as described above with respect to the RQI, an apparatus may receive a first packet in a first direction in the network. The first packet first packet may include a mark that identifies a quality of service profile associated with the first packet. Later, the apparatus may receive a second packet in a second direction in the network that is opposite the first direction. The apparatus may identify a filter in the second packet and determine that the filter is associated with the mark in the first packet. Based on determining that the filter is associated with the mark, the apparatus may insert the mark in the second packet and transmit the second packet in the second direction, wherein the first direction is one of an uplink or downlink direction, and the second direction is the other of the uplink or downlink direction.

Turning now to examples of the flow encapsulation protocol, in one example, the RRC is in control of the FEP configuration. In another example, functions of the FEP sublayer are performed by FEP entities. For an FEP entity configured at the NR Node (e.g. gNB), there is a peer FEP entity configured at the UE and vice versa. In one example, with respect to all UE bearers, there is one FEP entity in the eNB and one FEP entity in the UE. In an alternative example, a single FEP entity may be configured per PDU session. In the case of dual connectivity or multi-connectivity, the UE may be configured with one FEP protocol entity per cell group controlled by either a MastergNB (MgNB) or a Secondary gNB (SgNB). For e.g. in the case of dual connectivity, where different QoS flows from the same PDU session are mapped to different Cell groups e.g. MgNB and SgNB, the UE may be configured with one FEP entity per session per Cell group i.e. in this case, one FEP entity in MgNB and one FEP entity in SgNB for this session.

Figure 39:
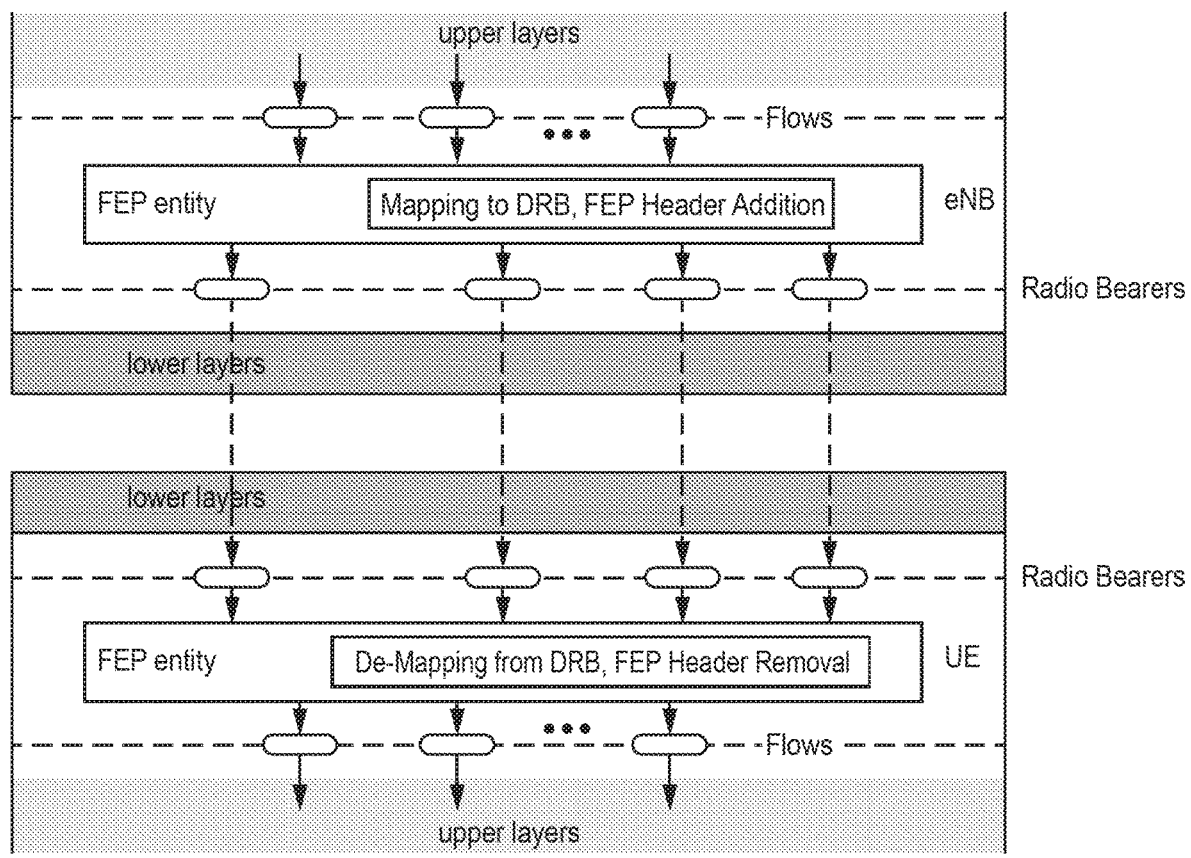
FIG. 39 is a diagram illustrating an example overview model of a flow encapsulation protocol (FEP) sublayer in the downlink.
Figure 40:
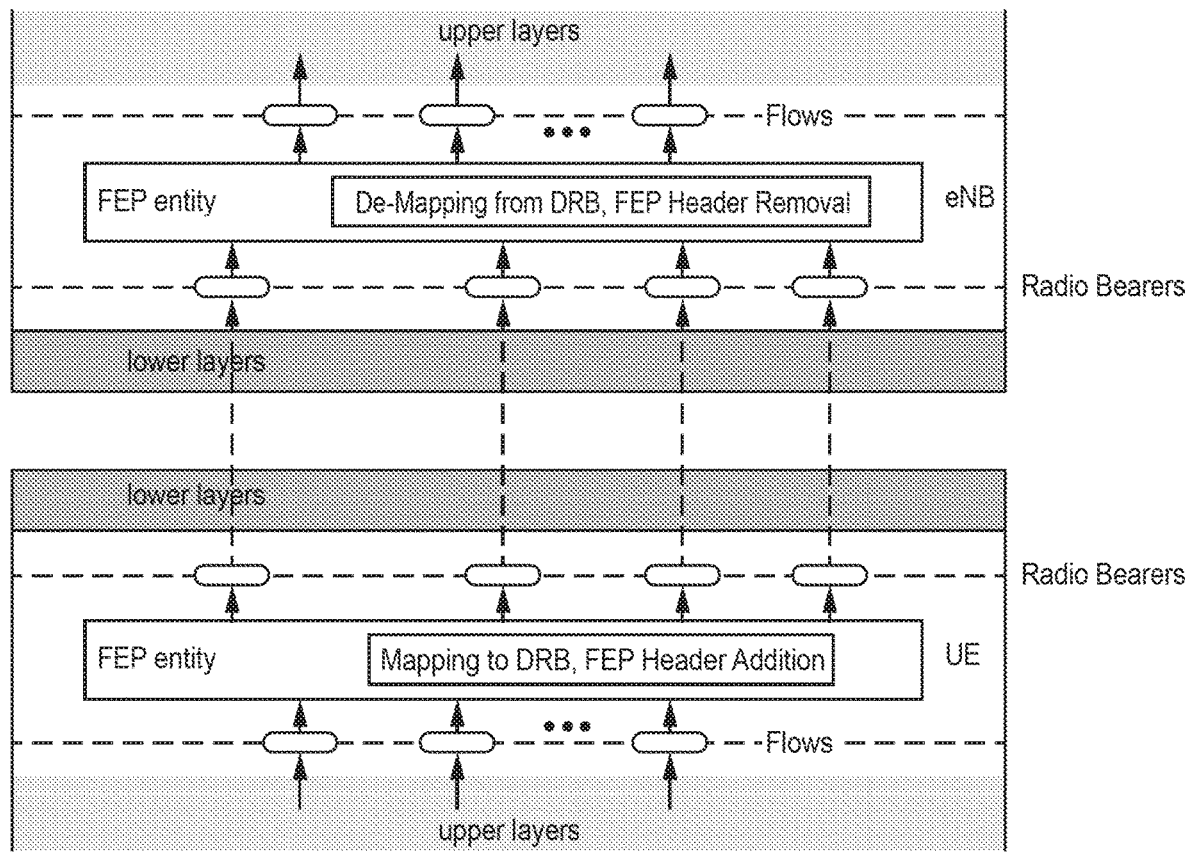
FIG. 40 is a diagram illustrating an example overview model of the FEP sublayer in the uplink.

In some cases, a FEP entity receives/delivers FEP SDUs from/to upper layers (e.g. UDP/IP or TCP/IP in the UE and CN UP node in the network side) and sends/receives FEP PDUs to/from its peer FEP entity via Uu radio interface or the NR equivalent. At the NR node, when an FEP entity receives an FEP SDU from upper layers, it may construct the corresponding FEP PDU and delivers it to lower layers. At the UE, when an FEP entity receives an FEP PDU from lower layers, it may reassemble the corresponding FEP SDU and delivers it to upper layers. FIGS. 39 and 40 illustrate an example overview model of the FEP sublayer in downlink and uplink, respectively. In an example FEP entity delivers/receives the following FEP PDU to/from a lower layer entity: FEP data PDU. With respect to services provided to upper layers the FEP may provider transfer of the user data plane services to upper layers (e.g., IP). As an example, services expected from lower layers (e.g., PDCP) may include transfer of user plane data. The FEP sublayer may support, for example and without limitation: transfer of user plane data; identification of the packet flow (and therefore the upper layer SAP) to which the FEP SDU belongs; mapping between a QoS flow and data radio bearer; and marking QoS flow in both DL and UL packets.

Turning now to an example FEP mode of operation, a FEP entity may be configured with two modes of operation: Transparent Mode (TM) of operation and Non-Transparent Mode (NTM) mode of operation. The TM mode of operation may be required for e.g. for latency sensitive application and any other use case where the biding between QoS flows and data radio bearer is statically or semi-statically configured (no dynamic mapping of packet to data radio bearer as part of packets processing the access stratum in the UE or in the radio access network), or can be implicitly derived by the receiver. The mode of operation may be better understood as the presence or lack of presence of QoS Flow ID or packet marker as broadly defined in this disclosure. In NTM mode QoS Flow ID or packet marker is present in the FEP header. In one embodiment, the UE may be configured by the gNB through control plane signaling e.g. RRC signaling with the mode of operation. In this case, the UE may be configured with one TM mode entity and one NTM entity per session per cell group. In another embodiment, the use of TM mode or NTM mode is through in-band signaling in the user plane. In this option, the same FEP entity handles both TM and NTM modes of operation per session and per cell group. The transmitter of FEP PDU (gNB in DL and UE in UL) includes in the FEP header, an indicator that informs the receiver of whether or not whether the mode of operation is TM mode or NTM.

In an example transparent mode of operation (when UE is configured with a TM entity), the FEP includes no FEP header in FEP PDU.

In an example transmit operation, when submitting a new Transparent Mode Data (TMD) PDU to lower layer, the transmitting FEP entity that is configured as TM FEP entity submits a FEP SDU without any modification to lower layer. In an example receive operation, when receiving a new TMD PDU from lower layer, the receiving FEP entity that is configured as TM FEP entity delivers the TMD PDU without any modification to upper layer.

In some cases, DL data transfer procedures by a FEP entity that supports NTM mode of operation or in-band signaling TM mode of operation. In this scenario, the FEP includes an FEP header into the FEP PDU. In an example receive operation, when receiving an FEP data PDU from lower layers (e.g. PDCP), the FEP entity in the UE, if the mode indicator indicates NTM mode of operation: identifies the upper layer entity to which the FEP SDU is destined based on the information included in the FEP header for e.g. packet flow ID included in the FEP header; reassembles the FEP SDU from the FEP data PDU by removing the FEP header from the FEP data PDU; and/or delivers the reassembled FEP SDU to the upper layer entity identified by the packet flow ID. The UE may perform reflective QoS association by updating uplink QoS profile to DRB mapping (in AS) and/or uplink flow filters to QoS profile mapping (in NAS). If the mode indicator indicates TM mode of operation, the UE receiving entity may deliver the TMD PDU to upper layer based on its implicit knowledge of the upper layer SAP.

In example transmit operations, when receiving an FEP data SDU from upper layers (e.g. IP), the FEP entity in the UE may, if the mode indicator indicates NTM mode of operation: identify the lower layer entity to which the FEP PDU is destined to by performing a DRB selection (e.g., perform QoS Flow packet to DRB mapping); assemble the FEP PDU by adding to the FEP SDU, the FEP header; and/or deliver the assembled PDU to the lower layer entity that correspond to the selected DRB. If the mode indicator indicates TM mode of operation, the UE transmitting entity may submit a FEP SDU to lower layer based in the implicit knowledge of the QoS profile/SAP to DRB mapping.

When an FEP entity receives an FEP PDU that contains reserved or invalid values, the FEP entity may discard the received PDU.

Figure 41:
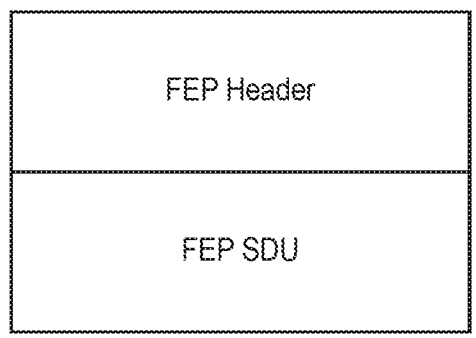
FIG. 41 is a diagram illustrating an example FEP data PDU.

In an example, a FEP PDU is a bit string that is byte aligned (i.e. multiple of 8 bits) in length. In the FIG. 41, bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within an FEP PDU is represented with the first and most significant bit in the leftmost bit and the last and least significant bit in the rightmost bit. An FEP SDU may be a bit string that is byte aligned (e.g., multiple of 8 bits) in length. An FEP SDU is included into an FEP PDU from the first bit onward. The FEP entity may ignore the value of reserved bits (if any) in the FEP Header.

An example FEP header may include one or more of the following, presented by way of example and without limitation: packet flow identity, QoS mark, binding identifier, one or more reserve bit. Furthermore, the QoS mark (or marker) may be AS layer QoS mark specific or NAS layer QOS mark specific or may include both AS layer QoS mark and NAS layer QoS mark. The presence of AS QoS mark may be indicated by a single bit where the value 1 indicates the AS QoS mark is present in the FEP header while 0 indicate the QoS mark is not present in the FEP header. Similarly, the presence of NAS QoS mark may be indicated by a single bit where the value 1 indicates the NAS QoS mark is present in the FEP header while 0 indicate the NAS QoS mark is not present in the FEP header. The mode of operation indicator maybe represented by the AS QoS mark bit or the NAS QoS mark bit or both. For e.g. the UE FEP entity may interpret the reception of AS QoS marker bit set to 0 and the NAS QoS marker bit set to 0 as TM mode operation.

Turning now to example procedures in support of UL scheduling, an UL resource grant may be defined in terms of basic physical resource block defined in time-frequency domain together with the modulation and coding scheme and redundancy version information. The UL grant may also include power control information for UL transmission, and indication/resources for UL ACK/NACK transmission. Since in NR, the UE may provide differentiated QoS by means of operations over more one numerology simultaneously, where each numerology may be different in terms of number of symbols per subframe, subcarrier spacing, TTI, slot and mini-slot size, the scheduling grant may be function of the numerology. The basic unit in time-frequency domain for resource grant may be defined as a pair of resource blocks that occupies, in time domain the duration of a specified basic time unit that we will call subframe here in after, of duration $d_s$ over l symbols, and occupies in frequency domain m KHz subdivided into k subcarriers. Parameter k and/or m may be numerology specific. Alternatively, parameters k and/or m may be common across multiple numerologies. Similarly, symbols duration $d_s$ may be numerology specific or common across numerologies. Additionally, the parameters l may be numerology specific or common across numerology. A reference numerology may be defined, with reference parameters $l_{ref}$, $d_{ref}$, $k_{ref}$ and $m_{ref}$. Other specified numerologies may be defined as a function of the reference numerology with scaling factor(s) defined for each of the parameters $l_{ref}$, $d_{ref}$, $k_{ref}$ and $m_{ref}$.

Figure 42:
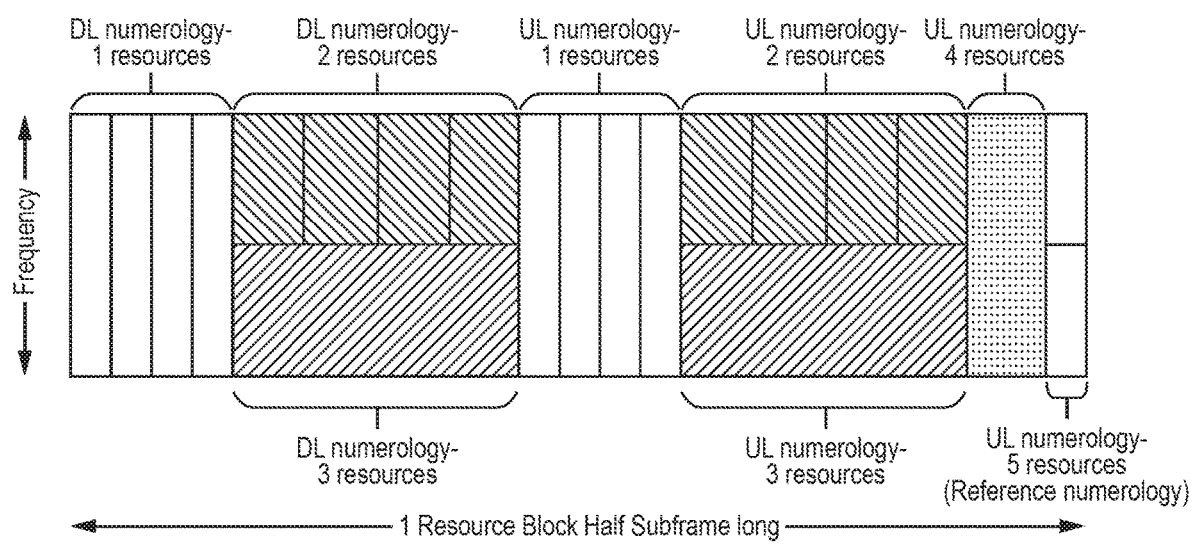
FIG. 42 is a diagram illustrating an example of Resource Allocation by a gNB to the UE, wherein the UL resource grant assignment is Numerology Specific.
Figure 43:
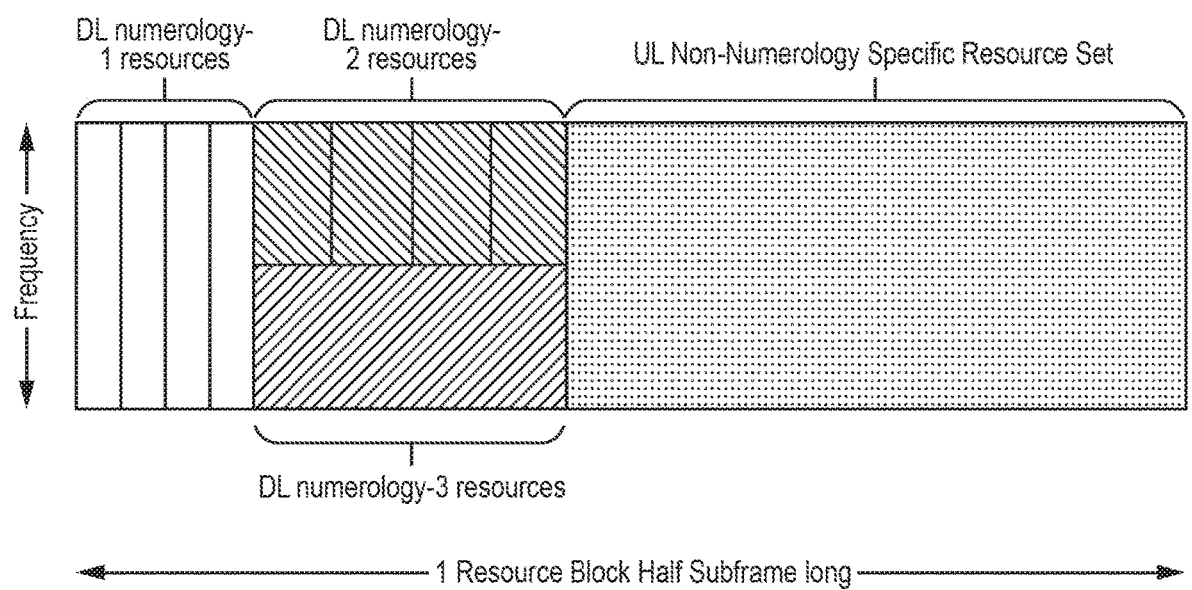
FIG. 43 is a diagram illustrating an example of resource allocation by the gNB to the UE, where the UL resource grant assignment is not specific to any numerology with which the UE is configured.
Figure 44:
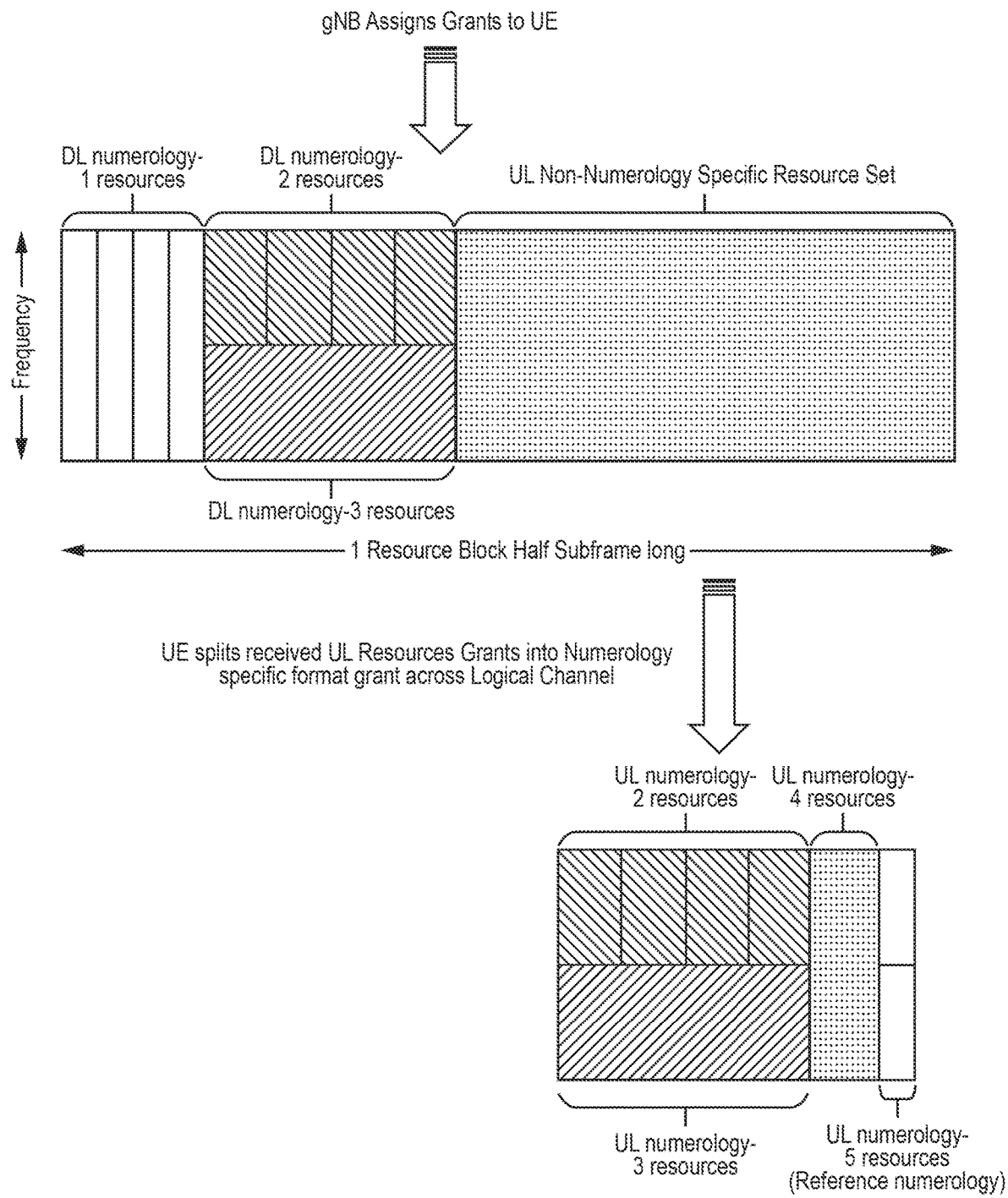
FIG. 44 is a diagram illustrating an example in which a UE Splits the Numerology Common Resource Grant into Numerology Specific Resource Grants across Logical Channels.

The network may allocate resource grants to UE which are numerology specific (FIG. 42) or non-numerology specific (FIG. 43). The UE may in its turn split the received non numerology specific resource grants into numerology specific grants and distribute these numerology specific resources (FIG. 44) across the logical channels the UE is configured with. Whether the allocated grant is numerology specific or common to more than one numerology, the grant may explicitly carry one or more transmission profile value(s). Alternatively, the UE may implicitly derive the transmission profiles associated with the grant. One scenario where the UE may implicitly derive the transmission profile of a resource grant is a scenario where a cell or a component carrier is configured with only one transmission profile. In such case, the UE will know the transmission profile associated with resources grants allocated on that component carriers without an explicit indication by the gNB. Another example of scenario where the UE may implicitly derive the transmission profile of a resource grant is the scenario where a default transmission profile is configured. Such default transmission profile may be at the UE level, or at the for a cell or component carrier level, or at the level of a group of cell or component carrier level. In this scenario, when the UE received a grant with no transmission profile indicated, the UE may derive the transmission profile as the configured default transmission profile.

With respect to network controlled resource grant allocation, in one example (Option 1), resource/scheduling grants are common to network slices (i.e. grants are not network slice specific). Data from different network slices may be mapped to the same grant. As an example of this embodiment, the gNB may configure the UE with a resource grant that can be used for the transmission of uplink data from more than one logical channel, where at least some of the logical channels belong to different network slices. The UE allocates the received grants to the transmission of UL data from logical channel channels, where at least some of the logical channels are configured for different network slices. The UE determine through logical channel prioritization procedure, the allocation of the received grants to logical channels for which the resource grants are allocated. The UE may distribute the resource grants to logical channels, where at least two or more of the logical channels belongs to different network slices. The UE enforces the restrictions of logical channels mapping to numerologies received from the gNB within the logical channel prioritization procedure.

In another example (Option 2), resource/scheduling grants are common to physical layer (PHY) numerologies i.e. grants are not PHY numerology specific. PHY numerologies may share the same resource grant. For example, in the UE in the uplink direction, data from more than one numerology may be mapped to the same resource grant. In this case, data of different PHY numerologies may be carried on the PHY channel resources in the scheduling grant using the signaled numerology parameters/formats in the scheduling grant. In an exemplary embodiment, the gNB may allocate to the UE UL resources grant in time-frequency domain that are not numerology specific. For example, the grant might be expressed at the granularity level of physical resource blocks defined for a reference numerology or defined as a basic time-frequency unit common to all numerologies or a subset of numerologies (see FIG. 43). The UE determine through logical channel prioritization procedure, the allocation of the received grants (FIG. 44) to logical channels for which the resource grants are allocated. The UE may distribute the resource grants to logical channels, where at least two or more of the logical channels belongs to different numerologies. The UE enforces the restrictions of logical channels mapping to numerologies received from the gNB within the logical channel prioritization procedure.

In yet another example (Option 3), resource grants are network slice specific (i.e. data from different network slices are mapped to different grants). Each network slice may have more than one resource grant in any particular TTI or time interval X.

In still another example (Option 4), resource grants are numerology specific (i.e. data from different PHY numerologies are allocated different resource grant. Each PHY numerology may be allocated more than one resource grant in one TTI or time interval X, for e.g. as a function of the data flows, services, applications or network slices mapped to the numerology. In an exemplary embodiment, the UE may be configured with resources defined for a specific numerology (See FIG. 42). The UE allocate the received grant to logical channels according to logical channel prioritization rules. During logical channels prioritization procedure, the UE shall exclude from consideration, logical channels not allowed to be mapped to the numerology of the configured resources. Further, resource grants may be logical channel specific or logical channel group specific (Option 5). In another example case, resource grants are application specific (Option 6). In another example (Option 7), resource grants are data flows specific. In another example (Option 8), a combination of two or more of the options above are combined. For example, some resource grants may be configured to be network slice specific while some other resource grants are configured as common resource grants among two or more network slices.

NR Resource Grant Example Option 1

Figure 45:
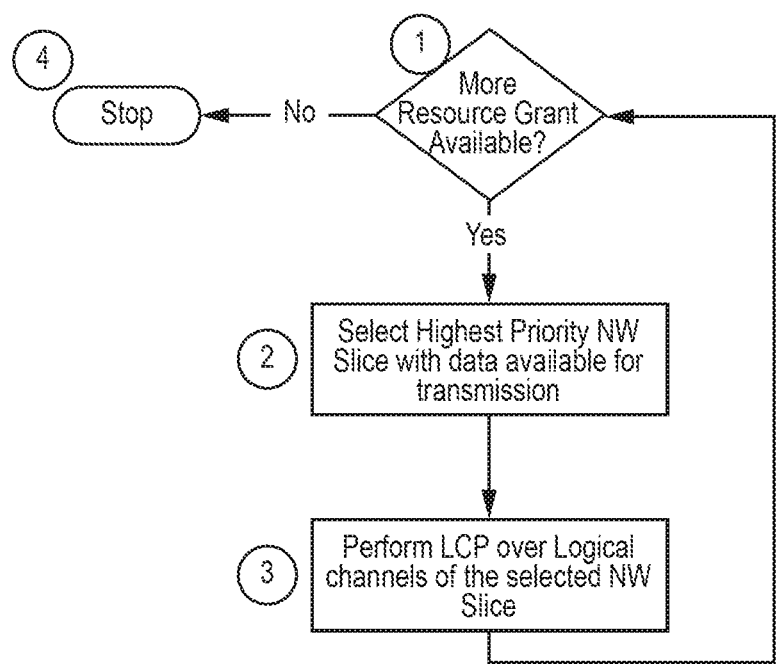
FIG. 45 is a diagram illustrating an example updated logical channel prioritization based on a Strict NW Slice Decreasing Priority.

Turning now to UE controlled UL resource grant allocation, with respect to Option 1, with reference to FIG. 45, a resource grant is common to network slices i.e. grants are not network slice specific. Data (control plane data or user plane data) generated by different network slices may be mapped to the same grant. In an example, at 1, the UE in this option decides how to distribute the received grant across the network slices for e.g. to the logical channels of each network slice. The UE may use strict priority order across network slices, starting from the highest priority slice to the lowest priority slice (see FIG. 45). For example, the network slices be configured with slices priority order. For e.g. the network slice with the lowest priority value is the highest priority slice while the network slice with the highest priority value is the lowest priority slice. The UE may be configured by the NR node with network slice configuration. One network slice configuration parameter may be the network slice priority. The priority of a network slice may be function of the TTI or TTIs configured for the services (e.g. radio bearers, logical channel) mapped to this network slice. In case more than one TTI is configured for the service, the priority of a network slice may be function of the smallest TTI of the TTIs configured for the services mapped to this network slice. The priority of a network slice decreases as the TTI value increases, for example the network slice with the smallest TTI value corresponds to the highest priority network slice while the network slice with the largest TTI value correspond to the lowest priority network slice. In this option, network slices are allocated resources in a decreasing priority order. The network slice of lower priority is allocated resources only if any resource remains after data for higher priority network slices are assigned resources. Network slices configured with equal priority should be served equally. Alternatively, in case of equal priority network slice, the network with the highest SPBR (as defined in step 3 below) is selected. In some cases, the LCP procedure used here may be same as the existing LTE LCP procedure. During logical channels prioritization procedure, the UE shall exclude from consideration, logical channels not allowed to be mapped to the configured resources or not allowed to be mapped to the network slice of the configured resources.

At 2, in accordance with the illustrated example, the UE may use a Slice specific SPBR. The UE may be configured by the network with a Slice specific SPBR or a slice specific PBR per logical channel. Alternatively, the slice specific PBR may be implicitly derived by the UE for e.g. as the sum of the PBRs of logical channels of the network slice. In some cases, all network slices are allocated resources (at least for the PBR) in a decreasing priority order. The MAC entity allocates resources for all the data that is available for transmission on the network slice before meeting the PBR of the lower priority slice(s). If any resources remain, all the network slices are served in a strict decreasing priority order until either the data for that network slice or the UL grant is exhausted, whichever comes first. Network slice configured with equal priority should be served equally. The procedure is highlighted in FIG. 46.

The network may control the scheduling of uplink data buy signaling for each network slices: slice priority where an increasing slice priority value indicates a lower slice priority level, slicePrioritisedBitRate which set the Slice Prioritized Bite Rate (SPBR) of the slice, slicebucketSizeDuration which set the Slice Bucket Size Duration (SBSD). The bucket size of a slice is equal to SPBR×SBSD. The MAC entity maintains a variable $SB_i$ for each slice i. $SB_i$ is initialized to zero when the slice i has its first logical channel established, and incremented by the product SPBR×TTI duration for each TTI (applicable to the slice, where SPBRi is Prioritized Bit Rate of slice j. The value of SBi can never exceed the bucket size of the slice and if the value of SBi is larger than the bucket size of slice i, it is set to the bucket size of slice i.

Figure 46:
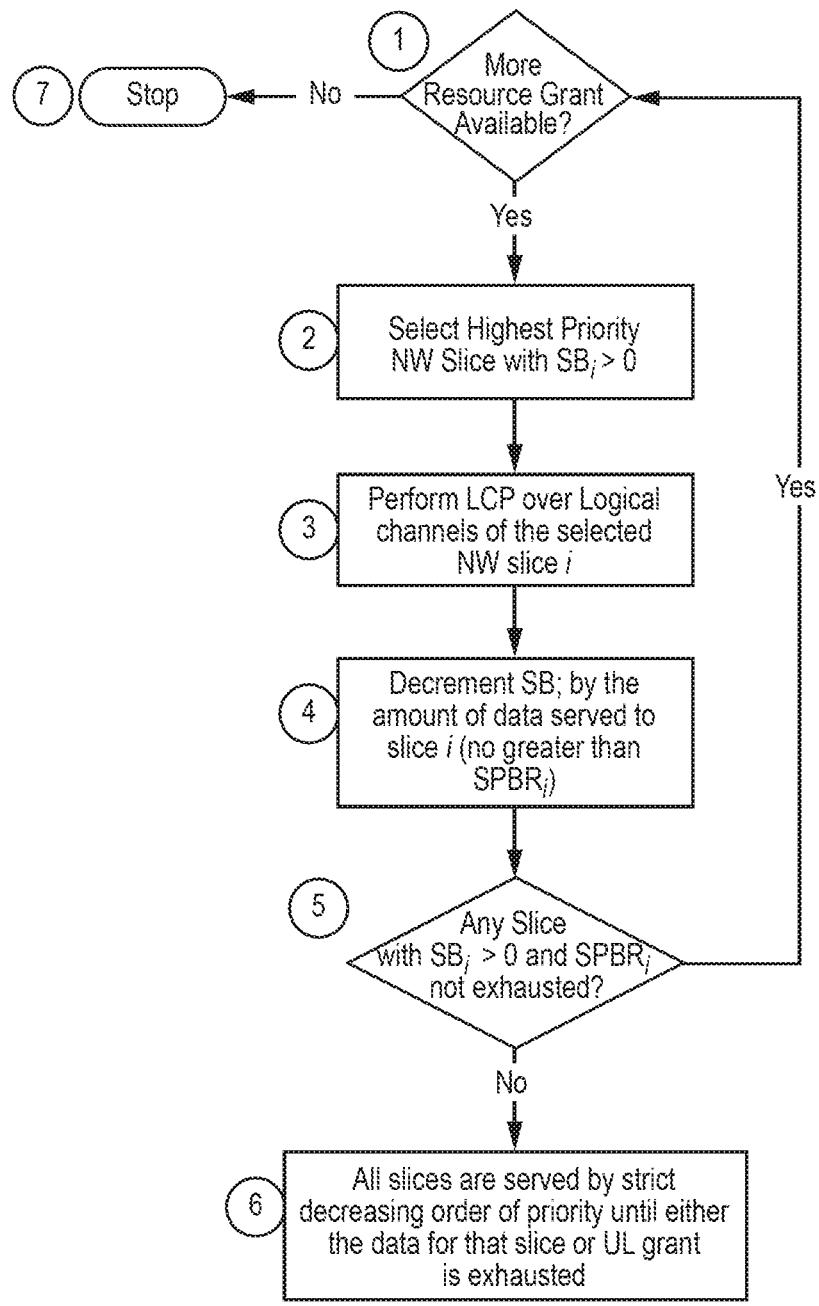
FIG. 46 is a diagram illustrating an example updated logical channel prioritization procedure based on Slice Prioritized BitRate (SPBR).

In an example case in which network slice specific logical channels are assumed, the logical channels within each slice may be allocated resources according to the existing LTE LCP procedure (step 3 of FIG. 45 or step 3 of FIG. 46). During logical channels prioritization procedure, the UE may exclude from consideration, logical channels not allowed to be mapped to the configured resources or not allowed to be mapped to the network slice of the configured resources.

It is understood that the entities performing the steps illustrated in FIGS. 45 and 46 may be logical entities that may be implemented in the form of software (i.e., computer-executable instructions) stored in a memory of, and executing on a processor of, an apparatus configured for wireless and/or network communications or a computer system such as those illustrated in FIGS. 52B and F. That is, the method(s) illustrated in FIGS. 45 and 46 may be implemented in the form of software (i.e., computer-executable instructions) stored in a memory of an apparatus, such as the apparatus or computer system illustrated in FIGS. 52B and F, which computer executable instructions, when executed by a processor of the apparatus, perform the steps illustrated in FIGS. 45 and 46. It is also understood that any transmitting and receiving steps illustrated in FIGS. 45 and 46 may be performed by communication circuitry of the apparatus under control of the processor of the apparatus and the computer-executable instructions (e.g., software) that it executes.

NR Resource Grant Example Option 2

Assumption: In this option, resource grants are common to physical layer (PHY) numerologies (or TTI) i.e. grant are not PHY numerology specific (or TTI specific). PHY numerologies may share the same resource grant. For example, in the UE in the uplink direction, data from more than one numerology may be mapped to the same resource grant.

Figure 47:
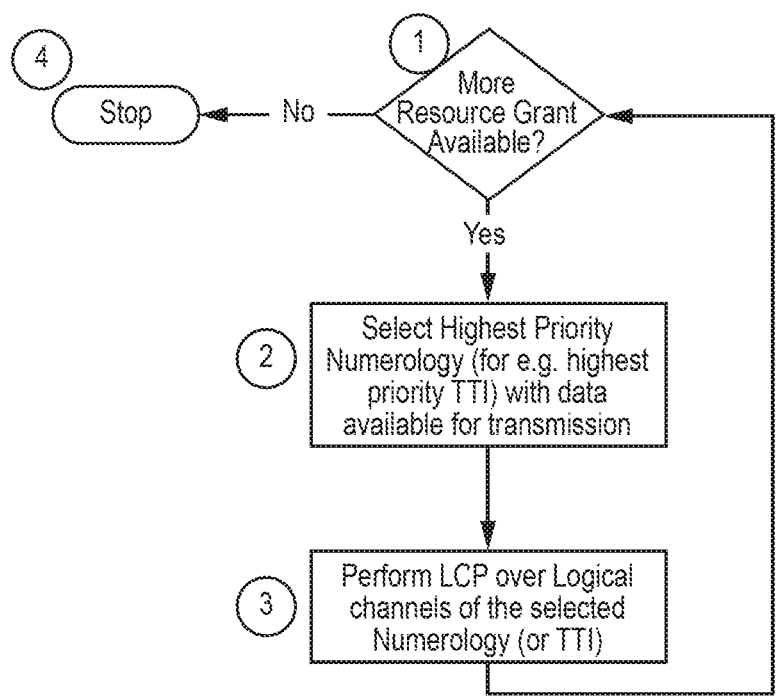
FIG. 47 is a diagram illustrating an example updated logical channel prioritization procedure based on a Strict Numerology Decreasing Priority.

In an example, the UE decides how to distribute the received grant across the numerologies. The UE may use strict priority order across PHY numerologies. For e.g. the PHY numerologies be configured with numerology priority order. For e.g. the numerology with the lowest priority value is the highest priority numerology while the numerology with the highest priority value is the lowest priority numerology. The UE may be configured by the NR node with numerology configuration. One numerology configuration parameter may be the numerology priority. The priority of a numerology may be a function of the TTI or TTIs configured for the services (e.g. radio bearers, logical channel) mapped to this numerology. In case more than one TTI is configured for the service, the priority of a numerology may be function of the smallest TTI of the TTIs configured for the services mapped to this numerology. The priority of a numerology decreases as the TTI value increases, for example the numerology with the smallest TTI value corresponds to the highest priority numerology while the numerology with the largest TTI value correspond to the lowest priority numerology. In this option, numerologies are allocated resources in a decreasing priority order. The numerology of lower priority is allocated resources only if any resource remains after data for higher priority numerologies are assigned resources. In this case, data of different PHY numerologies may be carried on the PHY channel resources in the scheduling grant using the signaled numerology parameters/formats in the scheduling grant. Numerologies configured with equal priority should be served equally. Alternatively, in case of equal priority numerologies, the network with the highest NPBR (as defined in step 3 below) is selected. In some cases, The LCP procedure used here may be same as the existing LTE LCP procedure. During logical channels prioritization procedure, the UE shall exclude from consideration, logical channels not allowed to be mapped to the configured resources or not allowed to be mapped to the numerology (e.g. TTI) of the configured resources. The example procedure is highlighted in FIG. 47.

Figure 48:
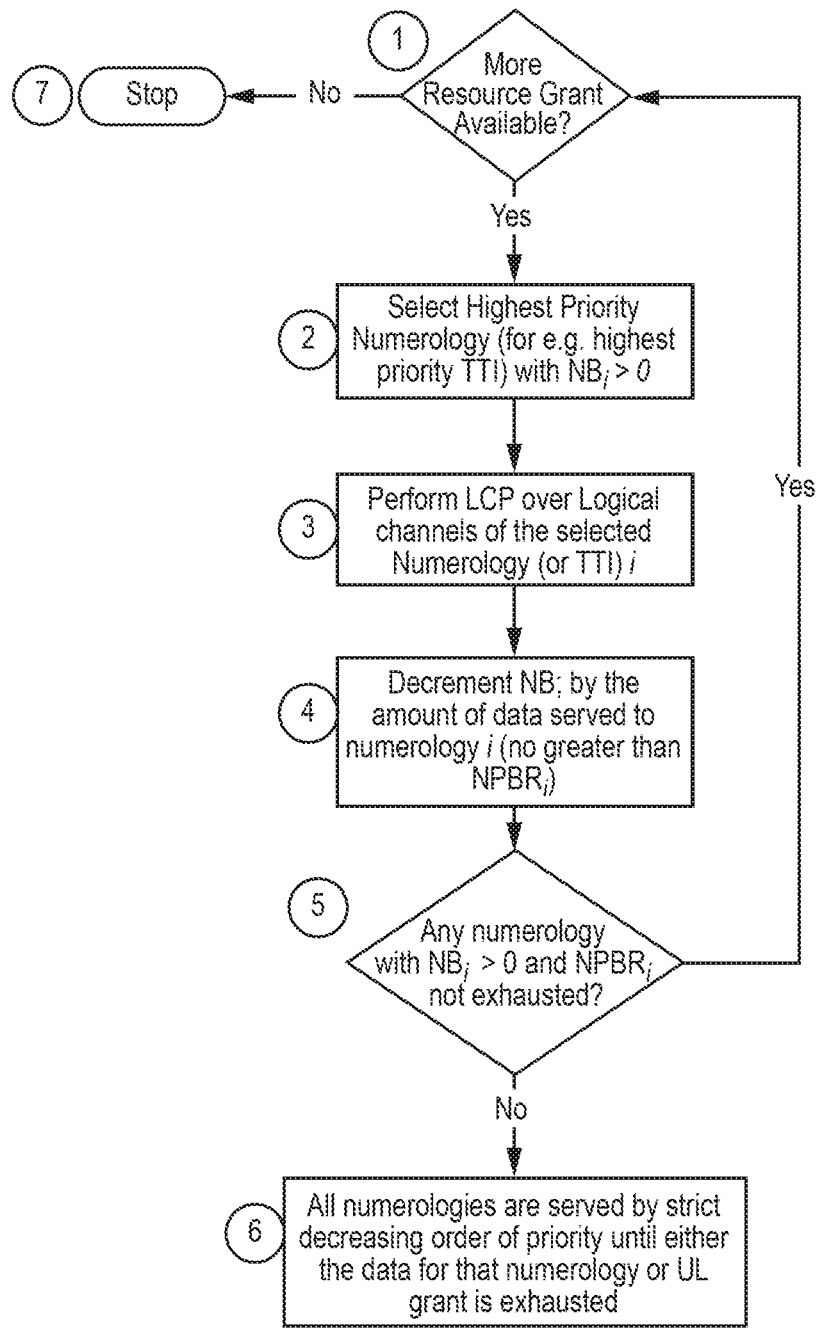
FIG. 48 is a diagram illustrating an example updated Logical Channel Prioritization procedure based on Numerology Prioritized BitRate (NPBR).

In some cases, the UE may use a numerology specific PBR. The UE may be configured by the network with a numerology specific PBR. Alternatively, the numerology specific PBR may be implicitly derived by the UE for e.g. as the sum of the PBRs of logical channels of the numerology. In some cases, all numerologies are allocated resources (at least for the PBR) in a decreasing priority order. The MAC entity allocates resources for all the data that is available for transmission on the highest priority numerology before meeting the PBR of the lower priority numerology(ies). If any resources remain, all the numerologies are served in a strict decreasing priority order until either the data for that numerology or the UL grant is exhausted, whichever comes first. Numerologies configured with equal priority should be served equally. The network controls the scheduling of uplink data by signaling to the UE for each allowed numerology: numerology priority where an increasing numerology priority value indicates a lower numerology priority level, numerologyPrioritisedBitRate which set the Prioritized Bite Rate (NPBR) of the numerology, numerologybucketSize-Duration which set the Numerology Bucket Size Duration (NBSD). The bucket size of a numerology is equal to NPBR×NBSD. The MAC entity maintains a variable NBi for each numerology i. NBi shall be initialized to zero when the numerology i has its first logical channel established, and incremented by the product NPBRi×TTI duration for each TTI (where NPBRi is Prioritized Bit Rate of numerology j. The value of NBi can never exceed the bucket size of the numerology and if the value of NBi is larger than the bucket size of numerology i, it shall be set to the bucket size of numerology i. An example of this procedure is depicted in FIG. 48. In an example case in which numerology specific logical channels are assumed, the logical channels within each numerology may be allocated resources according to the existing LTE LCP procedure. During logical channels prioritization procedure, the UE shall exclude from consideration, logical channels not allowed to be mapped to the configured resources or not allowed to be mapped to the numerology (e.g. TTI) of the configured resources.

With respect to numerology prioritization, the priority of a numerology may be a function of the TTI or TTIs configured for the services (e.g. radio bearers, logical channel) mapped to this numerology. In case more than one TTI is configured for the service, the priority of a numerology may be a function of the smallest TTI of the TTIs configured for the services mapped to this numerology. The priority of a numerology decreases as the TTI value increases. For example, the numerology with the smallest TTI value corresponds to the highest priority numerology while the numerology with the largest TTI value corresponds to the lowest priority numerology.

A numerology priority defined as a function of TTI may be further expressed as follows, presented by way of example and without limitation. In one example, the priority of a numerology decreases as the value of k2*D(TTI) increases, for example the numerology with the smallest k2*D(TTI) value corresponds to the highest priority numerology while the numerology with the largest k2*D(TTI) value corresponds to the lowest priority numerology. The parameter k2 represents the UL-assignment-to-UL-data transmission time duration, i.e. the time duration expressed in units of TTI, between the last symbol of the UL grant scheduling within TTI n and the TTI n+k2 of the corresponding PUSCH transmission. The parameter D(TTI) represents the duration of the TTI. D(TTI) may be expressed in microsecond or millisecond.

In other example, the priority of a numerology decreases as the value of k1*D(TTI) increases, for example the numerology with the smallest k1*D(TTI) value corresponds to the highest priority numerology while the numerology with the largest k1*D(TTI) value corresponds to the lowest priority numerology. The parameter k1 represents the DL-data-to-UL-ACK transmission time duration, which may be expressed in units of TTI. In other words, k1 may be defined as follows. With reference to slots for PUCCH transmissions, if the UE detects a DCI format in a PDCCH that schedules a PDSCH reception over a number of symbols where the last symbol is within TTI n, the UE shall provide corresponding HARQ-ACK information in a PUCCH transmission within TTI n+k1, where k1 is a number of TTIs, which may be indicated by the [DL-data-DL-acknowledgement] field in the DCI format. The [DL-data-DL-acknowledgement] field values map to values for a number of slots as defined in the following table (from 3GPP TS 38.213):

| [DL-data-DL-acknowledgement] | k |
|---|---|
| '00' | $1^{st}$ value for a number of slots configured by higher layers |
| '01' | $2^{nd}$ value for a number of slots configured by higher layers |
| '10' | $3^{rd}$ value for a number of slots configured by higher layers |
| '11' | $4^{th}$ value for a number of slots configured by higher layers |

In another example, the priority of a numerology decreases as the value of k3*D(TTI) increases, for example the numerology with the smallest k3*D(TTI) value corresponds to the highest priority numerology while the numerology with the largest k3*D(TTI) value corresponds to the lowest priority numerology. The parameter k3 represented the minimum Round Trip Time (RTT) associated with this numerology. The RTT may be expressed in function of TTI for e.g. k3*TTI. The duration of the RTT may further be expressed as k3*D(TTI).

In some cases, the priority of a numerology decreases as the value of k4*D(TTI) increases, for example the numerology with the smallest k4*D(TTI) value corresponds to the highest priority numerology while the numerology with the largest k4*D(TTI) value corresponds to the lowest priority numerology. The parameter k2 represents the DL-assignment-to-DL-data reception time duration i.e. the time duration expressed in units of TTI, between the last symbol of the DL grant scheduling within TTI n and the TTI n+k4 of the corresponding PDSCH reception. The parameter D(TTI) represents the duration of the TTI. D(TTI) may be expressed in microsecond or millisecond, for example.

NR Resource Grant Example Option 3:

Assumption: Resource grants are network slice specific (i.e. data from different network slices are mapped to different grants). Each network slice may have more than one resource grant in any particular TTI or time interval X.

Here, the UE allocates resources for data of each network slices from the grant specific to the network slices. Assuming logical channels are network slice specific, then the existing LTE LCP procedure may be re-used for each network slice. If the logical channels are not slice specific, then the logical channel may be considered as network slice specific for the purpose of resource allocation (logical channel prioritization) by the UE. For example, when data of two or more network slice are mapped to a logical channel, the logical channel may be considered as specific to the slice with resource grant. If there are more than one such slice with resource grants, the logical channel may be considered as specific to the slices with the highest priority. If any grant remains, after data/logical channels for a slice are allocated resources, the UE (MAC) may use the un-used grant for a given slice to allocate resource grant for other network slices. To this end, the UE may consider the un-used grant as a common grant and may use any of the resource schemes described for common grant allocation for e.g. resource allocation scheme for "NR Resource Grant Option 1" or "NR resource Grant Option 2" above. The UE may allocate the un-used grant according to a predefined rule in the specification or a pre-provisioning rule, for e.g. the UE may allocated the un-used grant to URLLC data, eMBB data and then mMTC data in that order.

In one embodiment, each slice specific resource grant may be associated with a slice specific PBR. The UE may explicitly be configured with such PBR or the UE may implicitly derived such slice specific PBR based on rules specified in the specification or through pre-provisioning. The UE allocated resources to satisfy first slice specific PBR. If any grant remains, the UE may use the used grant as follow: The use allocates the grant according to one of the resource allocation schemes described for example NR Resource Grant Option 1" or "NR resource Grant Option 2" above. The UE may allocate the un-used grant according to a predefined rule in the specification or a pre-provisioning rule, for e.g. the UE may allocated the un-used grant to URLLC data, eMBB data and then mMTC data in that order.

In another embodiment, the UE may re-allocate part or all of resources grant allocated to a network slice by a NR node to another network slice. For e.g. the UE may autonomously re-allocate the resource grant assigned by the network to a given network slice, to a higher priority network slice. For example, the UE may do so according to predefined rules in the specification or according to rules defined by network configuration or through pre-provisioning of the UE. As an example, the UE may autonomously re-allocated resources associated with eMBB slice grants to URLLC. Alternatively, the UE may autonomously re-allocated resources associated with URLLC slice grants to eMBB.

NR Resource Grant Example Option 4

Assumption: Resource grant are numerology specific (i.e. data for different PHY numerologies are allocated different resource grant). Each PHY numerology may be allocated more than one resource grant in one TTI or time interval X, for e.g. as a function of the data flows, services, applications or network slices mapped to the numerology.

In an example, the UE (MAC) allocates resources for data configured to use a given numerology from the grant specific to the numerology. Assuming logical channels are numerology specific, then the existing LTE LCP procedure may be re-used for each for the logical channels mapped to the same numerology. If any grant remains, after data/logical channels for a numerology are allocated resources, the UE (MAC) may use the un-used grant from a given numerology to allocate resource grant for other numerologies. To this end, the UE may consider the un-used grant as a common grant and may use any of the resource schemes described for common grant allocation for e.g. resource allocation scheme for "NR Resource Grant Option 1" or "NR resource Grant Option 2" above. The UE may allocate the un-used grant according to a predefined rule in the specification or a pre-provisioning rule, for e.g. the UE may allocated the un-used grant to URLLC data, eMBB data and then mMTC data in that order.

In one embodiment, each numerology specific resource grant may be associated with a numerology specific PBR. The UE may explicitly be configured with such PBR or the UE may implicitly derived such slice specific PBR based on rules specified in the specification or through pre-provisioning. The UE allocated resources to satisfy first numerology specific PBR. If any grant remains, the UE may use the used grant as follow, presented by way of example and without limitation. The use allocates the grant according to one of the common resource allocation schemes described or example NR Resource Grant Option 1" or "NR resource Grant Option 2" above. The UE may allocate the un-used grant according to a predefined rule in the specification or a pre-provisioning rule, for e.g. the UE may allocated the un-used grant to URLLC data, eMBB data and then mMTC data in that order.

In another embodiment, the UE may re-allocate part or all of resources grant allocated to a numerology by a NR node to another numerology. For e.g. the UE may autonomously re-allocate the resource grant assigned by the network to a given numerology, to a higher priority numerology. For example, the UE may do so according to predefined rules in the specification or according to rules defined by network configuration or through pre-provisioning of the UE.

Figure 49:
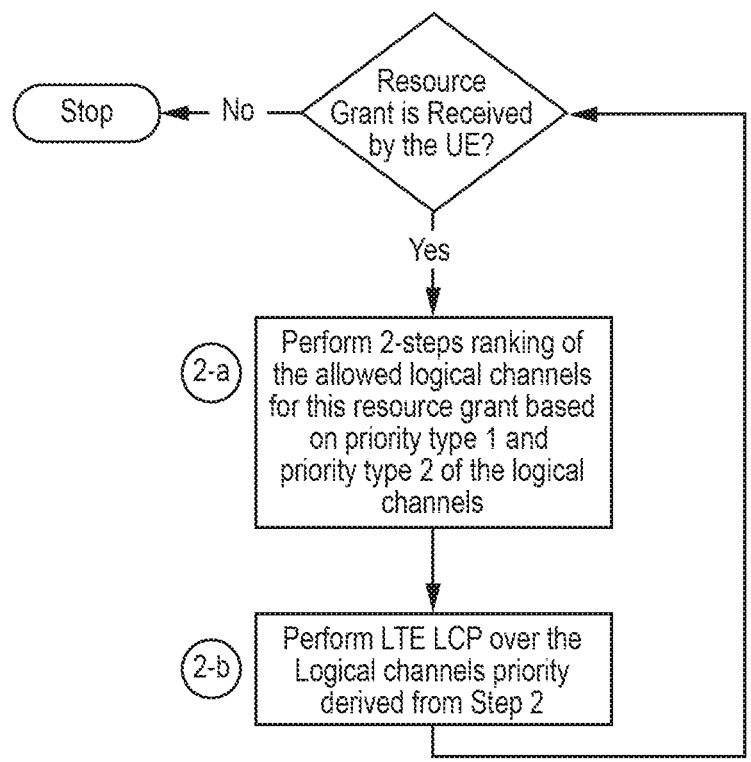
FIG. 49 is a diagram illustrating an example of Two Priority Types based Logical Channel Prioritization.

NR Resource Grant Option 5:

Assumption: Resource grants are logical channel specific or logical channel group specific. The logical channel group may be one of the following: a logical channel group configured for BSR reporting purpose, a set of logical channels configured as allowed to use the same numerology or the same TTI value. In an example the UE allocates resources for data of each logical channel from the grant specific to the logical channel. If the grant is for a logical channel group, the UE may apply a procedure similar to that of the legacy LTE logical channel prioritization procedure for resource allocation to the logical channel with the same logical channel group. The UE allocated resource to each logical channel based in a deceasing order of logical channel priority, to satisfy the PBR. In an alternative embodiment, a new level of priority might be defined. For e.g., such new level of priority might be based on the numerology/TTIs a logical channel is configured to mapped to. A logical channel (or the radio bearer associated with the logical channel) might be mapped to more than one numerology or TTI. In this case, the TTI use to define the proposed priority of the logical channel is the TTI with the largest value among all the TTIs the logical channel is configured with. This priority is an overlay priority over the logical channel priority (for e.g. as currently defined in LTE). We will denote this new type of priority, logical channel priority type 1 and the legacy logical channel LTE-like priority as priority type 2. The UE prioritizes the logical channel as follow: a first ranking is performed based on priority type 1 followed by a second ranking based on priority type 2. The highest the value of the priority type 1 is, the lowest is the logical channel priority, for e.g. the highest the TTI value is, and the lowest is the priority of the corresponding logical channel. Logical channels with equal priority based on priority type 1 are further ranked according to priority type 2. The highest the value of the priority type 2 is, the lowest is the logical channel priority among the logical channels of equal priority type 1. In some cases, the UE applies LTE LCP procedure using the logical channels ranking derived from above. The procedures described above are illustrated in FIG. 49.

In some cases, if any resources remain, all the logical channels with data outside of the logical channel group for which UE received grant, and not restricted from using the received resource grant are served in a strict decreasing priority order until either the data for that logical channel or the UL grant is exhausted, whichever comes first. Logical channels configured with equal priority should be served equally.

Alternatively to step 3 above, if any grant remains, the UE (MAC) may use the un-used as follows, for example and without limitation. The UE may consider the un-used grant as a common grant and may use any of the resource schemes described for common grant allocation for e.g. resource allocation scheme for "NR Resource Grant Option 1" or "NR resource Grant Option 2" above. The UE may allocate the un-used grant according to a predefined rule in the specification or a pre-provisioning rule, for e.g. the UE may allocated the un-used grant to URLLC data, eMBB data and then mMTC data in that order.

In another embodiment, logical channel sub-priorities may be defined for the applications or data flows mapped to a logical channel. The UE may allocate resource in a strict decreasing order of sub-priorities of the data flows or applications mapped to the logical channel. Alternatively, PBR may be defined for data sub-flows or application mapped to a logical channel. The UE allocated resource to each data flow or application in a decreasing order of logical channel sub-priorities, to satisfy the sub-priorities PBR. If any resources remain, all the data flows or applications within the logical channel are served in a strict decreasing priority order until either the data for that logical channel or the UL grant is exhausted, whichever comes first. Data flows are applications configured with equal logical channel sub-priorities should be served equally.

Turning now to enhanced LTE logical channel prioritization, various examples are now presented in light of some of the NR resource grant allocation options captured above.

In one embodiment, Logical Channel Prioritization procedure is performed when a new transmission is performed. In an example, the RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD), value(s) of allowed transmission profile(s) which indicates if data for the logical channel can be transmitted with resources of a grant with the same transmission profile(s) value(s). For NB-IoT, prioritisedBitRate, bucketSizeDuration and the corresponding steps of the Logical Channel Prioritisation procedure (i.e., Step 1 and Step 2 below) are not applicable.

The MAC entity may maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

In an example, the MAC entity may perform various Logical Channel Prioritization procedures when a new transmission is performed. The MAC entity may allocate resources to the logical channels configured with the grant's transmission profile (or allowed for this grant) in the following steps, for example. At 1, logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s). At 2, the MAC entity shall decrement Bj by the total size of MAC SDUs served to logical channel j in Step 1. The value of Bj can be negative. At 3, if any resources remain, logical channels are served in a strict decreasing priority order (regardless of the value of Bj) until either the data for that logical channel or the UL grant is exhausted, whichever comes first. Logical channels configured with equal priority may be served equally When the MAC entity is requested to transmit multiple MAC PDUs in one TTI, steps 1 to 3 above and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed. When multiple UL grants are received, the order in which the grants are process is left up to UE implementation.

In another example, the RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD), value(s) of allowed transmission profile(s) which indicates if data for the logical channel can be transmitted with resources of a grant with the same transmission profile(s) value(s). The RRC also controls the scheduling of uplink data by signalling to the UE, the absolute priority of each transmission profile regardless of their mapping to logical channel, where an increasing priority value indicates a lower priority. For NB-IoT, prioritisedBitRate, bucketSizeDuration and the corresponding steps of the Logical Channel Prioritisation procedure (i.e., Step 1 and Step 2 below) are not applicable.

The MAC entity shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The MAC entity may perform the following Logical Channel Prioritization procedure when a new transmission is performed. For each grant in a decreasing order of transmission profile priority, the MAC entity shall allocate resources to the logical channels configured with the grant's transmission profile in the following steps, for example. At 1, the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s). At 2, the MAC entity shall decrement Bj by the total size of MAC SDUs served to logical channel j in Step 1. The value of Bj can be negative. At 3, if any resources of the current grant remain, logical channels are served in a strict decreasing priority order (regardless of the value of Bj) until either the data for that logical channel or the UL grant is exhausted, whichever comes first. Logical channels configured with equal priority should be served equally.

In some cases, when the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed. When multiple UL grants with numerologies of equal priority are received, the order in which the grants are process is left up to UE implementation.

In another example, the RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD), value(s) of allowed transmission profile(s) which indicates if data for the logical channel can be transmitted with resources of a grant with the same transmission profile(s) value(s), transmission profile specific priority, where an increasing priority value indicates a lower priority level. For NB-IoT, prioritisedBitRate, bucketSizeDuration and the corresponding steps of the Logical Channel Prioritisation procedure (i.e., Step 1 and Step 2 below) are not applicable.

The MAC entity may maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The MAC entity may perform the following Logical Channel Prioritization procedure when a new transmission is performed. The MAC entity may allocate resources to the logical channels configured with the grant's transmission profile (or allowed for this grant) in the following steps, for example. At 1, logical channels with Bj>0 are allocated resources in a decreasing priority order. Logical channels configured with equal priority are allocated resources in a decreasing transmission profile specific priority order. If the PBR of a logical channel is set to "infinity", the MAC entity shall allocate resources for all the data that is available for transmission on the logical channel before meeting the PBR of the lower priority logical channel(s). At 2, the MAC entity may decrement Bj by the total size of MAC SDUs served to logical channel j in Step 1. The value of Bj can be negative. At 3, if any resources remain, logical channels are served in a strict decreasing priority order (regardless of the value of Bj) until either the data for that logical channel or the UL grant is exhausted, whichever comes first. Logical channels configured with equal priority should be served in a strict decreasing transmission profile specific priority order (regardless of the value of Bj) until either the data for that logical channel or the UL grant is exhausted, whichever comes first. Logical channels configured with equal transmission profile specific priority should be served equally.

Note that when the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed. Note also that when multiple UL grants are received, the order in which the grants are processed may be left up to UE implementation.

In another example, the RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD), value(s) of allowed transmission profile(s) which indicates if data for the logical channel can be transmitted with resources of a grant with the same transmission profile(s) value(s), transmission profile specific priority, where an increasing priority value indicates a lower priority level. The RRC also controls the scheduling of uplink data by signalling to the UE, the absolute priority of each transmission profile regardless of their mapping to logical channel, where an increasing priority value indicates a lower priority. For NB-IoT, prioritisedBitRate, bucketSizeDuration and the corresponding steps of the Logical Channel Prioritisation procedure (i.e., Step 1 and Step 2 below) are not applicable.

The MAC entity may maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

In this embodiment, the MAC entity may perform the following Logical Channel Prioritization procedure when a new transmission is performed. For each grant in a decreasing order of transmission profile absolute priority, the MAC entity may allocate resources to the logical channels configured with the grant's transmission profile (or allowed for this grant) in the following steps, for example. At 1, Step 1: logical channels with Bj>0 are allocated resources in a decreasing priority order. Logical channels configured with equal priority are allocated resources in a decreasing order of logical channel's transmission profile specific priority. If the PBR of a logical channel is set to "infinity", the MAC entity shall allocate resources for all the data that is available for transmission on the logical channel before meeting the PBR of the lower priority logical channel(s). At 2, the MAC entity may decrement Bj by the total size of MAC SDUs served to logical channel j in Step 1. The value of Bj can be negative. At 3, if any resources remain, logical channels are served in a strict decreasing priority order (regardless of the value of Bj) until either the data for that logical channel or the UL grant is exhausted, whichever comes first. Logical channels configured with equal priority should be served in a strict decreasing order of logical channel's transmission profile specific priority (regardless of the value of Bj) until either the data for that logical channel or the UL grant is exhausted, whichever comes first. Logical channels configured with equal transmission profile specific priority should be served equally.

In some cases, the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

In NR, as in LTE, the Transmission Time Interval (TTI) may also be considered as the time duration between consecutive data transmission occasions.

As illustrated in Table 1, the time durations (for example, in microsecond) of a slot or a mini-slot are numerology specific and therefore vary with the numerology, but maintain a proportional relationship across numerologies. There may be more than one mini-slot configuration per numerology in terms of number of symbols within the mini-slot. Therefore, a numerology may have more than one TTI, each with different time duration in milliseconds or microseconds. Assuming slot level scheduling and mini-slot level scheduling are supported by NR systems, and assuming the gNB can schedule data transmission to the same UE at the slot level or mini-slot level within the same numerology or over more than one numerology, the data transmission timer interval, i.e. the time duration between consecutive data transmission occasions, is variable and not fixed. In order to have a fixed time duration TTI in support of MAC procedures like in LTE, a UE specific TTI is proposed, denoted TTI*, of fixed time duration, as the basic NR time unit (NR-UNIT) for MAC procedures. In the remainder of this document, TTI* will be used in reference to a fixed basic NR time unit of a fixed duration, as opposed to numerology specific variable TTI(s). As used herein, NR-UNIT and TTI* are used interchangeably, without limitation unless otherwise specified, and both terms may also simply refer to a predetermined unit of time or predetermined period of time.

As a consequence of the proportional relationship between the durations of symbols, mini-slots or slots in NR systems, the time intervals between two consecutive transmission opportunities are also proportional to one another. The time interval between two consecutive transmission opportunities is therefore necessarily a multiple of the smallest of the slot durations the UE may be configured with, assuming a slot level scheduling of the UE. Similarly, the time interval between two consecutive transmission opportunities will be a multiple of the smallest of the mini-slot durations the UE may be configured with, assuming mini-slot and slot level scheduling of the UE.

Consequently, the NR-UNIT (i.e. TTI*) may be defined in various ways. For example and without limitation, the NR-UNIT, or the predetermined unit of time may be defend as:

The smallest of the possible slot (respectively mini-slot) durations that can be supported by the UE for slot level scheduling (respectively mini-slot level scheduling), as per the UE Capability. The UE may also take into account other information such as the UE battery level, device category, power saving mode setting, etc.

The smallest of the possible slot (respectively mini-slot) durations across the numerologies the UE is configured with. The configuration may be static or through semi-static RRC signaling.

The smallest of the possible slot (respectively mini-slot) durations across the bandwidth parts (BWPs) the UE is configured with. The configuration may be static or through semi-static RRC signaling.

The slot (respectively mini-slot) duration that will be used as the minimum time interval between UL transmission (PUSCH, PUCCH or either PUSCH or PUCCH) occasions, or that will be used as the minimum time interval between DL reception (PDSCH, PDCCH or either PDSCH or PDCCH) occasions, as signaled to the UE by the gNB.

The smallest of the slot (respectively mini-slot) durations taken across the active numerologies, where an active numerology is defined as an activated numerology among the configured numerologies, where the UE may expect to perform UL transmission (PUSCH, PUCCH or either PUSCH or PUCCH) or DL reception (PDSCH, PDCCH or either PDSCH or PDCCH). The UE may determine the active numerologies, i.e. the numerologies where it may expect to perform UL transmission or DL reception through configuration signaling from gNB where the configuration signaling may be one or more of semi static RRC signaling, MAC signaling (e.g. Random Access Response) or DCI signaling.

The smallest of the slot (respectively mini-slot) durations taken across the activated UL BWPs or DL BWPs. The UE can be configured with activated DL BWPs by a higher layer parameter [activated-DL-BWP], where the parameter [activated-DL-BWP] defines a DL BWP subset from a configured DL BWP set for DL reception. Similarly, the UE can be configured with activated UL BWPs by a higher layer parameter [activated-UL-BWP], where the parameter [activated-UL-BWP] defines an UL BWP subset from a configured UL BWP set for UL transmissions.

The slot (respectively mini-slot) duration of a reference or default numerology.

Furthermore, the NR-UNIT may be defined with respect to UL transmission, or with respect to DL direction.

With respect to UL direction, NR-UNIT may be defined as follows, presented by way of example and without limitation:

- The smallest of the possible slot (respectively mini-slot) durations that can be supported by the UE for slot level UL scheduling (respectively mini-slot level UL scheduling), as per the UE Capability. The UE may also take into account other information such as the UE battery level, device category, power saving mode setting, etc.
- The smallest of the possible slot (respectively mini-slot) durations across the UL numerologies the UE is configured with. The configuration may be static or through semi-static RRC signaling.
- The smallest of the possible slot (respectively mini-slot) durations across the UL BWPs the UE is configured with. The configuration may be static or through semi-static RRC signaling.
- The slot (respectively mini-slot) duration that will be used as the minimum time interval between UL transmission (PUSCH, PUCCH or either PUSCH or PUCCH) occasions, as signaled to the UE by the gNB.
- The smallest of the slot (respectively mini-slot) durations taken across the active UL numerologies, where an active UL numerology is defined as an activated UL numerology among the configured UL numerologies, where the UE may expect to perform UL transmission (PUSCH, PUCCH or either PUSCH or PUCCH). The UE may determine the active UL numerologies i.e. the numerologies where it may expect to perform UL transmission through configuration signaling from gNB where the configuration signaling may be one or more of semi static RRC signaling, MAC signaling (e.g. Random Access Response) or DCI signaling.
- The smallest of the slot (respectively mini-slot) durations taken across the activated UL BWPs. The UE can be configured with activated UL BWPs by a higher layer parameter [activated-UL-BWP], where the parameter [activated-UL-BWP] defines an UL BWP subset from a configured UL BWP set for UL transmissions.
- The slot (respectively mini-slot) duration of a reference or default numerology, for example a reference or default UL numerology.

With respect to DL direction, NR-UNIT may be defined as follows, presented by way of example and without limitation:

- The smallest of the possible slot (respectively mini-slot) durations that can be supported by the UE for slot level DL scheduling (respectively mini-slot level DL scheduling), as per the UE Capability. The UE may also take into account other information such as the UE battery level, device category, power saving mode setting, etc.
- The smallest of the possible slot (respectively mini-slot) durations across the DL numerologies the UE is configured with. The configuration may be static or through semi-static RRC signaling.
- The smallest of the possible slot (respectively mini-slot) durations across the DL BWPs the UE is configured with. The configuration may be static or through semi-static RRC signaling.
- The slot (respectively mini-slot) duration that will be used as the minimum time interval between DL reception (PDSCH, PDCCH or either PDSCH or PDCCH) occasions, as signaled to the UE by the gNB.
- The smallest of the slot (respectively mini-slot) durations taken across the active DL numerologies, where an active DL numerology is defined as an activated DL numerology among the configured DL numerologies, where the UE may expect to perform DL reception (PDSCH, PDCCH or either PDSCH or PDCCH). The UE may determine the active DL numerologies i.e. the numerologies where it may expect to perform DL transmission through configuration signaling from gNB where the configuration signaling may be one or more of semi static RRC signaling, MAC signaling (e.g. Random Access Response) or DCI signaling.
- The smallest of the slot (respectively mini-slot) durations taken across the activated DL BWPs. The UE can be configured with activated DL BWPs by a higher layer parameter [activated-DL-BWP], where the parameter [activated-DL-BWP] defines an DL BWP subset from a configured DL BWP set for DL reception.
- The slot (respectively mini-slot) duration of a reference or default numerology for e.g. a reference or default DL numerology.

Regardless of any of the NR-UNIT or TTI* definitions above, in some examples, the NR-UNIT may be expressed or configured in the UE as an integer number of OFDM symbols. The duration of the symbol, for example in microseconds or milliseconds, in that case depends on which definition among the above definitions of NR-UNIT is used.

For simplicity, in the remainder of this disclosure, the definition of NR-UNIT (i.e. TTI*) is irrespective of the transmission direction, unless otherwise specified.

In some cases, the NR-UNIT may be fixed, but may be updated over time. For example, if a numerology or respectively BWP with the smallest mini-slot or slot duration is deactivated, or removed from the configured numerology set or respectively BWP set of the UE, the NR-UNI may be updated. Although not absolutely needed considering the definition of the NR-UNIT as proposed in this paper, such update might be beneficial, for example in terms of power saving and battery life enhancement as the UE will operate at a higher time granularity, which implies the UE context including for example protocol variables and counters are updated with less frequency.

Turning now to various example enhancements to LCP, in some cases, an UL resource grant R(i) may be characterized by an UL grant assignment time and an UL-assignment-to-UL-data transmission time duration, i.e. the total life time of the grant. Let's denote k2, the UL-assignment-to-UL-data transmission time duration in NR UNIT. In absolute time units, the duration of the NR-UNIT, denoted D(NR-UNIT) in this description may be expressed in microseconds or milliseconds. The UL grant assignment time for an UL grant resource R(i) is understood here as the time instant (e.g. NR-UNIT number in the common UE-gNB timeline) where the grant is received at the UE. In the case of an UL grant assignment scheme like SPS that consists of an initial transmission followed by a periodic transmission using the same resource grant, the UL grant assignment time may also be understood as the time instance of the last UL transmission using the same grant.

In an example, the maximum processing time budget available to the terminal for a given grant R(i), is a function of the k2, i.e. the total life time of the grant and the value of the applicable Time Advance TA (or equivalently the terminal-to-base-station distance). Let's denote T_PROC_UE the maximum processing time budget available to the terminal. The time budget for the LCP procedure, denoted T_LCP, is a component of T_PROC_UE and is upper bounded by it. Ideally, T_LCP shall be set as small as possible, taking into account the processing power of the UE and the anticipated UE load, in order to minimize the likelihood of having to take into account a new UL grant, while there is an ongoing LCP procedure. For each grant R(i), a parameter T_LCP(i) may be defined where T_LCP(i) is the LCP procedure time budget to process the grant before the grant life time expires. T_LCP may be the same for all grants, in some examples.

Figure 53:
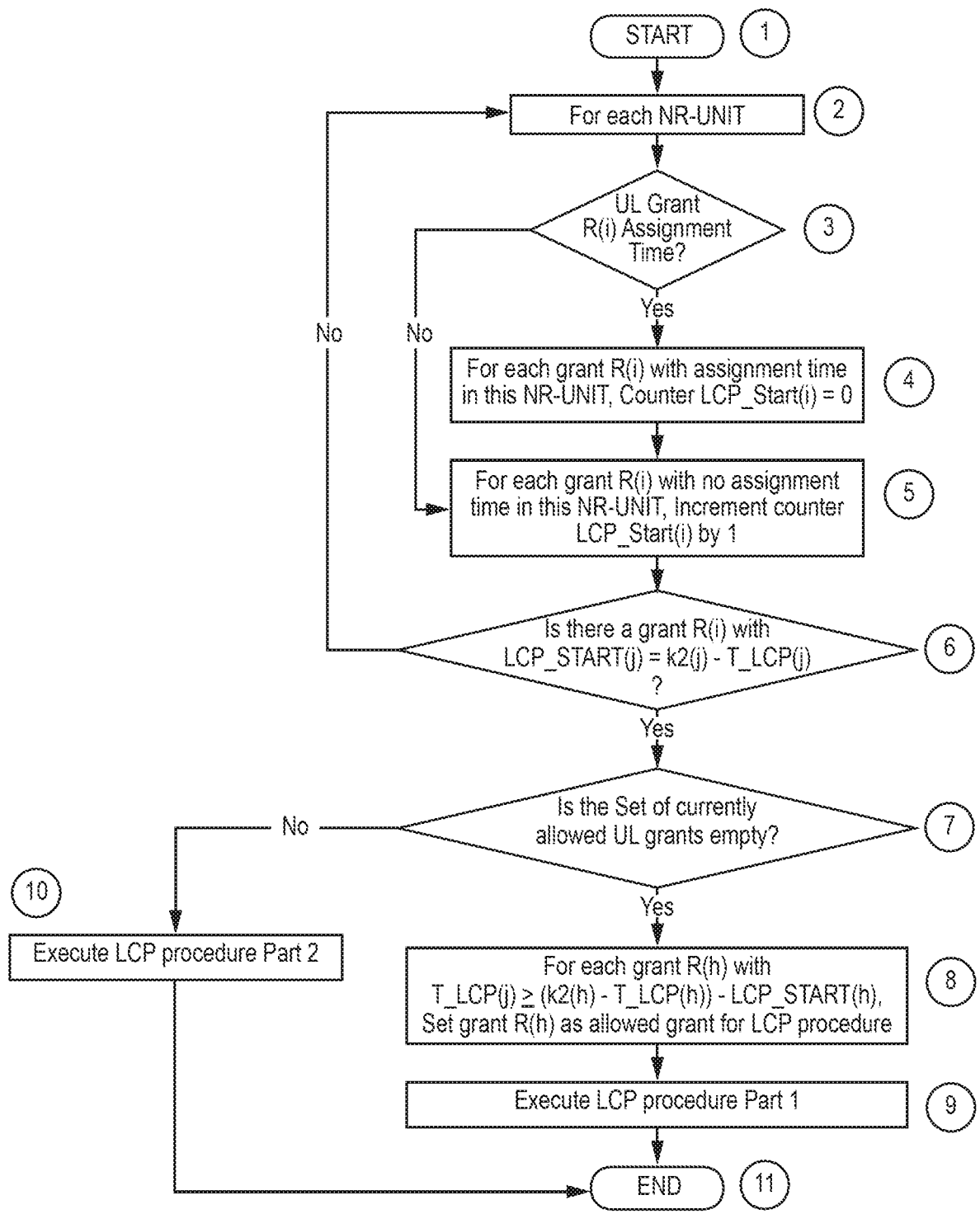
FIG. 53 illustrates an example flow for logical channel prioritization (LCP) in accordance with an example embodiment.

In some examples, a Logical Channel Prioritization procedure may be applied whenever a new transmission is performed. For each available scheduling resource grant R(i), a counter LCP_START(i) is maintained in accordance with an example embodiment. The counter LCP_START(i) can be interpreted as the age of the grant R(i). For each grant R(i), the UE initializes the counter LCP_START(i) to 0 at the UL grant assignment time, and increment the counter LCP_START(i) every NR-UNIT thereafter. The UE performs the LCP procedure when for at least one resource grant R(j), the counter LCP_START(j)=k2(j)−T_LCP(j). The UE considers all resource grants R(h) that satisfy the relation T_LCP(j)≥(k2(h)−T_LCP(h))−LCP_START(h) as allowed grants for resource grant assignment to logical channels. The relation T_LCP(j)≥(k2(h)−T_LCP(h))−LCP_START(h) implies the transmission time period of data using grant R(j) and the transmission time period of data using grant R(h) overlap, in other word, the LCP procedure triggered by the grant R(j) will not complete before the transmission time period of data with grant R(h). An example is illustrated in FIG. 53.

Figure 54:
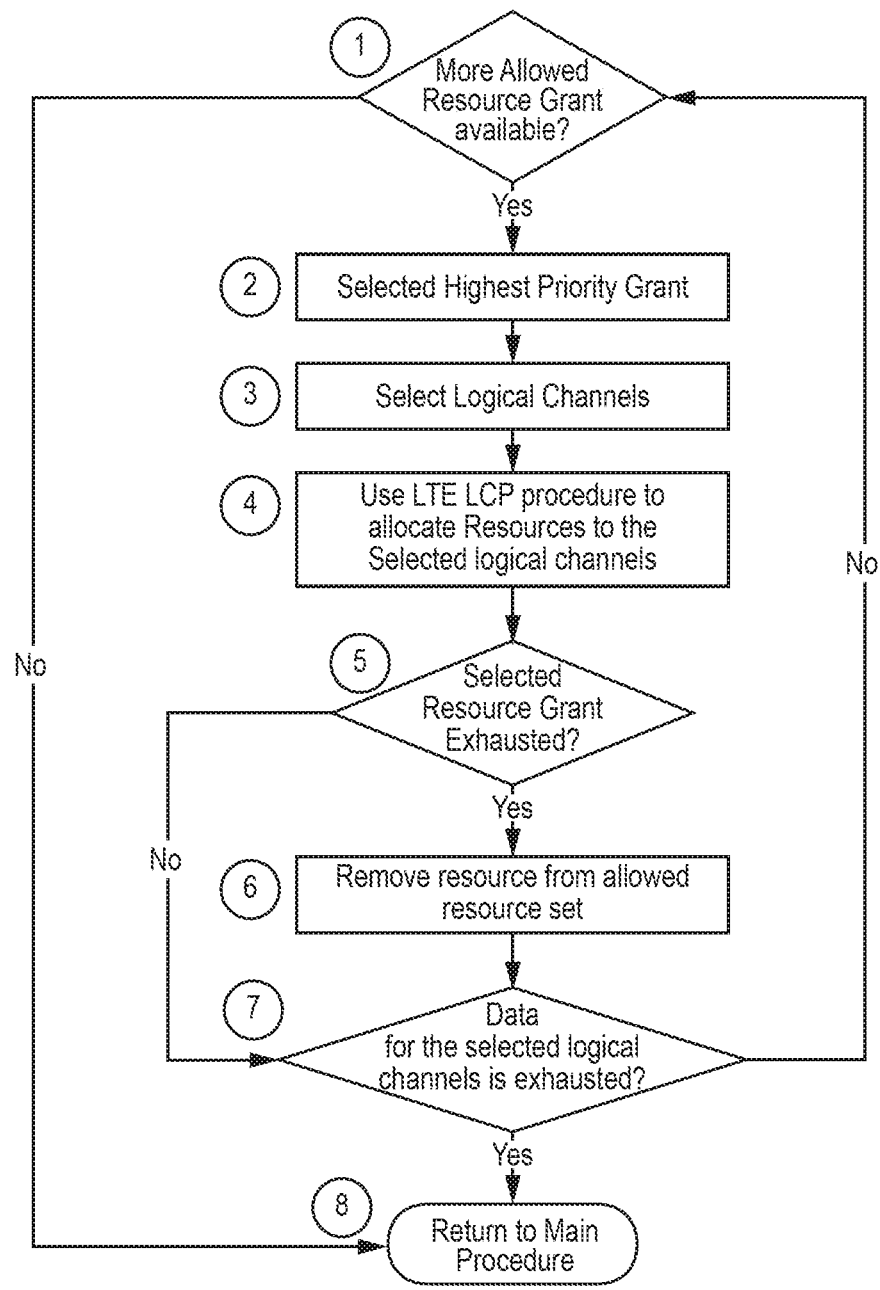
FIG. 54 illustrates an example flow for a portion of the LCP.

A first part (Part 1) of an example LCP procedure is illustrated in FIG. 54. This part of the LCP procedure corresponds to step 9 in FIG. 53.

With respect to determining the priority of a resource grant, for each resource allowed grant R(h), the UE may determine the priority of the resource grant for the purpose of the LCP procedure based on the remaining life time of the grant, i.e. based on the remaining amount of time before the expiry of the grant life time. For a grant R(h), this remaining amount of time before the expiry of the grant life time, at a time instant t, is computed as k2(h)−LCP_START(h,t) where LCP_START(h,t) is the current value of the counter LCP_START(h) at the NR_UNIT corresponding to the time instant t. For the grant R(j) that fulfils the relation LCP_START(j)=k2(j)−T_LCP(j), which triggers the LCP procedure, the remaining life time of the grant R(j) is T_LCP(j) at the time the LCP is triggered. The UE prioritizes the allowed grants R(h) according to a strict decreasing order of the remaining life time value. The grant with the smallest remaining life time is the highest priority grant while the grant with the largest remaining life time is the lowest priority grant.

In another embodiment, the UE may determine the priority of a resource grant based on the parameter k2, i.e. the UL-assignment-to-UL-data transmission time duration. The UE prioritizes the allowed grants R(h) according to a strict decreasing order of the value of k2. The grant with the smallest k2 value is the highest priority grant while the grant with the largest k2 value is the lowest priority grant.

In case of a tie, in some cases, the largest grant is selected as the grant of higher priority. The largest grant may be defined as the grant with the largest number of resource elements. Alternatively, the largest grant may be defined as the grant which the UE has estimated to be able to transmit the largest amount of data within MAC SDU(s). In another alternative, in the case of a tie, the higher priority grant is selected randomly.

Turning now to the selection of a logical channel, for the purpose of the LCP procedure, a grant may be assumed to be numerology specific. A logical channel may be mapped to more than one numerology and therefore data on a logical channel can be served by more than one numerology. More than one logical channel may be mapped to more than one numerology and therefore, a numerology specific grant can serve more data from more than one logical channel. Similarly, a logical channel may be restricted from using a resource grant on some numerologies. The LCP procedure should take into account logical channel to numerology mapping restrictions.

In an example, for each selected UL grant, a logical channel may be selected for the LCP procedure if the logical channel satisfies the various conditions. For example, the logical channel may be selected if it is not restricted from using the selected grant as a result of a numerology mapping restriction (e.g., as a result of a restriction from subcarrier spacing (SCS)). In another example, the logical channel may be selected if not restricted from using the selected grant as a result of a data duplication restriction. For example, if a DRB is mapped to two logical channels LC1 and LC2 in support of data duplication on at least two component carriers CC1 and CC2 (CA or DC data duplication cases), LC1 may be restricted from using grants on CC2 while LC2 is restricted from using grants on CC1. If the selected grant is on component carrier CC2, LC1 is restricted from using the selected grant. Similarly, if the selected grant is on CC1, the logical channel LC2 is restricted from using the selected grant. In another example, a logical channel may be assigned a parameter k2 value. The logical channel may be selected if its k2 value expressed in NR-UNIT or time duration in microseconds or milliseconds, is greater than or equal to the parameter k2 of the selected grant, expressed in the same time unit as the parameter k2 of the logical channel. As discussed earlier, the parameter k2 associated with an UL grant represents the UL-assignment-to-UL-data transmission time duration in NR_UNIT. In absolute time units, the duration of the NR-UNIT, denoted D(NR-UNIT) in this description may be expressed in microseconds or milliseconds. The UL grant assignment time for an UL grant resource R(i) is understood here as the time instant (e.g. NR-UNIT number in the common UE-gNB timeline) where the grant is received at the UE. In the case of a UL grant assignment scheme like SPS that consists of an initial transmission followed by a periodic transmission using the same resource grant, the UL grant assignment time may also be understood as the time instance of the last UL transmission using the same grant.

An alternative to the above-described condition may be described as follows: a logical channel may be mapped to one or more numerologies, i.e. the logical channel may be configured for data transmission using one or more numerologies. As discussed earlier in this paper, a numerology may have more than one TTI, each with a different time duration in milliseconds or microseconds. Consequently, as defined already herein, a logical channel may be configured for data transmission using one or more TTI. Assuming slot level scheduling and mini-slot level scheduling are supported by NR systems, and assuming the gNB can schedule data transmission to the same UE at the slot level or mini-slot level within the same numerology or across more than one numerology, the data transmission timer interval for data of a given logical channel, i.e. the time duration between consecutive data transmission occasions, may be variable and not fixed. Let's assume each logical channel is configured with a parameter k2 that is rather expressed as a number of TTI. Each TTI that a logical channel is configured with may be converted into a certain number d of NR_UNIT of microseconds or milliseconds. Expressed in fixed time duration unit, the duration between UL data grant assignment time and UL data transmission time may be stated as k2*d. Let's denote MaxLatency (LCH) the maximum of k2*d taken across all TTIs configured for the logical channel LCH. The logical LCH is selected for the LCP procedure if the MaxLatency value is greater than or equal to the parameter k2 of the selected grant expressed in the same time unit as Maxlatency. In an alternative embodiment, the acceptable latency of logical channel LCH may be defined to be within a latency window characterised by MinLatency (LCH) and MaxLatency (LCH). The logical channel is selected for this grant i.e. the logical is not restricted from using this grant if the latency associated with the grant i.e. the parameter k2 of the grant falls into the latency window defined by MinLatency (LCH) in the lower end and MaxLatency (LCH) in the upper end.

Thus, in accordance with the description above, an apparatus that includes a plurality of logical channels configured to connect to a network may receiving a first grant of resources from a network node connected to the apparatus via the network. The first grant of resources may indicate a first lifetime associated with the first grant, such that the first grant is not usable when the first lifetime expires. Based on the lifetime associated with the first grant, the apparatus (UE) may select a logical channel of the plurality of logical channels of the apparatus, and transmit data over the selected logical channel using the first grant of resources. Further, the first grant of resources further may indicate a numerology associated with the first grant of resources, and the selected logical channel may be further selected based on the numerology. Further still, the apparatus may determine whether a data radio bearer is mapped to more than logical channel in the plurality of logical channels, and when the data radio bearer is mapped to more than one logical channel in the plurality of logical channels, the apparatus may restrict at least one logical channel of the plurality of logical channels from using first grant of resources.

Turning now to logical channel priority, the existing LTE logical channel priority definition may be re-used, in some cases. In this scheme, each logical channel is assigned one priority value. The smaller is the priority value, the higher is the logical channel priority.

As already described in this disclosure, a new logical channel priority type may be introduced in various examples. In one embodiment, this new priority type may be defined relative to the latency requirement of the service data flows or QoS flows mapped to the logical channel. Each logical channel is assigned a value of the parameter k2 introduced. The smaller is the value of the parameter k2 assigned to the logical channel, the higher is the logical channel priority.

In an alternative embodiment, the two priority types defined above may be used jointly. For example, the logical channels may be assigned two types of priority, parameter k2 based priority and LTE based priority type. The logical channels may then be prioritized first based on the parameter k2 based priority. In case of a tie, in some cases, logical channels may be prioritized using the logical channel priority as per the legacy LTE priority definition.

Figure 55:
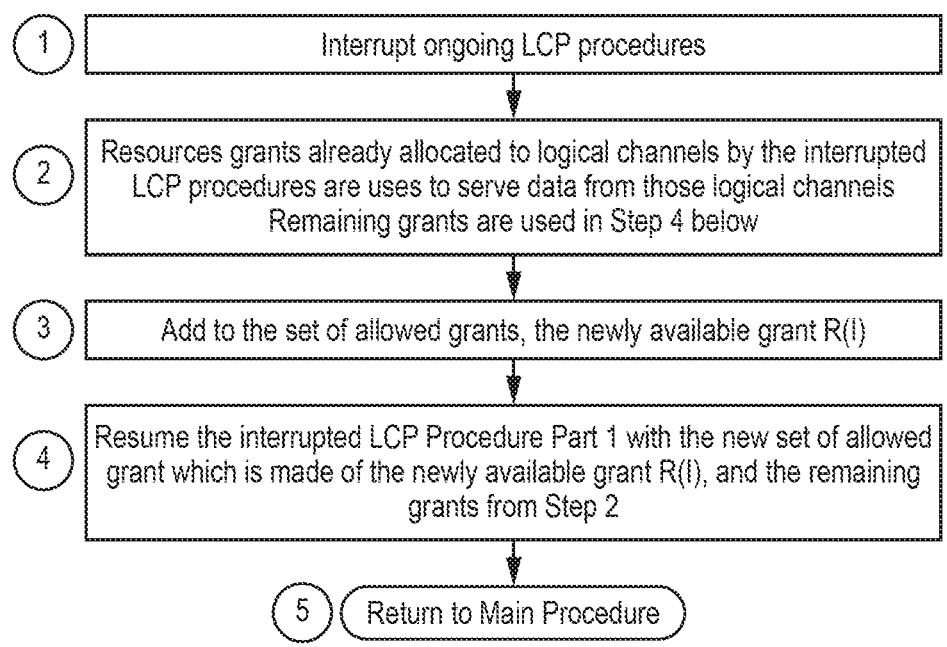
FIG. 55 illustrates an example flow for another portion of the LCP procedure.
Figure 56:
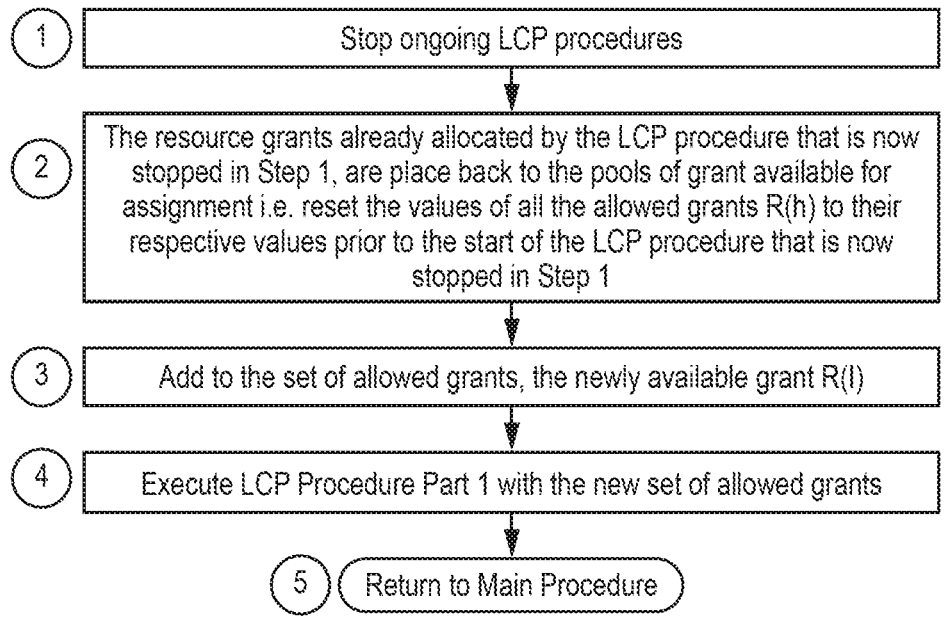
FIG. 56 illustrates another example flow for a portion of the LCP.
Figure 57:
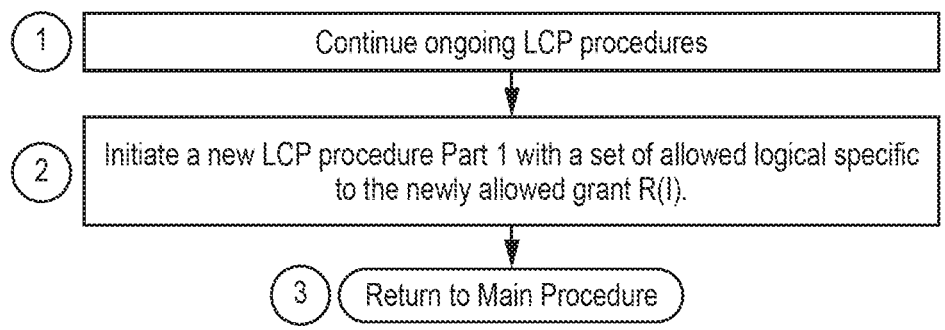
FIG. 57 illustrates yet another example flow for a portion of the LCP.

Different options for a second part (Part 2) of the LCP procedure are illustrated in FIGS. 55, 56, and 57. Part 2 of the example LCP procedure corresponds to step 10 in FIG. 53.

In an example, when there is new data for transmission and an LCP procedure is triggered as a result of the condition LCP_START(j)=k2(j)–T_LCP(j) being fulfilled for a grant R(j), it is possible that a new grant R(l) becomes available m NR-UNITS later and fulfils the relation T_LCP(j)≥m*NR-UNIT, and T_LCP(j)–m*NR_UNIT≥k2(1)–T_LCP(1), i.e. the LCP procedure triggered by the grant R(j) will not complete before the starting time of grant R(l) processing.

For this example case in which there is at least one logical channel common between the allowed logical channel set for the newly available grant R(l) and the allowed logical channel set for the existing allowable grants R(h), various options, such as those illustrated in FIGS. 55 and 56, may be implemented.

In one example, with reference to FIG. 55, the LCP is interrupted, at 1. At 2, The grants already allocated by the ongoing LCP are used by the logical channels to which they are allocated. The remaining grants after step 2 may be used in step 4 below. At 3, the newly available grant may be added to the set of allowable grants. At 4, the LCP may be re-initialized, and a new LCP procedure can be started with the new set of allowable grants, for example taking into account the remaining resource grants from Step 2 with the newly available grant R(l).

In another example, with reference to FIG. 56, an ongoing LCP is restarted. For example, at 1, an ongoing LCP is stopped. At 2, in accordance with the example, the resource grants already allocated by the LCP procedure that is now stopped in Step 1, are placed back to the pools of grants available for assignment. For example, the values of the allowed grants R(h) may be rest to their respective values prior to the start of the LCP procedure now stopped in Step 1. At 3, the newly available grant R(l) may be added to the set of available grants. At 4, the LCP procedure is restarted with the new set of the allowable grants. Alternatively, to account for the fact that the remaining LCP time budget might not be sufficient, in some cases, two or more parallel LCP procedures may be started with each assigned a specific non-overlapping set of allowed logical channels.

When there is no logical channels common between the allowed logical channel set for the newly available grant R(l) and the allowed logical channel set for the existing allowable grants R(h), another example illustrated in FIG. 57 may be implemented for resource grant assignment. Referring to FIG. 57, in accordance with the illustrated example, at 1, the ongoing LCP is not interrupted. At 2, a new LCP procedure is started with a set of allowed logical channels specific to the newly allowed grant R(l).

Thus, in accordance with the description above, an apparatus (UE) that includes a plurality of logical channels configured to connect to a network via its communication circuitry, may receive a first grant of resources from a network node connected to the apparatus via the network, wherein the first grant of resources indicates a first lifetime associated with the first grant, such that the first grant is not usable when the first lifetime expires. Based on the first lifetime associated with the first grant, the apparatus may select a logical channel of the plurality of logical channels of the apparatus, and transmit data over the selected logical channel using the first grant of resources. In an example, when the first grant of resource is received, the apparatus may establish a counter associated with the grant. The apparatus may increment the counter each time a predetermined unit of time expires without the first grant being used, so as to track an age of the first grant. In an example, the apparatus compares a latency requirement of each of the plurality of logical channels to a latency of the first grant to identify a subset of logical channels that can use the grant, wherein the selected logical channel is one of the subset of logical channels. The selected logical channel may be selected from the subset of logical channels based on a predetermined prioritization of the logical channels, and the predetermined prioritization may be based on at least one of the latency requirement of the selected logical channel or a quality of service requirement of the selected logical channel.

Further, as described with reference to FIGS. 53-57, the apparatus may receive a second grant of resources from the network node connected to the apparatus via the network, wherein the second grant of resources indicates a second lifetime associated with the second grant, such that the second grant is not usable when the second lifetime expires. In an example, the first lifetime of the first grant overlaps with the second lifetime of the second grant. The apparatus may make a determination that the second lifetime will expire before the first lifetime. Based on the determination, the apparatus may use the second grant of resources instead of the first grant of resources to transmit data over one of the plurality of logical channels. In another example, the apparatus may interrupt the transmitting of the data over the selected logical channel using the first grant of resources to transmit the data over another logical channel using the second grant of resources, and after the second grant of resources expires, the apparatus may resume the transmitting of the data over the selected logical channel. The data may be transmitted by the apparatus (e.g., UE) to the network in uplink communications, or the data may be transmitted by the apparatus to another apparatus in device-to-device communications.

Turning now to buffer status reports (BSRs), the UE may report buffer status i.e. the amount of data available for transmission in the UL buffers associated with the MAC entity (or entities), based on various buffer status reporting models.

In one example Buffer Status Reporting Option (Option 1), BSRs are common to network slices i.e. buffer status reports are not network slice specific. In some cases, the buffer statuses are not reported separately for each network slice. The UE (MAC) may aggregate the buffer status from different network slices and reported it a single buffer status report applicable to data available for transmission in the UL buffers associated with all network slices. The network may control the buffer status report signaling by configuring the UE for e.g. using RRC signaling, with the following example timers common to network slices: periodic BSR timer, retransmission BSR timer, and buffer status report prohibit timer. In some examples, the UE may trigger the BSR if any of the following events occurs, presented by way of example and without limitation: arrival of data, change of serving cell, periodically based on periodic BSR timer, BSR instead of MAC PDU padding.

In another example Buffer Status Reporting Option (Option 2): BSRs are common to PHY numerologies. For example, buffer status reports are not PHY numerology specific. In some cases, the buffer status is not reported separately for each numerology. The UE (MAC) may aggregate the buffer status from different numerologies and reported it as a single buffer status applicable to data available for transmission in the UL buffers associated with all PHY numerologies. In one exemplary embodiment, the UE may reports the buffer status for a configured logical channel or group of logical channels without consideration to logical channel mapping to numerology. The network may control the buffer status report signaling by configuring the UE for e.g. using RRC signaling, with the following timers common to all PHY numerology, presented by way of example and without limitation: periodic BSR timer, retransmission BSR timer and buffer status report prohibit timer. The UE may trigger the BSR if any of the following events occurs: arrival of data, change of serving cell, periodically based on periodic BSR timer, BSR instead of MAC PDU padding.

In yet another Buffer Status Reporting Option (Option 3): BSRs are network slice specific. For example, the UE (MAC) reports buffer status from different network slices separately for each network slice, possibly simultaneously, to the NR node. Each network slice may have more than one buffer status reports in any particular TTI or time interval X. For e.g., the UE (MAC) may report buffer status for different logical channels or different logical channel groups of a network slice separately for each network slice. In another alternative, the UE (MAC) may report a single buffer status per network slice i.e. the UE may aggregate the buffer status from all logical channels that belongs to the same network slice and report it to the NR Node as a single buffer status report. The network may control the buffer status report signaling by configuring the UE for e.g. using RRC signaling, with the following example timers for each network slice, presented by way of example and without limitation: periodic BSR timer, retransmission BSR timer, and buffer status report prohibit timer. The UE may trigger the BSR if any of the following events occurs, presented by way of example and without limitation: arrival of data for a network slice, change of serving cell, periodically based on periodic BSR timer, BSR instead of MAC PDU padding.

In yet another example Buffer Status Reporting Option (Option 4), BSRs are numerology specific. For example, the UE (MAC) reports buffer status from different numerologies separately for each numerology, possibly simultaneously, to the NR node. Each numerology may have more than one buffer status reports in any particular TTI or time interval X. For e.g. The UE (MAC) may report buffer status for different logical channels or different logical channel groups of a numerology separately for each numerology. In another alternative, the UE (MAC) reports a single buffer status report per numerology i.e. the UE may aggregate the buffer status from all logical channels that belongs to the same PHY numerology and report it to the NR Node as a single buffer status report. The network may control the buffer status report signaling by configuring the UE for e.g. using RRC signaling, with the following example timers for each numerology, presented by way of example and without limitation: periodic BSR timer, retransmission BSR timer and buffer status report prohibit timer. The UE may trigger the BSR if any of the following events occur, presented by way of example and without limitation: arrival of data for a network slice, change of serving cell, periodically based on periodic BSR timer, BSR instead of MAC PDU padding.

In yet another example Buffer Status Reporting Option (Option 5): BSRs are application specific. The UE reports BSR separately for each application. The network may control the buffer status report signaling by configuring the UE for e.g. using RRC signaling, with the following example timers for each application: periodic BSR timer, retransmission BSR timer, and buffer status report prohibit timer. The UE may trigger the BSR if any of the following events occurs, presented by way of example and without limitation: arrival of data for an application, change of serving cell, periodically based on periodic BSR timer, BSR instead of MAC PDU padding.

In another example Buffer Status Reporting Option (Option 6): BSRs are data flows specific. The UE reports BSR separately for each data flow. The network may control the buffer status report signaling by configuring the UE for e.g.

using RRC signaling, with the following example timers for each data flow: periodic BSR timer, retransmission BSR timer, and buffer status report prohibit timer. The UE may trigger the BSR if any of the following events occur, presented by way of example and without limitation: arrival of data for a data flow, change of serving cell, periodically based on periodic BSR timer, BSR instead of MAC PDU padding.

In another Buffer Status Reporting Option (Option 7), BSRs are logical channel specific or logical channel group specific. The UE reports BSR separately for each logical channel or logical channel group. The logical channel or logical channel group may be slice specific. For example, BSR may be reported as slice specific and the within each slice, the BSRs may be reported on logical channel basis or logical channel group basis, for example on slice specific basis or on slice group basis. The network may control the buffer status report signaling by configuring the UE for e.g. using RRC signaling, with the following example timers for each logical channel or logical channel group: periodic BSR timer, retransmission BSR timer and buffer status report prohibit timer. The UE may trigger the BSR if any of the following events occur, presented by way of example and without limitation: arrival of data for a logical channel or logical channel group, change of serving cell, periodically based on periodic BSR timer, BSR instead of MAC PDU padding.

In another Buffer Status Reporting Option (Option 8): A combination of two or more of the options above may be performed. For example, the UE may report some buffer status as network specific buffer status, while the UE may report some other buffer status that are common to all network slices.

The UE BSR reporting methods and configurations may be configured (by higher layers) to align with UL resources grant allocation. In this way, the reported BSR can be properly used by the network to determine the uplink scheduling grant(s) for the UE appropriately.

Turning now to Power Headroom Reporting, the UE maximum allowed transmit power may be defined as per carrier, per network slice, per beam and etc. Depending on the definition of UE maximum allowed transmit power, corresponding power headroom will be defined accordingly. The UE (e.g. MAC) may report power headroom (type 1 power headroom or type 2 power headroom), which may be the amount of transmission power available in the UE based on the various power status reporting models.

In one example Power Headroom Reporting Option (Option 1): PHRs are common to network slices i.e. power headroom reports are not network slice specific. The power headroom is not reported separately for each network slice. The network may control the PHR signaling by configuring the UE for e.g. using RRC signaling, with the following parameters common to all network slices, presented by way of example and without limitation: periodic PHR timer, prohibit PHR timer, change in path loss (the difference between the current power headroom and the last report is larger than a configurable threshold).

In another Power Headroom Reporting Option (Option 2): PHRs are common to PHY numerologies i.e. power headroom reports are not PHY numerology specific. The power headroom is not reported separately for each numerology. The network may control the PHR signaling by configuring the UE for e.g. using RRC signaling, with the following parameters common to all PHY numerologies, presented by way of example and without limitation: periodic PHR timer, prohibit PHR timer, change in path loss (the difference between the current power headroom and the last report is larger than a configurable threshold).

In another Power Headroom Reporting Option (Option 3): PHRs are network slice specific i.e. the UE (MAC) reports power headrooms for different network slices separately for each network slice to the NR node, possibly simultaneously. Each network slice may have more than one power headroom reports in any particular TTI or time interval X. For e.g. the UE (MAC) may report power headroom for different serving cells separately for each network slice. In another alternative, the UE (MAC) may report a single power headroom per network slice. The network may control the PHR signaling by configuring the UE for e.g. using RRC signaling, with the following parameters for each network slice, presented by way of example and without limitation: periodic PHR timer, prohibit PHR timer, change in path loss (the difference between the current power headroom and the last report is larger than a configurable threshold).

In another Power Headroom Reporting Option (Option 4), PHRs are numerology specific i.e. the UE (MAC) reports power headrooms for different PHY numerologies separately for each numerology, possibly simultaneously, to the NR node. Each numerology may have more than one power headroom reports in any particular TTI or time interval X. For e.g. the UE (MAC) may report power headroom for different serving cells separately for each numerology. In another alternative, the UE (MAC) may report a single power headroom per numerology. The network may control the PHR signaling by configuring the UE for e.g. using RRC signaling, with the following parameters for each numerology, presented by way of example and without limitation: periodic PHR timer, prohibit PHR timer, change in path loss (the difference between the current power headroom and the last report is larger than a configurable threshold).

In another example Power Headroom Reporting Option (Option 5): power headroom is application specific. The UE reports power headroom separately for each application. The network may control the PHR signaling by configuring the UE for e.g. using RRC signaling, with the following parameters for each application, presented by way of example and without limitation: periodic PHR timer, prohibit PHR timer, change in path loss (the difference between the current power headroom and the last report is larger than a configurable threshold).

In another Power Headroom Reporting Option (Option 6): PHRs are data flows specific. The UE reports PHRs separately for each data flow. The network may control the PHR signaling by configuring the UE for e.g. using RRC signaling, with the following parameters for each application, presented by way of example and without limitation: periodic PHR timer, prohibit PHR timer, change in path loss (the difference between the current power headroom and the last report is larger than a configurable threshold).

In another Buffer Status Reporting Option (Option 7), a combination of two or more of the options above may be performed. For example, the UE may report some power head room as network specific while the UE may report some other power headroom, that are common to all network slices, possibly simultaneously.

Turning now to scheduling requests (SRs), the UE may send Scheduling Request (SR) to the NR Node based on various example SR models. In one example, SRs are common to network slices i.e. scheduling request are not network slice specific. The scheduling requests are not transmitted separately for each network slice. In some cases, the SR periodicity is common across all slices. The UE may trigger the SR upon the following events, presented by way of example and without limitation: arrival of data with higher priority than already existing in the transmit buffers of any configured network slice.

The SR may be transmitted as a result of there being data available for transmission in a TTI with higher priority than already existing in the transmit buffers of any configured network slice, there is no UL-SCH resources for a transmission in this TTI. In one embodiment, the schedule request may indicate to the gNB, the network slices for which resource grant is being requested. Each network slice for which a resource grant is being requested may be represented by a single bit in the SR. The grant allocation signaled by the gNB to the UE may also include indication of the network slices for which a grant is being allocated. The gNB may set in a grant allocation signaling to the UE, a single bit for each of the network slice for which a grant is allocated, where "1" indicating a grant is allocated and "0" indicating a grant is not allocated or vice-versa. In another embodiment, the schedule request has no indication of the network slices for which resource grant is being requested. When the UE requests resources common to network slices i.e. that can be used for any network slice the UE is configured with, the UE may not set a slice indication bit in the SR. The UE uses the value of the bit associated with each network slice in the resource grant message received from the gNB to identify if a grant is allocated for that network slice. If no bit is set for any network slice, the UE may interpret this as to mean the received grant is usable for all network slices the UE is configured with.

In another Scheduling Request example: SRs are common to PHY numerologies i.e. scheduling request are not PHY numerology specific. The buffer status is not reported separately for each numerology. The scheduling requests are not transmitted separately for each numerology. The SR periodicity is common across all numerology. The UE may trigger the SR upon the following events: arrival of data with higher priority than already existing in the transmit buffers of any configured numerology. In one embodiment, the scheduling request may indicate to the gNB, the numerology for which resource grant is being requested. Each numerology for which a resource grant is being requested may be represented by a single bit in the SR. The grant allocation signaled by the gNB to the UE may also include indication of the numerology for which a grant is being allocated. The gNB may set a single bit for each of the numerologies for which a grant is allocated, 1 indicating a grant is allocated and 0 a grant is not allocated or vice-versa. In another embodiment, the scheduling request may have no indication of the numerology for which resource grant is being requested. When the UE is requesting resources common to numerologies i.e. that can be used for any numerology the UE is configured with, the UE may not set a numerology indication bit. In some cases, the UE uses the value of the bit associated with each numerology in the resource grant message received from the gNB to identify if a grant is allocated for that specific numerology. If no bit is set for any numerology, the UE may interpret this as to mean the received grant is usable for all numerologies the UE is configured with.

In another Scheduling Request option or example, SRs are network slice specific i.e. the UE may be configured with network slice specific SR by the gNB and the UE may send a scheduling request separately for each network slice, possibly simultaneously, to the NR node. The scheduling periodicity is network slice specific for e.g. for slice x, scheduling request subframes occur every n_x subframe(s) while for slice y, scheduling request subframes occur every n_y subframes. The UE may trigger the SR upon the following events, presented by way of example and without limitation: arrival of data with higher priority than already existing in the transmit buffers of the network slice associated with this SR.

In another Scheduling Request example, SRs are numerology specific i.e. the UE may be configured with numerology specific SR by the gNB and the UE may send a scheduling request separately for each numerology, possibly simultaneously, to the NR node. The scheduling periodicity is numerology specific for e.g. for numerology x, scheduling request subframes occur every n_x subframes while for numerology y, scheduling request subframes occur every n_y subframes. The UE may trigger the SR upon the following events, presented by way of example and without limitation: arrival of data with higher priority than already existing in the transmit buffers of the numerology associated with this SR.

In yet another Scheduling Request example, SRs are application specific i.e. the UE may be configured with application specific SR by the gNB and the UE may send SRs separately for each application, possibly simultaneously. The scheduling periodicity is application specific for e.g. for application x, scheduling request subframes occur every n_x subframes while for application y, scheduling request subframes occur every n_y subframes. The UE may trigger the SR upon the following events: arrival of data with higher priority than already existing in the transmit buffers of the application associated with this SR.

In yet another Scheduling Request example, SRs are data flow specific i.e. the UE may be configured with data flow specific SR by the gNB and the UE may send SRs separately for each data flow, possibly simultaneously. The scheduling periodicity is data flow specific for e.g. for data flow x, scheduling request subframes occur every n_x subframes while for data flow y, scheduling request subframes occur every n_y subframes. The UE may trigger the SR upon the following events: arrival of data with higher priority than already existing in the transmit buffers of the data flow associated with this SR.

In yet another Scheduling Request example: SRs are logical channel specific or logical channel group specific i.e. the UE may be configured with logical channel or logical channel group specific SR by the gNB and the UE may send SR separately for each logical channel or logical channel group. The logical channel or logical channel group may be slice specific. For example SR may be reported as slice specific and the within each slice, the SRs may be reported on logical channel basis or logical channel group basis, for example on slice specific basis or on slice group basis. The UE may trigger the SR upon the following events: arrival of data with higher priority than already existing in the transmit buffers of the logical channel or logical channel group associated with this SR.

In another Scheduling Request example, a combination of two or more of the options above. For example, the UE may report some SRs as network specific while the UE may report some other SRs that are common to all network slices, possibly simultaneously.

Turning now to examples of UE capability coordination between the UE, the access network (e.g. RAN), and the core network, as discussed above, the next generation mobile telecommunication systems are being design to support a large family of usage scenarios such as eMBB, URLLC and mMTC. These major use cases have diverse and conflicting service requirements in terms of latency, data rates, mobility, device density, reliability, UE battery life, network energy consumption, etc. In order to efficiently support these diverse and conflicting service requirements, network slicing will be used. It is likely that different UE might have different capability in terms of which network slices or combination of network slices or network slice features they support. Methods for UE capability handling in the context of next work slicing are discussed below. For the purpose of this discussion, we will also refer to slice type as a slice for a major use case such as eMBB slice type, URLL slice type or mMTC slide type.

UE capability may be defined in terms of UE RAN slice capability and will may capability such as UE radio capability. UE capability may also be defined in terms of UE core network slice capability. One approach to UE capability signaling is for the UE to signal to the network, the RAN slice capability on slice specific basis or slice type specific basis. Similarly, the UE may signal to the network, the UE core network capability on slice specific basis or slice type specific basis. We can refer to slice specific capability signaling as network slice hard split UE capability signaling. In this approach, the UE signals to the network, network slice or network slice type specific UE capability. Another approach to network capability signaling, is a combined UE capability signaling approach. In this approach, the UE may signal to the network, a combined UE RAN capability including UE radio capability. Similarly, the UE may signal a combined UE core network capability. A third approach maybe a combination of both approach where some UE capability (either UE RAN/RAT capability or UE core network capability) are signaled on slice specific or slice type specific basis while some other are signaled as a combined capability across network slices.

In an example of Network Slice Hard Split UE Capability Handling, the UE capability (e.g. radio capability such as frequency bands, supported band combination, core network capability such as NAS security algorithms, etc.) for a slice or slice type might not be fully utilized while the UE capability for another slice or slice type is fully utilized and may benefit from capability expansion or capability upgrade. In such scenario, it is possible for the network to re-assigned UE capability from under-utilized slice. The network may reconfigure the UE with a new capability split between network slices or network slice types. The UE may also autonomously detect the need to rebalance the capability split between the network slices the UE is configured with. For e.g. assume the UE is configured with a network slice involving NR RAT. Subsequently, the UE is configured with an additional slice involving LTE RAT or WLAN RAT. This might trigger the UE to initiate a UE capability update toward the network (access network and core network) with an updated its capability information (e.g. radio capability). This may be for e.g. as the result of the usage level of particular network slice or interference level between RATs (in-device interference). The UE may send a capability update to the network for e.g. to indicate for e.g. a new band combination or a new capability split between network slices. The network may accept the new capability split or reject and/or propose a new capability split. The UE may initiate UE capability update procedure in RRC CONNECTED state. This RRC connected state may be any of the RRC connected states under discussion in the NR context for e.g. RRC connected active state or RRC connected inactive state.

Interfaces, such as Graphical User Interfaces (GUIs), can be used to assist user to control and/or configure functionalities related to architecture aspects and QoS for next generation mobile telecommunication systems.

A User Interface (UI) may be used to configure one or more of the parameters associated with the inventions described herein. The user interface may be textual, a Textual User Interface (TUI), or graphical, a Graphical User Interface (GUI).

Figure 50:
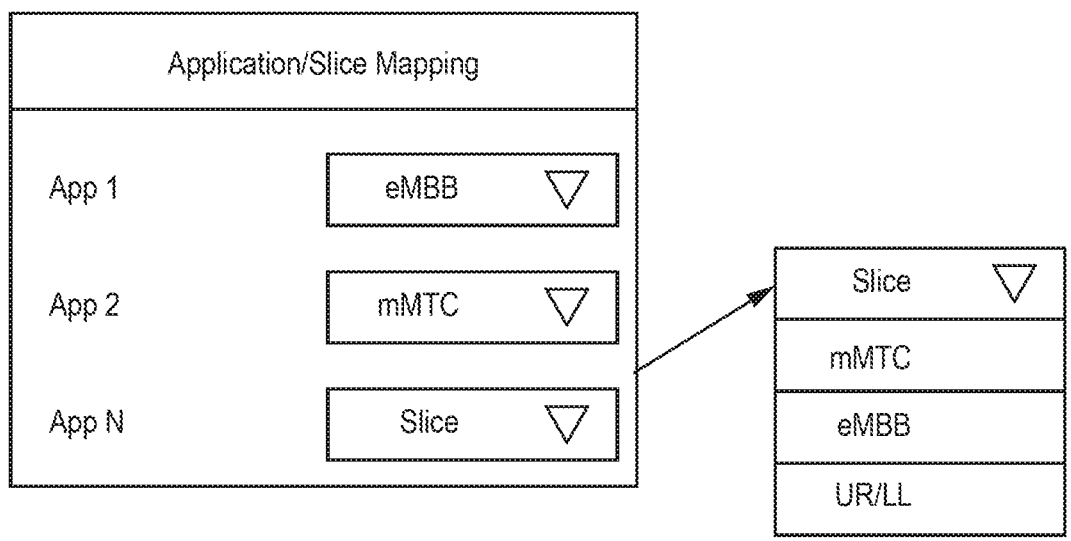
FIG. 50 is a diagram illustrating an exemplary user interface (UI) for application/slice mapping.

The UI may provide the user with the capability to configure how an application/service is mapped to a given set of network resources; i.e. a slice. For example, the UI may allow the user to manually select which slice(s) an application/service can access. An exemplary UI for Application/Slice mapping is shown in FIG. 50. For scenarios where more than one slice meets the application/service requirements, a list of slices may be provided, where the slices may be ordered according to user preference.

Figure 51:
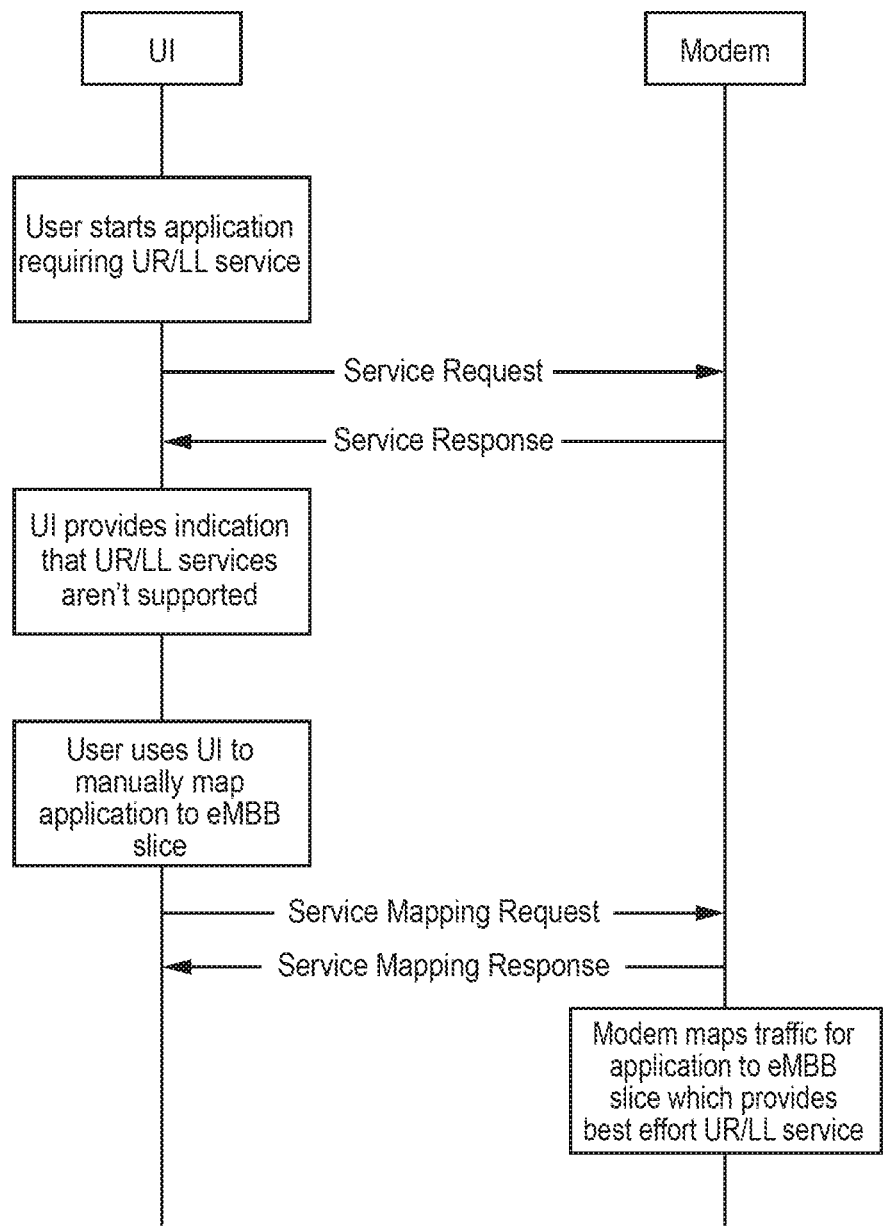
FIG. 51 is a diagram illustrating exemplary Signaling between the UI and a Modem.

For the scenario where none of the slices detected by the UE are capable of meeting the service requirements, a notification may be shown on the UE indicating the service requirements could not be met. The user may then be prompted to confirm the indication. Alternatively, the user may be provided with an option to map the application/service to a network slice that can be used to provide "best effort" service until a slice that is capable of meeting the service requirements is available. Exemplary signaling between the UI and modem for this scenario is shown in FIG. 51.

The UI may provide the user with the capability to configure the reporting of Buffer Status Reports (BSR) and/or Power Headroom Reports (PHR). The UI may provide the user with the capability to set the default values used for BSR/PHR reporting or to override the values configured by the RRC entity. The UI may also provide the user with the option to select which slice to use for BSR/PHR reporting.

The UI may provide the user with the capability to configure the resource grant allocation options. For example, in the case of network controlled resource grant allocation, the grant allocation could be configured to one of the NR Resource Grant Options; e.g. common to network slices (NR Resource Grant Option 1), common to physical layer numerology (NR Resource Grant Option 2), etc. And in the case of UE controlled resource grant allocation, the grant allocation could be configured to one of the NR Resource Grant Options; e.g. common to network slice (NR Resource Grant Option 1), common to physical layer numerology (NR Resource Grant Option 2), etc. It is to be understood that the interface of FIG. 50 can be produced using displays such as those shown in FIGS. 52B and F described below.

Example Communication Systems/Networks

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 52A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of apparatus or device configured to operate and/or communicate in a wireless environment. Although each WTRU 102a, 102b, 102c, 102d is depicted in FIGS. 52A-52E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (remote radio heads) 118a, 118b and/or TRPs (transmission and reception points) 119a, 119b to facilitate access to one or more communication networks, such as the core network 106/107/109, the Internet 110, and/or the other networks 112. RRHs 118a, 118b may be any type of device configured to wirelessly interface with at least one of the WTRUs 102c, to facilitate access to one or more communication networks, such as the core network 106/107/109, the Internet 110, and/or the other networks 112. TRPs 119a, 119b may be any type of device configured to wirelessly interface with at least one of the WTRUs 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115e/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology.

In an embodiment, the base station 114*a* and the WTRUs 102*a*, 102*b*, 102*c*, or RRHs 118*a*, 118*b* and TRPs 119*a*, 119*b* in the RAN 103*b*/104*b*/105*b* and the WTRUs 102*c*, 102*d*, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 52A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet an embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 4A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 52A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/105 or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d*, and 102*e* may include multiple transceivers for communicating with different wireless networks over different wireless links. For example, the WTRU 102*e* shown in FIG. 4A may be configured to communicate with the base station 114*a*, which may employ a cellular-based radio technology, and with the base station 114*c*, which may employ an IEEE 802 radio technology.

FIG. 52B is a block diagram of an example apparatus or device configured for wireless communications in accordance with the embodiments illustrated herein, such as for example, a WTRU 102. As shown in FIG. 52B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 52B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 52B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 52A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 52A may be configured to communicate with the base station 114a, which may employ a cellular-based radio technology, and with the base station 114b, which may employ an IEEE 802 radio technology.

FIG. 52B is a block diagram of an example apparatus or device configured for wireless communications in accordance with the embodiments illustrated herein, such as for example, a WTRU 102. As shown in FIG. 52B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 52B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 52B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 52B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 52C:
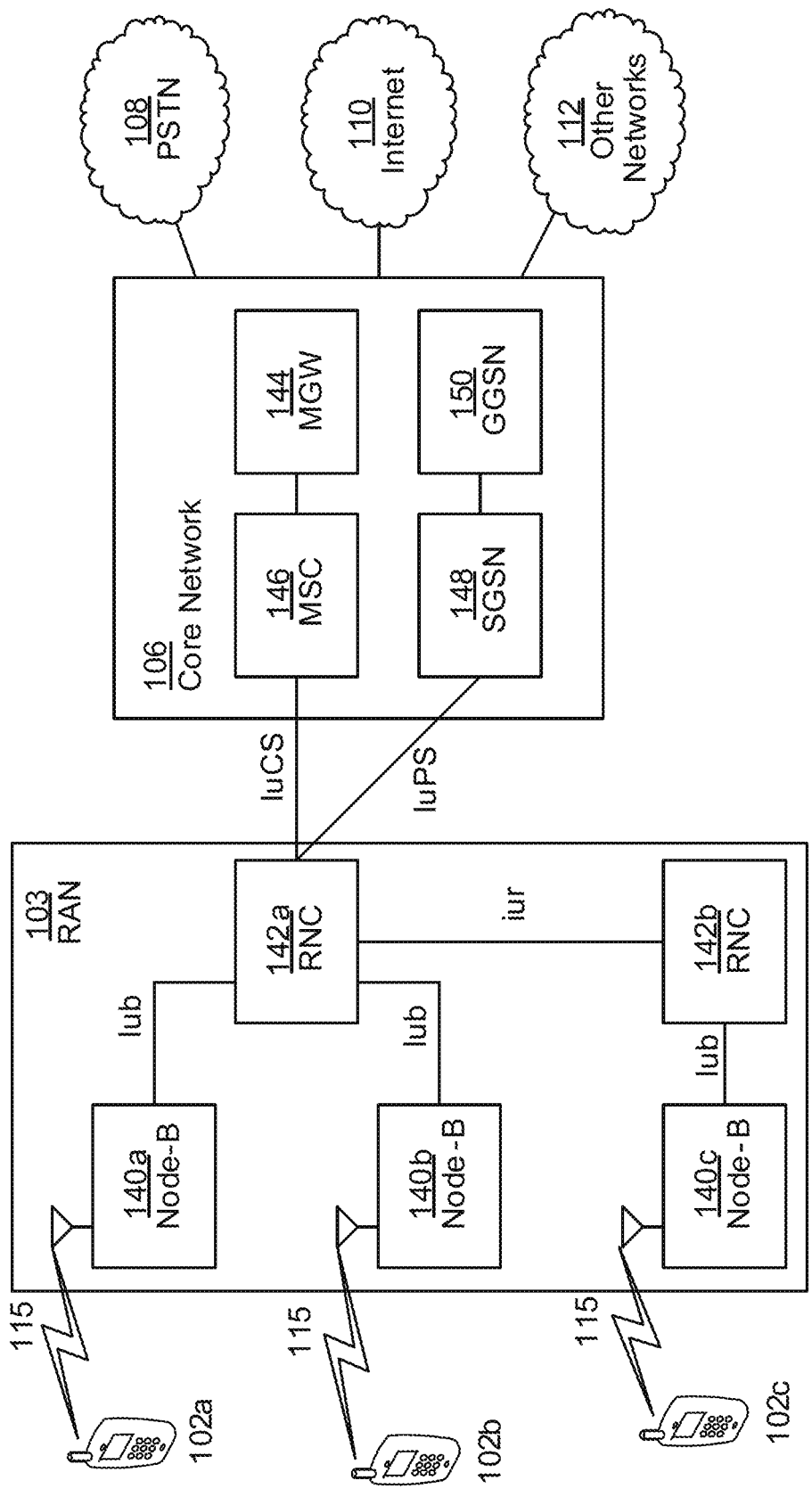
FIG. 52C is a system diagram of the RAN and the core network according to an embodiment.

FIG. 52C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 52C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 52C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 52C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 52D:
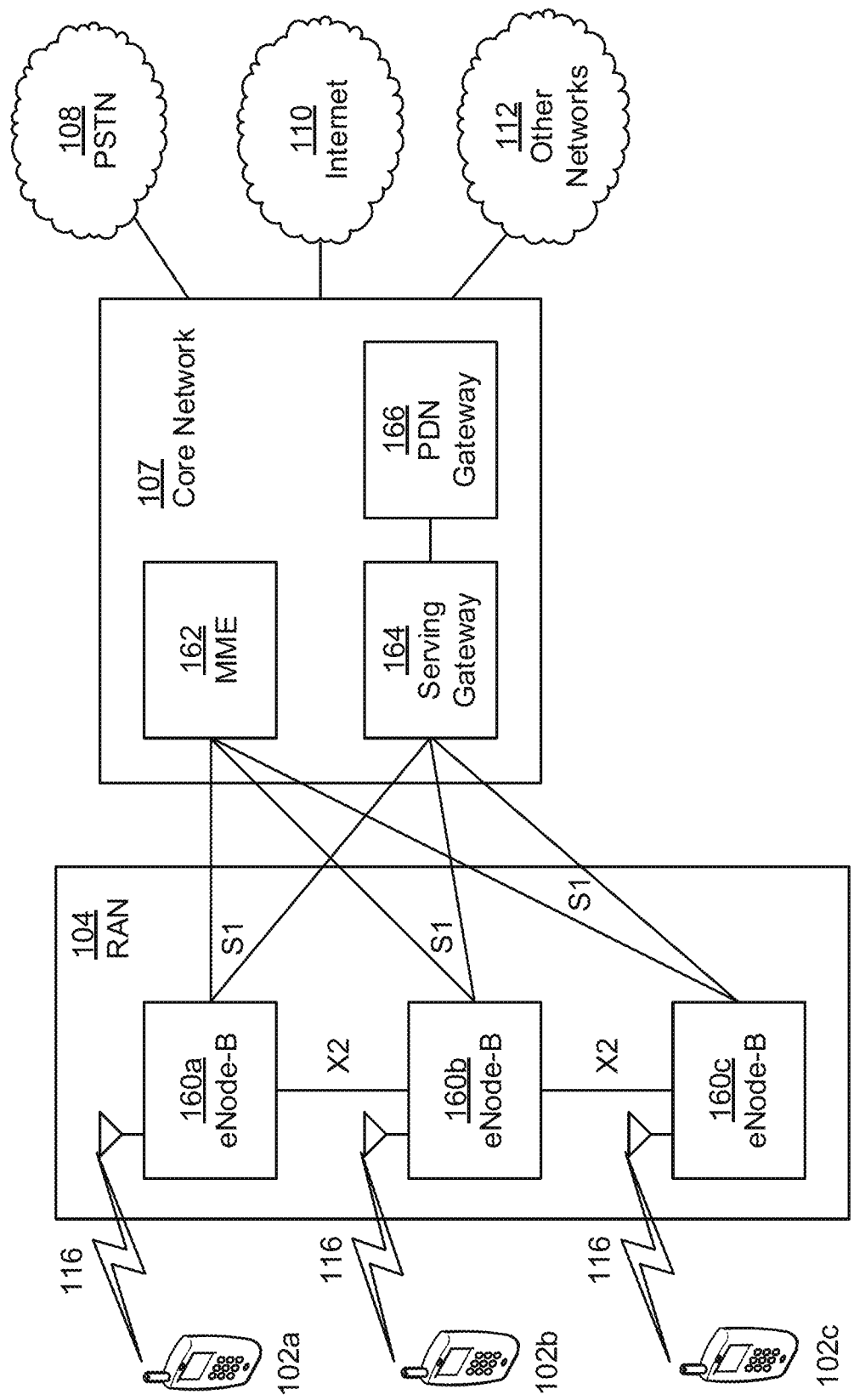
FIG. 52D is a system diagram of the RAN and the core network according to another embodiment.

FIG. 52D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 52D, the eNode-Bs 160a, 160b, 160c may communicate with one another over an X2 interface.

The core network 107 shown in FIG. 52D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 52E:
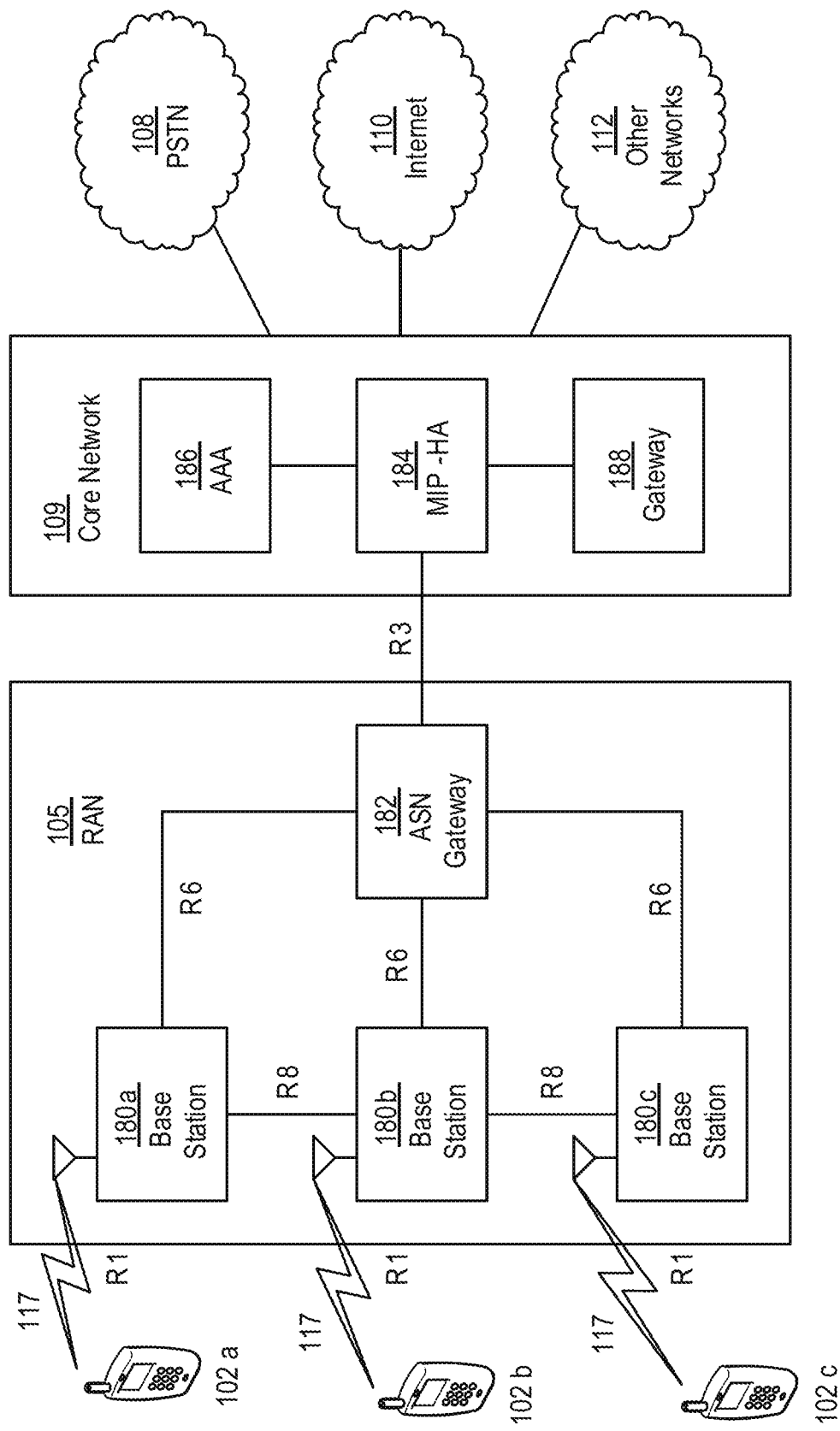
FIG. 52E is a system diagram of the RAN and the core network according to yet another embodiment.

FIG. 52E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 52E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 52E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 52E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 52A, 52C, 52D, and 52E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 52A, 52B, 52C, 52D, and 52E are provided by way of example only, and it is understood that the subject matter disclosed and claimed herein may be embodied or implemented in any similar communication system, whether presently defined or defined in the future.

Figure 52F:
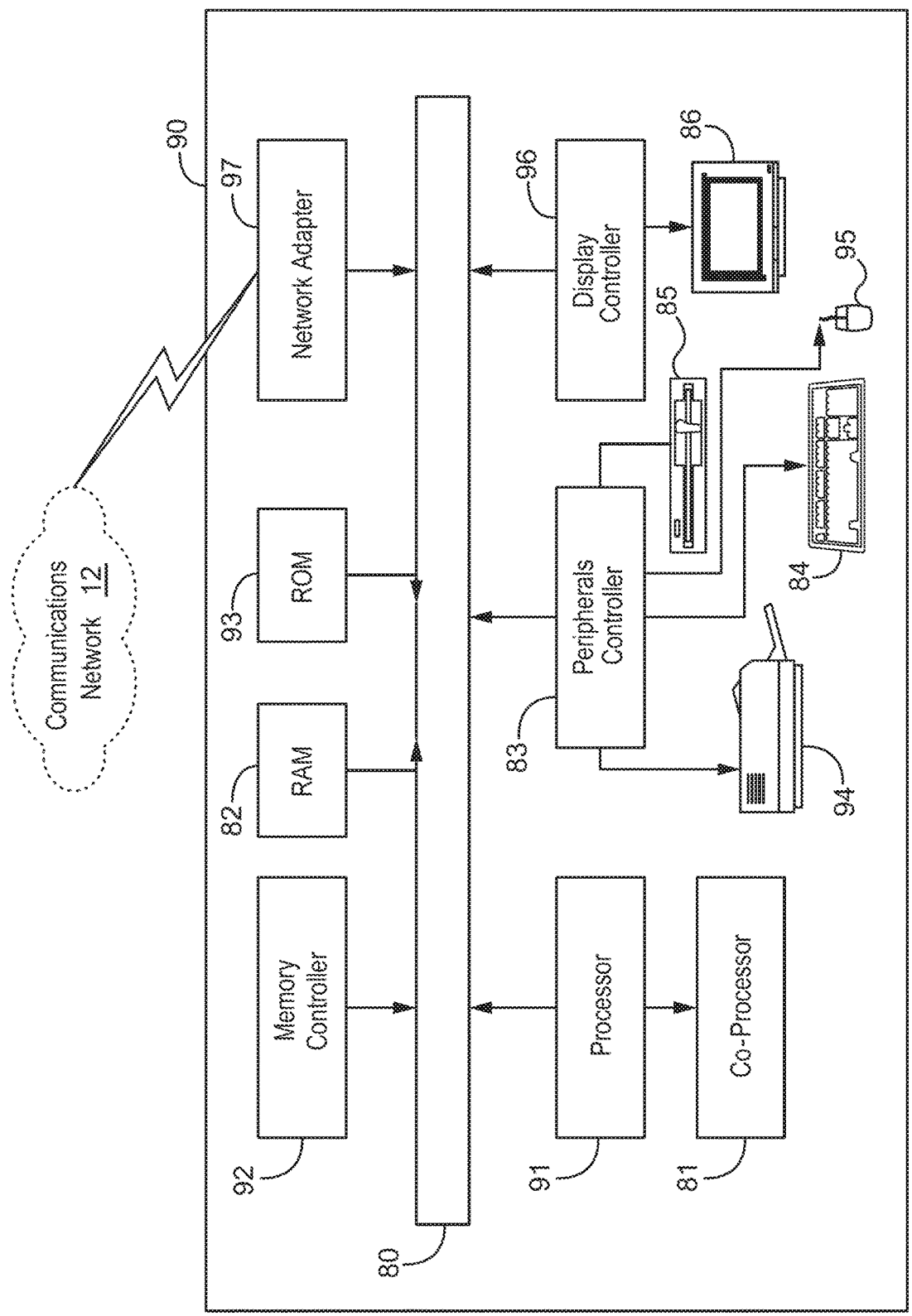
FIG. 52F is a block diagram of an exemplary computing system in which one or more apparatuses of the communications networks illustrated in FIGS. 52A, 52C, 52D and 52E may be embodied.

FIG. 52F is a block diagram of an exemplary computing system 90 in which one or more apparatuses of the communications networks illustrated in FIGS. 52A, 52C, 52D and 52E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 52A, 52B, 52C, 52D, and 52E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The following is a list of acronyms relating to service level technologies that may appear in the above description:
3GPP 3$^{rd}$ Generation Partnership Project
ACK ACKnowledgement
AF Application Function
AN Access Network
AS Access Stratum
APN Access Point Name
BCH Broadcast Channel
BCCH Broadcast Control Channel
BS Base Station
BSD Bucket Size Duration
BSR Buffer Status Report CAN Connectivity Access Network
CC Component Carrier
CCCH Common Control Channel
CE Control Element
CN Core Network
CP Control Plane
CPU Central Processing Unit
CQI Channel Quality Indicator
C-RNTI Cell Radio-Network Temporary Identifier
CSI Channel State Indicator
DL Downlink
DM Device Management
DN Data Network
DRB Data Radio Bearer
eMBB enhanced Mobile Broadband
eNB Evolved Node B
EPC Evolved Packet Core
E-UTRA Evolved Universal Terrestrial Radio Access
FEP Flow Encapsulation Protocol
FPI Flow Priority Indicator
FPL Flow Priority Level
GBR Guaranteed BitRate
GW GateWay
HARQ Hybrid Automatic Repeat Request (H ARQ)
ID Identifier
IMS IP Multimedia Subsystem
IMT International Mobile Telecommunications
IOT or IoT Internet Of Things
IP Internet Protocol
L2 data Link Layer
LCG Logical Channel Group
LCP Logical Channel Prioritization
LTE Long Term Evolution
MAC Medium Access Control
MCG Master Cell Group
MCH MultiCast Channel
mIOT massive Internet Of Things
MTC Machine-Type Communications
mMTC Massive Machine Type Communication
NAS Non Access Stratum
NB Narrow Band
NextGen Next Generation
NG Next Generation
NGC Next Generation Core network
NR New Radio
OAM Operation Administration and Maintenance
OTA Over The Air
PBCH Physical Broadcast Channel
PBR Prioritized Bit Rate
PCH Paging Channel
PDCP Packet Data Convergence Protocol
PDSCH Physical Downlink Shared Channel
PDU Packet Data unit
PHY Physical Layer
PHR Power Headroom Report
PUCCH Physical Uplink Control Channel
PUSCH Physical Uplink Shared Channel
PHY PHYsical for (physical layer or sublayer)
QoS Quality of Service
RAB Radio Access Bearer
RACH Random Access CHannel
RAN Radio Access Network
RAT Radio Access Technology
RB Resource Block or Radio Bearer
RLC Radio Link Control
RNTI Radio Network Temporary Identifier
RRC Radio Resource Control
RQI Reflective QoS Indication
Rx Receiver
SA2 Service and Systems Aspects Working Group 2
SAP Service Access Point
SCell: Secondary Cell
SpCell Special Cell
SCG Secondary Cell Group
SCH Shared Channel
SDU Service Data Unit
SL Side link
SPID Subscriber Profile ID
SR Scheduling Request
SRB Signaling Radio Bearer
TFF Traffic Flow Filter
TFT Traffic Flow Template
TRP Transmission and Reception Point
TTI Transmission Time Interval
Tx Transmitter
UCI Uplink Control Information
UDP User Datagram Protocol
UE User Equipment
UL Uplink
UP User Plane
URLLC Ultra-Reliable and Low Latency Communications
UTRAN Universal Terrestrial Radio Access Network

What is claimed:

1. An apparatus comprising a processor, a memory, and communication circuitry, the apparatus comprising a plurality of logical channels configured to connect to a network via communication circuitry, the apparatus further comprising computer-executable instructions stored in the memory of the apparatus which, when executed by the processor of the apparatus, cause the apparatus to perform operations comprising:

receiving a data radio bearer (DRB) configuration, wherein DRBs configured by the DRB configuration are mapped to quality of service (QoS) flow in a first layer;

receiving a first grant of resources from a network node connected to the apparatus via the network,
wherein the first grant of resources indicates a numerology restriction of logical channels with respect to subcarrier spacing (SCS) and a duplication restriction of logical channels with respect to one or more component carrier (CC), the duplication restriction being for restricting a logical channel associated with one or more of the DRBs having duplication in a second layer, the second layer being lower than the first layer,
wherein the first grant of resources further indicates a first lifetime associated with a logical channel of the first grant, such that a logical channel of the first grant is not usable when the first lifetime expires;

preparing a data packet having a header including QoS flow identifier (ID) in the first layer;

determining, based on the numerology restriction and the duplication restriction, each of the plurality of logical channels of the first grant to identify a subset of logical channels that fit requirements to use the first grant;

based on determining the subset of logical channels that fit the requirements to use the first grant and determining the first lifetime not expiring, selecting a first logical channel of the plurality of logical channels of the apparatus in a third layer being lower than the second layer, wherein the selected first logical channel is one of the subset of logical channels; and transmitting the data packet of the selected first logical channel using the first grant of resources.

2. The apparatus of claim 1, the apparatus further comprising computer-executable instructions stored in the memory of the apparatus which, when executed by the processor of the apparatus, cause the apparatus to perform operations comprising:
determining whether a data radio bearer is mapped to more than one logical channel in the plurality of logical channels; and
when the data radio bearer is mapped to more than one logical channel in the plurality of logical channels, restricting at least one logical channel of the plurality of logical channels from using first grant of resources.

3. The apparatus of claim 1, the apparatus further comprising computer-executable instructions stored in the memory of the apparatus which, when executed by the processor of the apparatus, cause the apparatus to perform operations comprising:
when the first grant of resource is received, establishing a counter associated with the grant; and
incrementing the counter each time a predetermined unit of time expires without the first grant being used, so as to track an age of the first grant.

4. The apparatus of claim 1, wherein the selected first logical channel is selected from the subset of logical channels based on a predetermined prioritization of the logical channels, the predetermined prioritization based on at least one of the latency requirement of the selected first logical channel or a quality of service requirement of the selected first logical channel.

5. The apparatus of claim 1, the apparatus further comprising computer-executable instructions stored in the memory of the apparatus which, when executed by the processor of the apparatus, cause the apparatus to perform operations comprising:
receiving a second grant of resources from the network node connected to the apparatus via the network, wherein the second grant of resources indicates a second lifetime associated with the second grant, such that the second grant is not usable when the second lifetime expires, and the first lifetime overlaps with the second lifetime.

6. The apparatus of claim 5, the apparatus further comprising computer-executable instructions stored in the memory of the apparatus which, when executed by the processor of the apparatus, cause the apparatus to perform operations comprising:
making a determination that the second lifetime will expire before the first lifetime; and
based on the determination, using the second grant of resources instead of the first grant of resources to transmit data over one of the plurality of logical channels.

7. The apparatus of claim 5, the apparatus further comprising computer-executable instructions stored in the memory of the apparatus which, when executed by the processor of the apparatus, cause the apparatus to perform operations comprising:
interrupting the transmitting of data over the selected first logical channel using the first grant of resources to transmit data over another logical channel using the second grant of resources.

8. The apparatus of claim 1, wherein the data is transmitted to the network in uplink communications or to another apparatus in device-to-device communications.

9. The apparatus of claim 1, wherein:
the first grant of resources further indicates one or more of:
a numerology, or whether the first grant of resources is numerology specific resource grant; and
the selected first logical channel is further selected based on one or more of:
the indicated numerology or the indication of whether the first grant of resources is numerology specific resource grant.

10. The apparatus of claim 1, wherein the operations further comprise receiving configurations, the configurations comprise:
a first one or more allowed numerology common resource grants, and
a second one or more allowed numerology common resource grants.

11. The apparatus of claim 10, wherein:
the first one or more allowed numerologies of the first logical channel of the plurality of logical channels is associated with a first one or more allowed subcarrier spacings, and
the second one or more allowed numerologies of the second logical channel of the plurality of logical channels is associated with a second one or more allowed subcarrier spacings.

12. The apparatus of claim 11, wherein the selected first logical channel is further selected based on:
a first one or more allowed numerology common resource grants that comprise.

13. The apparatus of claim 11, wherein the selected first logical channel is further selected based on that the first one or more allowed numerology common resource grants includes the first grant of resources.

14. The apparatus of claim 1, wherein:
the first grant of resources further indicates a numerology; and
the indication is implicit or explicit for the indicated numerology.

15. The apparatus of claim 1, wherein the selected first logical channel is a bucket size duration configured for each of the one or more selected logical channels.

16. The apparatus of claim 1, the apparatus further comprising computer-executable instructions stored in the memory of the apparatus which, when executed by the processor of the apparatus, cause the apparatus to perform further operations comprising sending a scheduling request (SR) to trigger allocation of the first grant of resources by the network.

17. The apparatus of claim 1, wherein the apparatus is configured with a scheduling Request (SR) per logical channel group.

18. The apparatus of claim 1, the apparatus further comprising computer-executable instructions stored in the memory of the apparatus which, when executed by the processor of the apparatus, cause the apparatus to perform further operations comprising reporting scheduling requests (SR) per logical channel or per logical channel group associated with the SR.

19. The apparatus of claim 1, wherein the second layer is a packet data convergence protocol (PDCP) layer and the third layer is a medium access control (MAC) layer.

20. The method of claim 1, wherein the second layer is packet data convergence protocol (PDCP) layer and the third layer is medium access control (MAC) layer.

21. A method for a network system, the method comprising:
- transmitting a data radio bearer (DRB) configuration, wherein DRBs configured by the DRB configuration are mapped to quality of service (QoS) flow in a first layer, the first layer;
- transmitting a first grant of resources from a network node connected to the apparatus via the network,
    - wherein the first grant of resources indicates a numerology restriction of logical channels with respect to subcarrier spacing (SCS) and a duplication restriction of logical channels with respect to one or more component carrier (CC), the duplication restriction being for restricting a logical channel associated with one or more of the DRBs having duplication in a second layer, the second layer being lower than the first layer,
    - wherein the first grant of resources further indicates a first lifetime associated with a logical channel of the first grant, such that a logical channel of the first grant is not usable when the first lifetime expires; and
- receiving a data packet via a first logical channel using the first grant of resources,
    - wherein the data packet is prepared to have a header including QoS flow identifier (ID) in the first layer,
    - wherein the first logical channel is selected based on the numerology restriction, the duplication restriction and determination that the first lifetime is not expiring, the selection is performed in a third layer being lower than the second layer.

* * * * *